US009124163B2

(12) United States Patent
Jang

(10) Patent No.: US 9,124,163 B2
(45) Date of Patent: Sep. 1, 2015

(54) REPULSIVE FORCE CONVERSION DRIVES AND CENTRIFUGAL FORCE CONVERSION

(71) Applicant: Sei-Joo Jang, Bellefonte, PA (US)

(72) Inventor: Sei-Joo Jang, Bellefonte, PA (US)

( * ) Notice: Subject to any disclaimer, the term of this patent is extended or adjusted under 35 U.S.C. 154(b) by 223 days.

(21) Appl. No.: 13/708,151

(22) Filed: Dec. 7, 2012

(65) Prior Publication Data

US 2013/0127279 A1 May 23, 2013

Related U.S. Application Data

(63) Continuation-in-part of application No. 12/566,647, filed on Sep. 24, 2009, now abandoned.

(51) Int. Cl.
*H02K 7/06* (2006.01)
*H02K 23/04* (2006.01)
*H02K 49/10* (2006.01)
*H02K 53/00* (2006.01)
*H02K 7/16* (2006.01)

(52) U.S. Cl.
CPC .............. *H02K 23/04* (2013.01); *H02K 49/108* (2013.01); *H02K 53/00* (2013.01); *H02K 7/06* (2013.01); *H02K 7/16* (2013.01)

(58) Field of Classification Search
CPC ....................................................... H02K 7/06
USPC ........................................ 310/20, 80; 29/596
See application file for complete search history.

(56) References Cited

U.S. PATENT DOCUMENTS

| 3,899,703 | A | * | 8/1975 | Kinnison | 310/103 |
| 4,300,067 | A | * | 11/1981 | Schumann | 310/80 |
| 5,432,382 | A | * | 7/1995 | Pawlowski | 290/1 R |
| 7,902,703 | B2 | * | 3/2011 | Ucer | 310/80 |
| 2007/0210659 | A1 | * | 9/2007 | Long | 310/80 |

OTHER PUBLICATIONS

Introduction to Electrodynamics, Davis J. Griffiths, 1999, Prentice Hall Inc, p. 207.*

* cited by examiner

*Primary Examiner* — Hanh Nguyen
(74) *Attorney, Agent, or Firm* — John J. Elnitski, Jr.

(57) ABSTRACT

A repulsive force conversion drive system for centrifugal force conversion to drive a load. A operational load to be driven by movement and provide external power due to movement of the operational load. A rotary repulsive force conversion drive connected to the operational load, such that the operational load moves in a first linear direction due to centrifugal force of rotating mass of the rotary repulsive force conversion drive. A linear repulsive force conversion drive connected to the operational load, the linear repulsive force conversion drive connected to the operational load such that the operational load moves is a second linear direction that is opposite the first linear direction on command from the linear repulsive force conversion drive.

20 Claims, 47 Drawing Sheets

REPULSIVE FORCE CONVERSION DRIVES AND CENTRIFUGAL FORCE CONVERSION

This application is a continuation-in-part application of U.S. patent application Ser. No. 12/566,647 filed Sep. 24, 2009. This application claims the benefit and incorporates by reference U.S. patent application 11/835,610 filed Aug. 8, 2007, U.S. Provisional Application No. 60/943,895 filed Jun. 14, 2007, U.S. patent application Ser. No. 11/835,610 filed Aug. 8, 2007, U.S. patent application Ser. No. 11/835,597 filed Aug. 8, 2007 and the following KR Applications 10-2007-0054209 filed Jun. 4, 2007, 10-2007-0054211 filed Jun. 4, 2007, 10-2007-0054213 filed Jun. 4, 2007, 10-2007-0054214 filed Jun. 4, 2007, 10-2007-0054215 filed Jun. 4, 2007, 10-2007-0054216 filed Jun. 4, 2007, 10-2007-0054217 filed Jun. 4, 2007

BACKGROUND

Mankind has been looking for improved energy sources ever since beginning of human history. Mankind initially performed work by laboring the human body and then using various kinds of animals, such as dogs, horses, donkeys, oxen, and elephants. Later, mankind utilized the kinetic energy of falling water to generate electricity. In the past and currently, sun light, wind, ocean currents and heat from deep within the earth are used as useful sources of energy. Nuclear energy is being used to generate electricity. And, efforts to develop bio-fuel alternatives are on going. Currently however, the most widely and frequently used energy sources are the fossil fuels, such as coal, petroleum, and natural gas. Whereby, mankind gets motion energy by exploding gasoline or diesel in engines and gets heat energy by burning fossil fuels. We are also produce electricity by operating generators powered by fossil fuels. Unfortunately, the extremely valuable fossil fuels are a limited resource. A much more serious problem then the rising cost of fossil fuels is the byproduct production of $CO_2$, nitrogen, sulfur dioxide gases and very fine carbon particles from burning fossil fuels. These unwanted byproducts are believed to cause irreversible damage to our health and to nature. So, less destructive and less expensive energy sources and more efficient engines are needed for energy production.

It is an object of the present invention to provide a less destructive and less expensive energy source.

SUMMARY

A repulsive force conversion drive system for centrifugal force conversion to drive a load. A operational load to be driven by movement and provide external power due to movement of the operational load. A rotary repulsive force conversion drive connected to the operational load, such that the operational load moves in a first linear direction due to centrifugal force of rotating mass of the rotary repulsive force conversion drive. A linear repulsive force conversion drive connected to the operational load, the linear repulsive force conversion drive connected to the operational load such that the operational load moves is a second linear direction that is opposite the first linear direction on command from the linear repulsive force conversion drive.

DETAILED DESCRIPTION OF THE INVENTION

The present invention is a repulsive force conversion drive. The present invention includes the method of making and using a repulsive force conversion drive. The repulsive force conversion drive amplifies a small energy source used to convert the potential energy of a repulsive force into kinetic energy to produce a powered output. The repulsive force conversion drive operates with a motion input. The motion input only requires a small amount of energy to operate. The motion input can be produced by a small electrical device, which can be powered by a rechargeable battery that is charged by the repulsive force conversion drive itself or by other readily available ways, such as a solar cell. The present invention includes a method of assembling fixed and moving sources that produce a repulsive force with the motion input to produce a repulsive force conversion drive that can drive the likes of gear boxes and electric generators.

Figure 1:
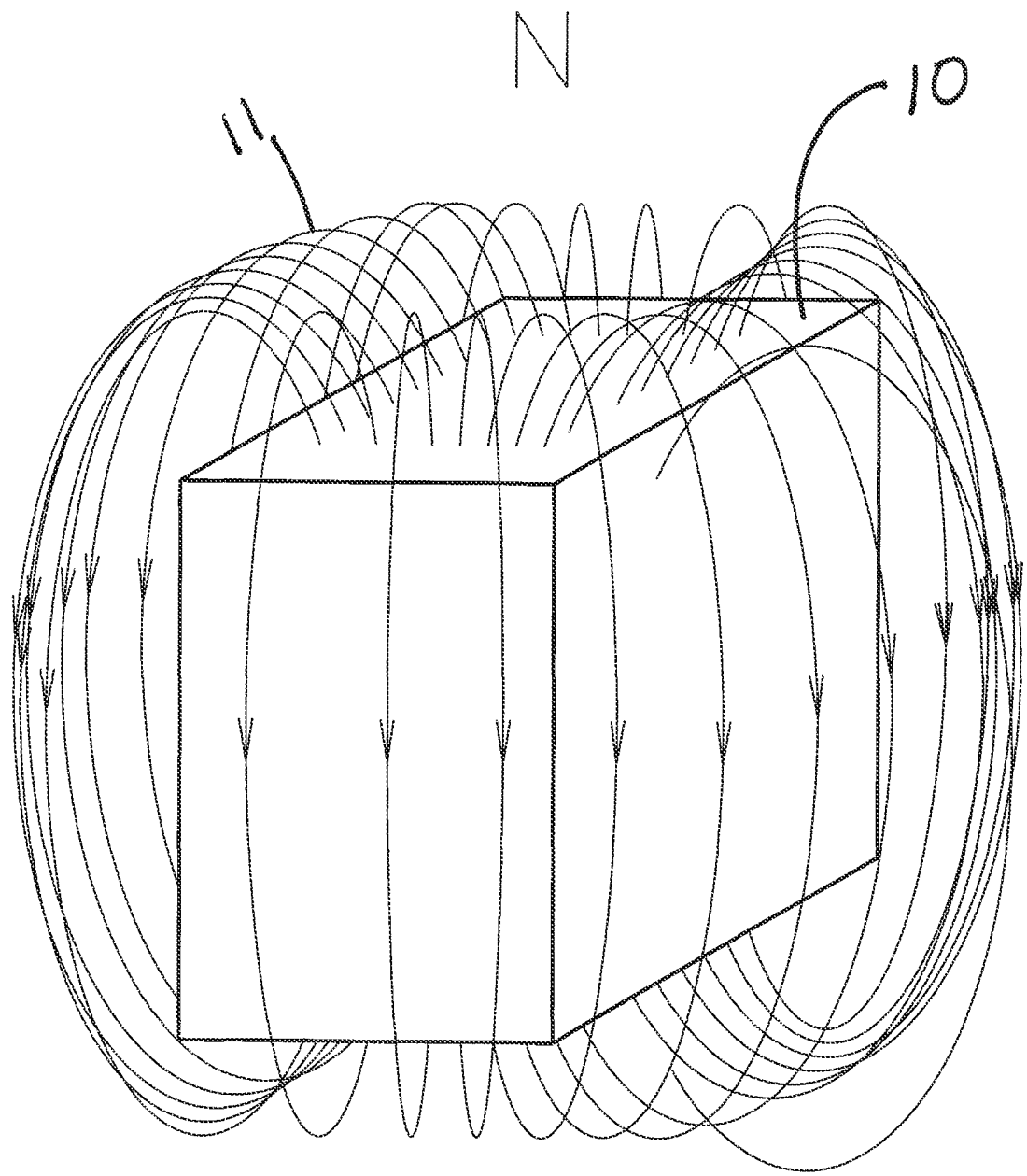
FIG. 1 is a perspective view of a square shaped permanent magnet.
Figure 2:
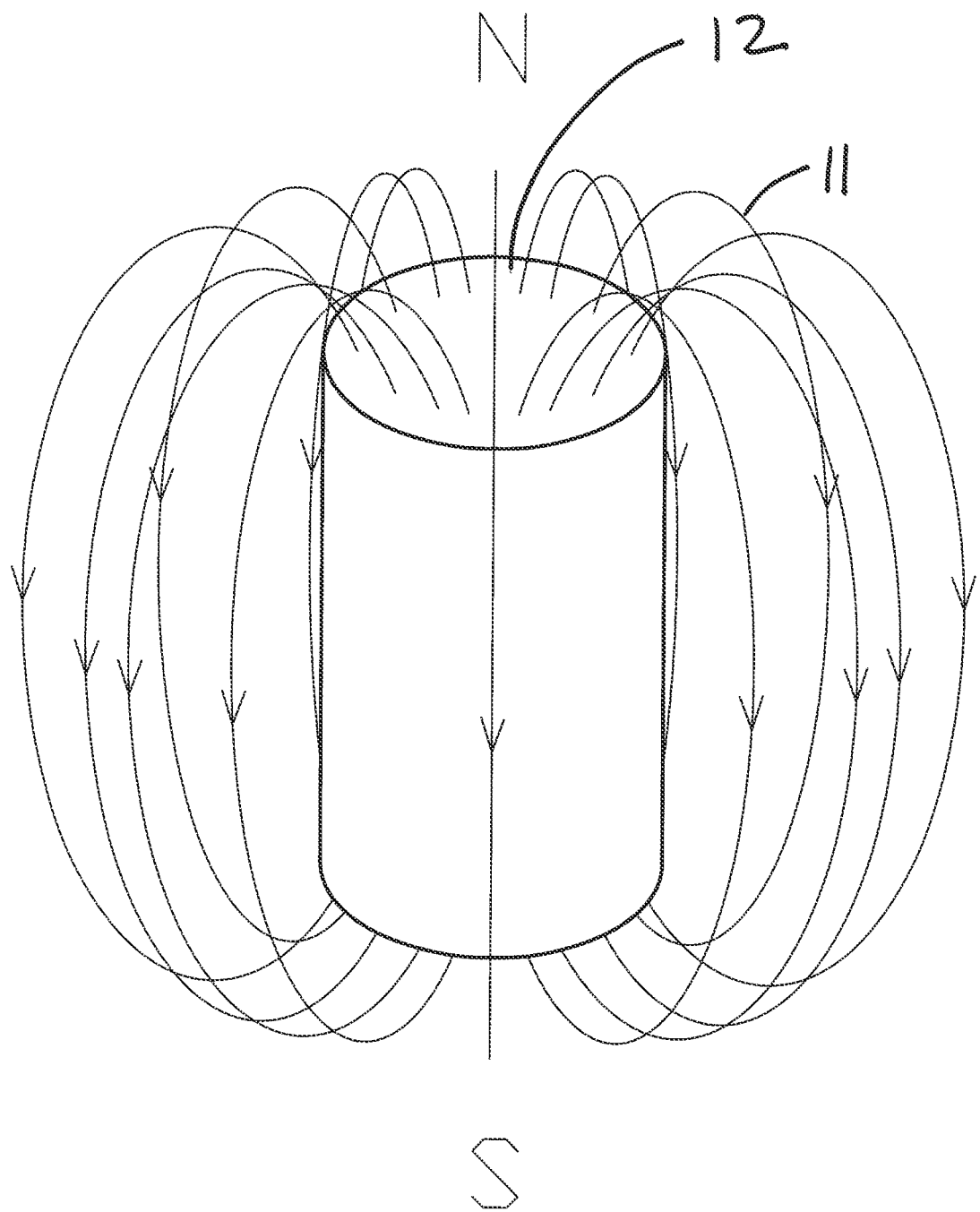
FIG. 2 is a perspective view of a cylindrical shaped permanent magnet.
Figure 3:
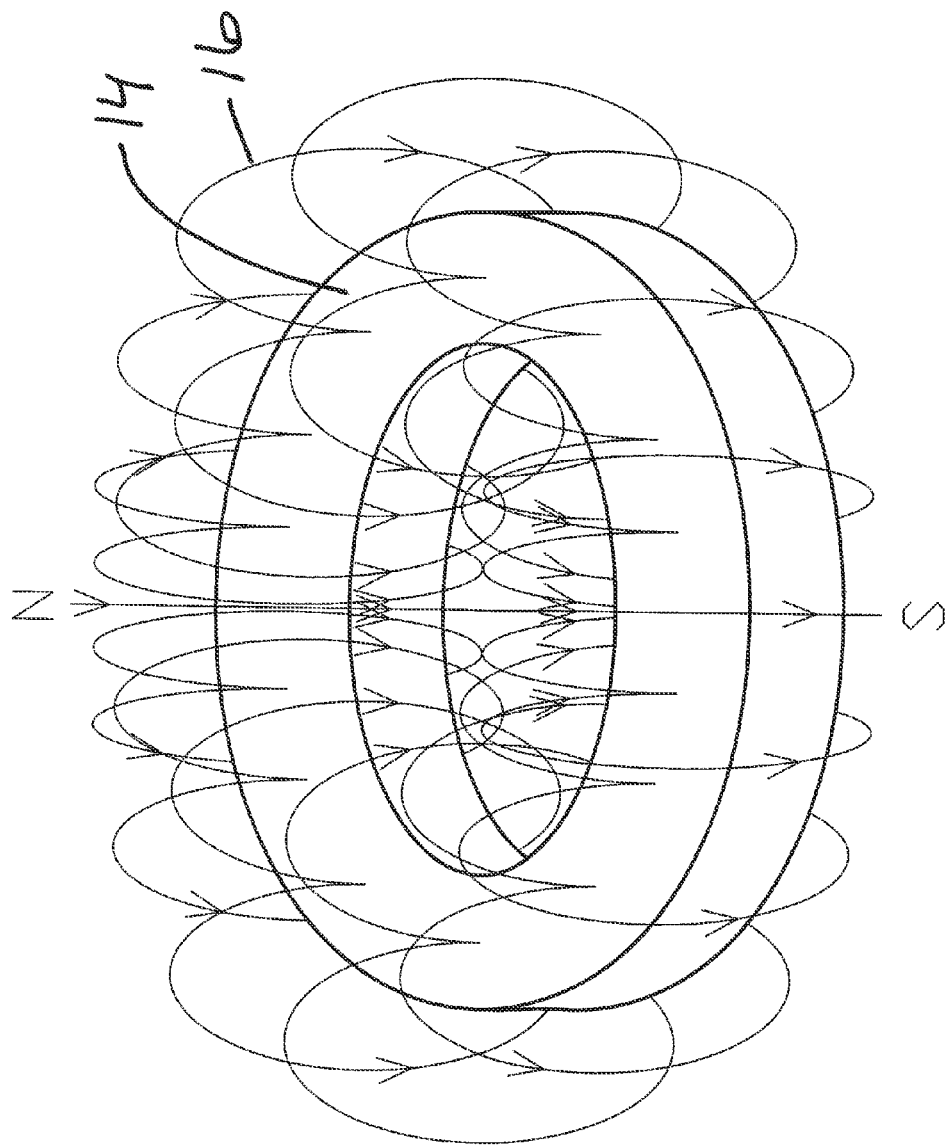
FIG. 3 is a perspective view of a doughnut shaped permanent magnet.
Figure 4:
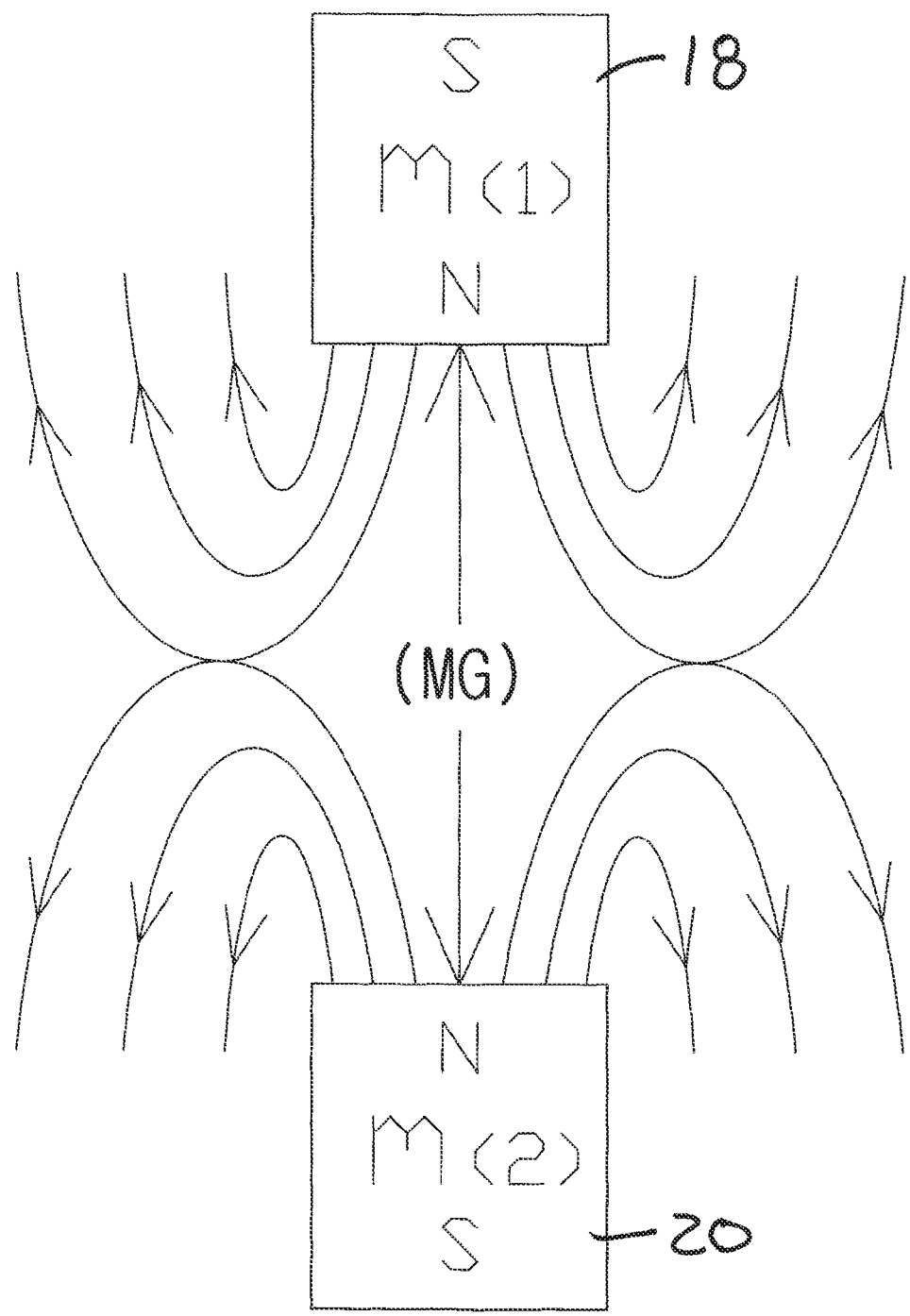
FIG. 4 is a schematic view of two permanent magnets facing each other with the same polarity.

FIGS. 1-3 show examples of permanent magnets that act as repulsive units and can be used as a source of repulsive force in the repulsive force conversion drive. FIG. 1 shows a bar magnet 10 and FIG. 2 shows a cylindrical magnet 12. FIGS. 1 and 2 show the magnetic field distribution 11 around each magnet 10, 12. FIG. 3 shows a doughnut magnet 14 and the magnetic field distribution 16 around doughnut magnet 14. FIG. 4 shows two magnets 18, 20 placed facing each other with the same polarity, in this case the polarity is North (N) of each magnet 18, 20. The South (S) polarity is also shown. The distance between the two magnets 18, 20 of FIG. 4 is (MG).

It is known that when two magnets face each other with the same polarity, there is a repulsive force between the magnets. The repulsive force, (F(1,2)), between the magnets 18, 20 is due to the magnetic dipole moment of "m(1)" and "m(2)" for each magnet. The equation for repulsive force is:

$$F(1,2) = (m(1) \times m(2))/(4\pi \mu_{(0)} \times (MG)^2), \qquad (1),$$

where $\mu_{(0)}$ is the permeability of vacuum. The strength of the magnetic fields due to the magnet of dipole moments of "m(1)" and "m(2)" are:

$$H(1) = m(1)/(4\pi \mu_{(0)} \times (MG)^2), \qquad (2),$$

and $$H(2) = m(2)/(4\pi \mu_{(0)} \times (MG)^2) \qquad (3).$$

Figure 5:
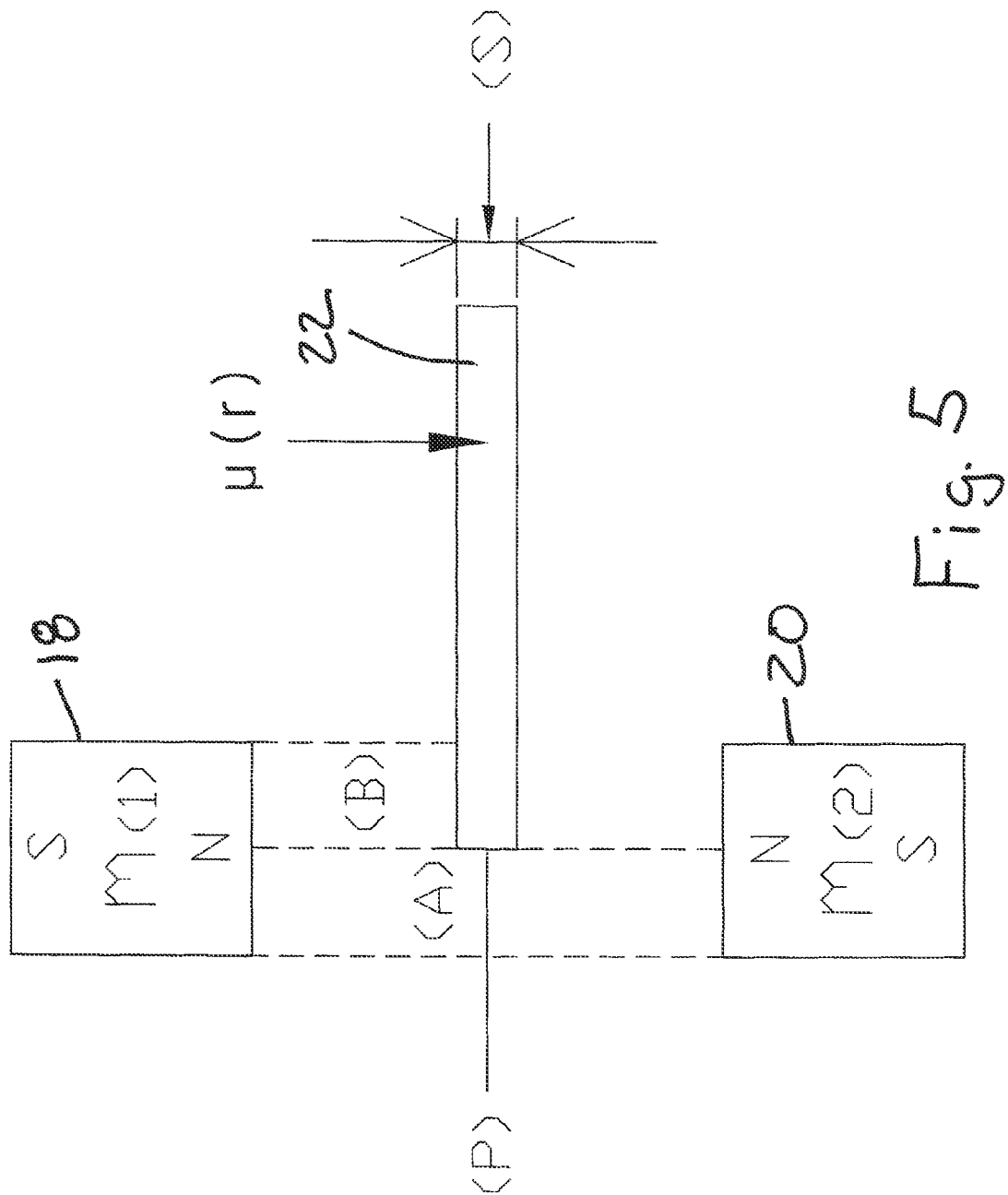
FIG. 5 is a schematic view of two permanent magnets facing each other with the same polarity according to the present invention.
Figure 6:
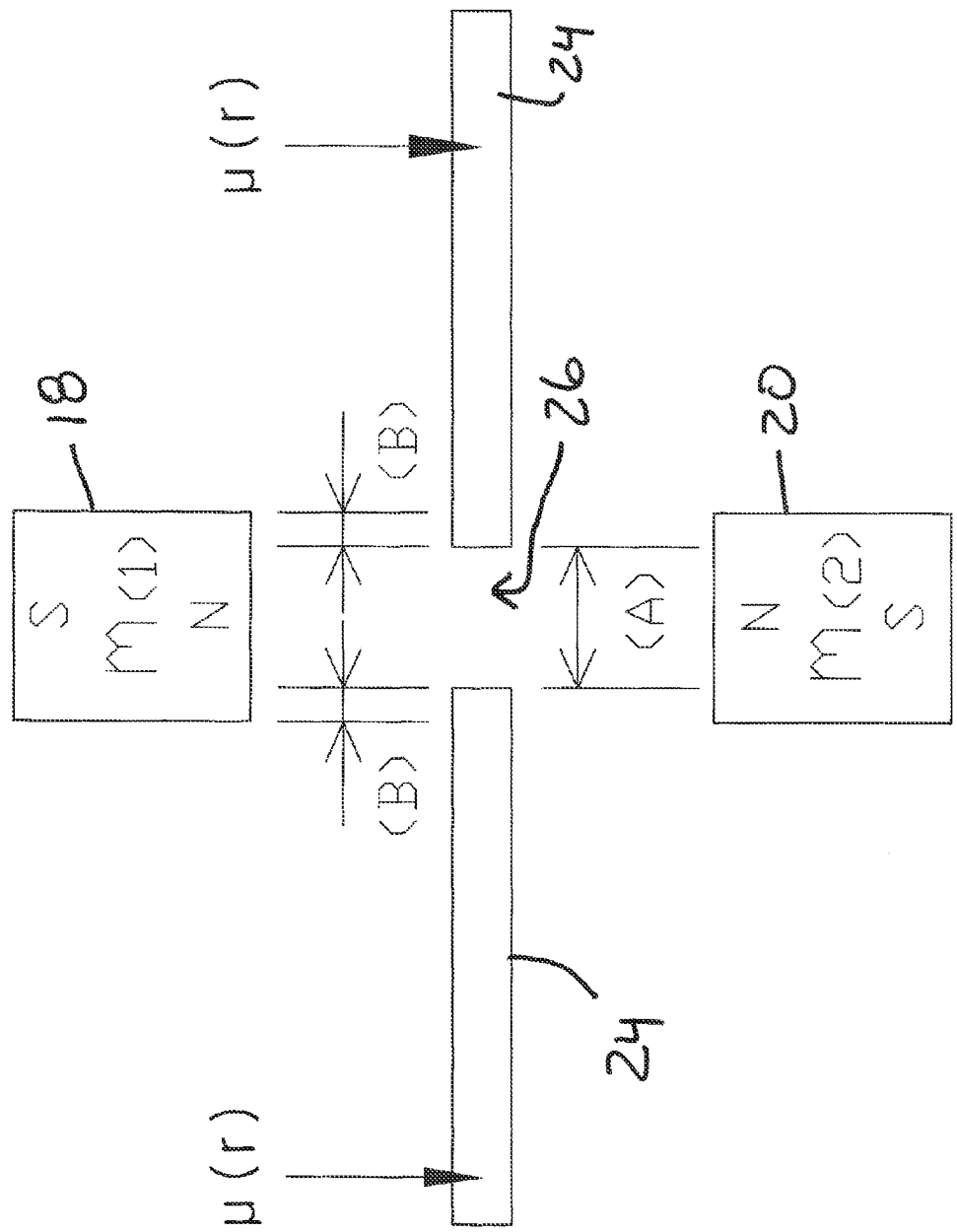
FIG. 6 is a schematic view of two permanent magnets facing each other with the same polarity according to the present invention.

FIG. 5 shows a thin plate 22 made from a material having a relatively large magnetic permeability $\mu_{(r)}$, where the permeability of the plate is $\mu_{(r)} > \mu_{(0)}$. The plate 22 is shown partially inserted between the two permanent magnets 18, 20 of FIG. 5 and acts as a magnetic field shielding plate. The resisting force against movement of plate 22 between the magnets 18, 20 is:

$$F(1) = (H(P))^2 \times \mu_{(r)} \times (S)/2, \qquad (4),$$

where (S) is the side area of the plate 22 and $\mu_{(r)}$ is the magnetic permeability of plate 22. H(P) is the strength of the magnetic field at the position (P) between the two magnets 18, 20. The resisting force F(1) on the plate 22 can be adjusted to very small size by making the magnitude of H(P) close to "zero" value. This can be done by moving the plate 22 through line position (P) which is center between the two magnetic fields "H(1)" and "H(2)" of the two magnets 18, 20. "H(1)" and "H(2)" are defined by equations (2) and (3) for the two magnets 18, 20. The magnetic fields of the two magnets 18, 20 are in opposite directions, as shown in FIG. 4. With the magnets 18, 20 the correct distance apart and the magnetic fields being in opposite directions, the magnetic field strength can be practically zero midway between the two magnets 18, 20, due to the dipole moments, "m(1)" and "m(2)". The side area (S) also can be made small to reduce the resisting force F(1) on the plate 22. So overall, the energy required to move the plate 22 between the magnets 18, 20 can be quite small, if positioned midway between the two magnets 18, 20. In fact, the total energy required can be just the energy needed to move the weight of plate 22 plus the friction experience during motion of the plate 22. If one of magnets 18, 20, for example magnet 18, is allowed to move freely along the tangential direction under the condition of partially shielded area of (B) as shown in FIG. 5, then it can be observed that the dipole moment "m(1)" of magnet 18 will be moving from area (A) to area (B). This is because the strong repulsive force F(1,2) of the equation (1), is present in area (A), but in area (B), the repulsive force is almost zero and there may even be a small pulling force present. This difference in repulsive force between area (A) and area (B) is dependent on the properties of the plate 22. Consequently, by moving the plate 22 along the middle position line (P), one can also move the much heavier magnet 18. The use of a thin plate 22 as a magnetic shield is the main principle of the repulsive force conversion drive of the present invention, where the magnetic field energy of two permanent magnets produces a repulsive force that is transferred into kinetic energy. Using the principle discussed, FIG. 6 shows a plate 24 which is a thin magnetic field shielding plate with a hole 26 in the middle of plate 24. Magnet 20 is fixed and magnet 18 is suspended in a way to allow movement of magnet 18. Movement of the plate 26 in a direction where the hole 26 moves between the two magnets 18, 20 will move magnet 18 in the same direction as the hole 26 passes between the magnets 18, 20. This is due the principles of the discussion above, thereby causing the repulsive force between the two magnets 18, 20 to be converted to a movement force during the movement of magnet 18. This movement of magnet 18 would be in a linear direction along the path of movement of the hole 26 of the plate 24.

Figure 7:
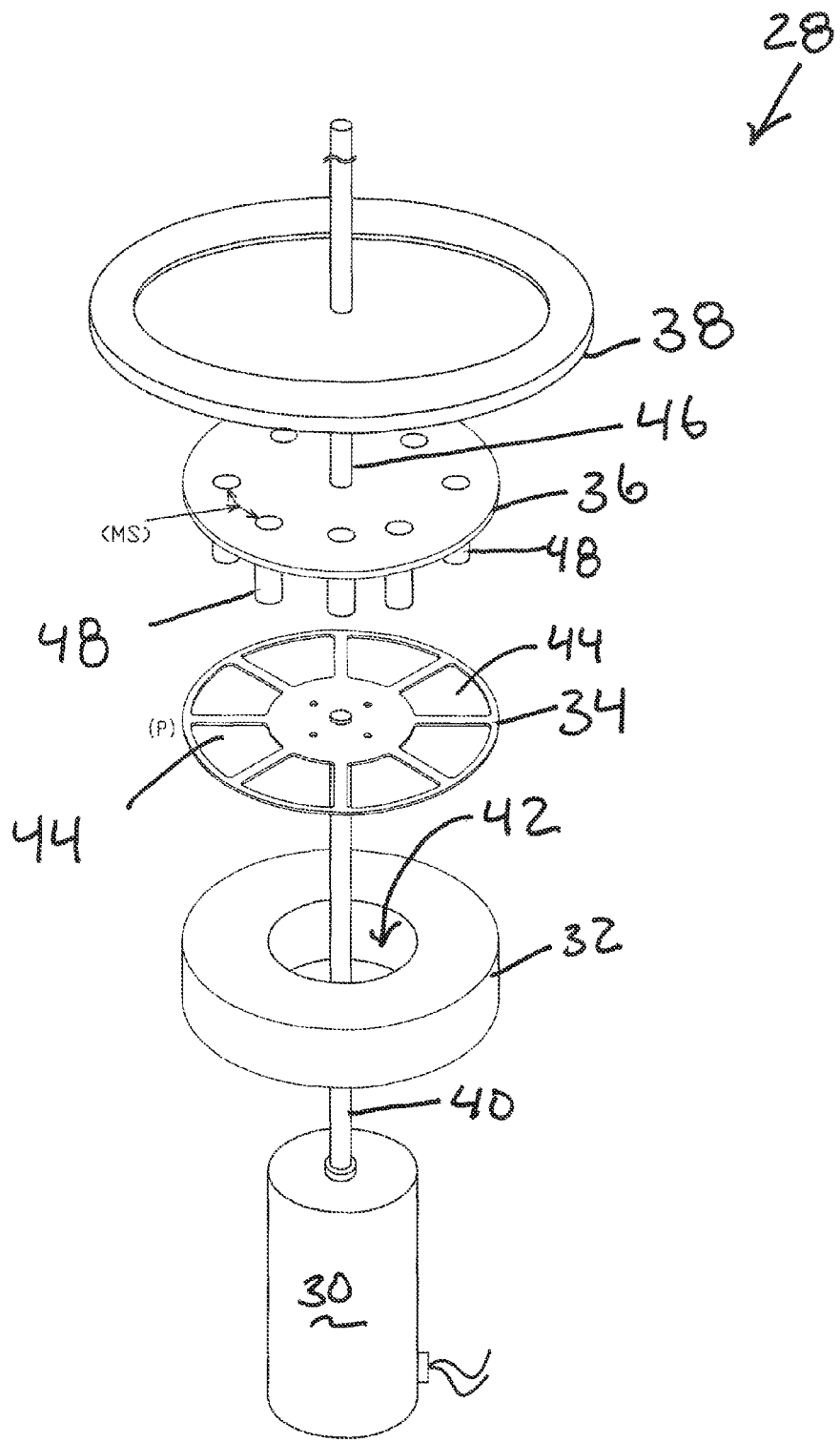
FIG. 7 is a perspective view of a repulsive force conversion drive according to the present invention.

FIG. 7 shows a repulsive force conversion drive 28 using magnets as repulsive units according to the present invention in a basic form with a rotary motion. The repulsive force conversion drive 28 includes a small input motor 30, doughnut magnet 32, motion inducing plate 34, magnet array disc 36 and flywheel 38. The doughnut magnet 32 acts as a fixed repulsive unit. The small input motor 30 includes a motor shaft 40. The motor shaft 40 projects through a center hole 42 of the doughnut magnet 32 and is connected to the motion inducing plate 34. The motion inducing plate 34 rotates when the motor shaft 40 rotates. The motion inducing plate 34 is made of a thin magnetic field shielding disc and made of materials having a high magnetic permeability. The motion inducing plate 34 includes a predetermined pattern of empty openings 44 and has a relatively small mass compared to other components of the repulsive force conversion drive 28. The magnet array disc 36 includes an output shaft 46 and is suspended independently. A bearing on the output shaft 46 or other means could be used to suspend the magnet array disc 36 independently. The magnet array disc 36 is shown with a series of disc magnets 48 extending downward towards the doughnut magnet 32. The disc magnets 48 act as motion repulsive units. The magnet array disc 36 with the disc magnets 48 can rotate, whereby the doughnut magnet 32 is in a fixed position. The magnet array disc 36 and output shaft 46 are an example of a drive mechanism. The disc magnets 48 are shown in FIG. 7 as several cylindrical shape magnets fixed along the circumference of the magnet array disc 36. The disc magnets 48 shown in FIG. 7 are positioned a distance of (MS) from each other on the magnet array disc 36. The flywheel 38 is connected to the output shaft 46 of the magnet array disc 36. It is shown in FIG. 7, that the flywheel 38, output shaft 46 and magnet array disc 36 are not physically connected to the motor shaft 40 or the motion inducing plate 34.

Figure 8:
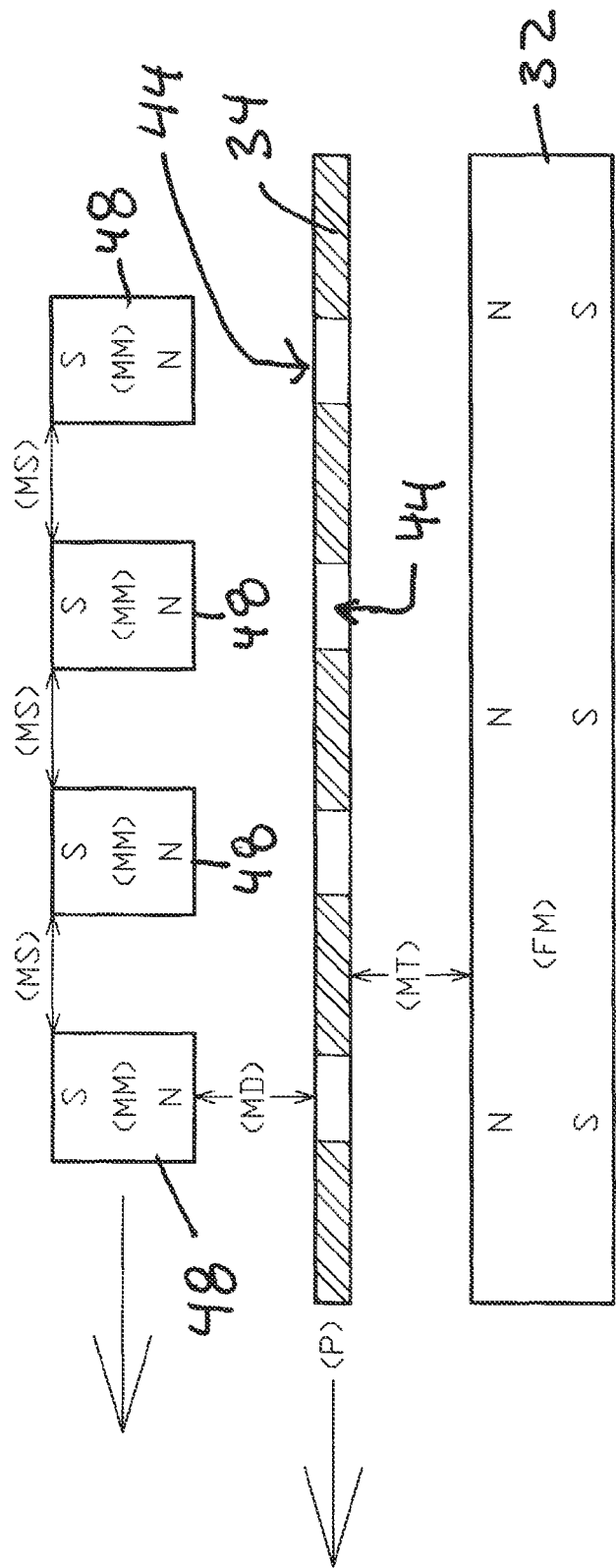
FIG. 8 is a schematic view of a repulsive force conversion drive according to the present invention.

FIG. 8 shows a cross section of the doughnut magnet 32, motion inducing plate 34 and magnet array disc 36 of the repulsive force conversion drive 28 of FIG. 7. The disc magnets 48 are positioned to face the doughnut magnet 32 such that polarity is the same and the disc magnets 48 and the doughnut magnet 32 repulse each other, where as shown in FIG. 8, North (N) faces North (N). The principles discussed above and illustrated in FIGS. 5 and 6 can be applied to the repulsive force conversion drive 28 shown in FIGS. 7 and 8. The motion inducing plate 34 is positioned between the doughnut magnet 32 and the disc magnets 48 such that the magnitude of magnetic field, H(P), along the line through position (P), is a value near zero value. Also, the motion inducing plate 34 is as thin as possible to have a small side area (S). As detailed above, the resisting force, F(1) of the equation (4), for the motion inducing plate 34 due to the magnetic field will be very small. When the motion inducing plate 34 moves in the direction past the doughnut magnet 32, the disc magnets 48 and magnet array disc 36 connected to the disc magnets 48 will move in the same direction due to the repulsive forces between the doughnut magnet 32 and the disc magnets 48 as the empty openings 44 pass the disc magnets 48, as shown in FIG. 8. Movement of the motion inducing plate 34 is achieved by rotation of the motor shaft 40 by the small input motor 30. Rotation of the motion inducing plate 34 of the repulsive force conversion drive 28 causes the magnet array disc 36 to rotate. When the magnet array disc 36 rotates, the output shaft 46 and the flywheel 38 rotate with the magnet array disc 36. Therefore, supplied energy to move the motion inducing plate 34 is much smaller than the energy released when the magnet array disc 36 is moved. This is because there is additional kinetic energy that is released during the movement of the motion inducing plate 34 that is supplied from potential energy of the repulsive force, F(1,2) of the equation (1), which exists between the fixed doughnut magnet 32 and the disc magnets 48 when arranged close to each other. The relative positions between the motion inducing plate 34, doughnut magnet 32 and disc magnets 48 are shown in FIG. 8 by distances (MD) and (MT). Distances (MD) and (MT) can be adjusted to optimum locations for the best performance of the repulsive force conversion drive 28.

Figure 9:
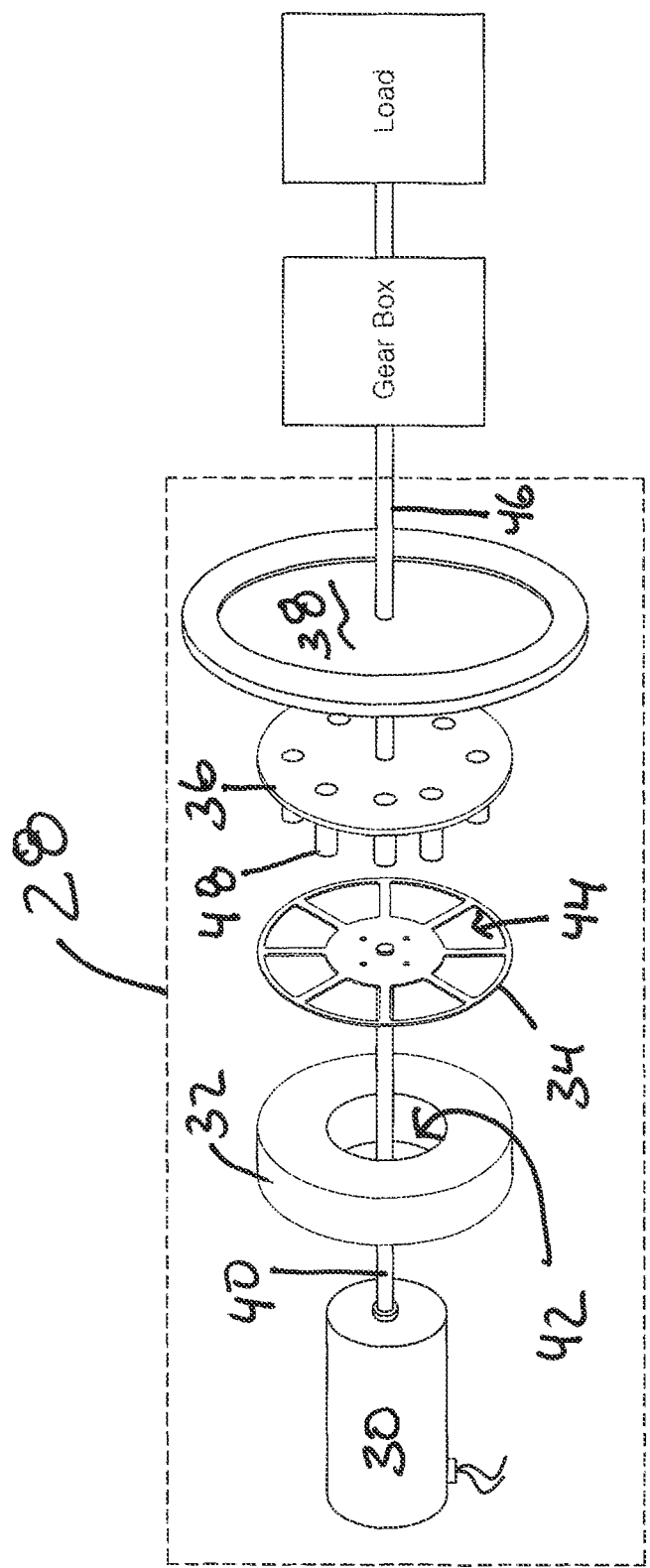
FIG. 9 is a schematic view of a repulsive force conversion drive attached to a gear box and load according to the present invention.
Figure 10:
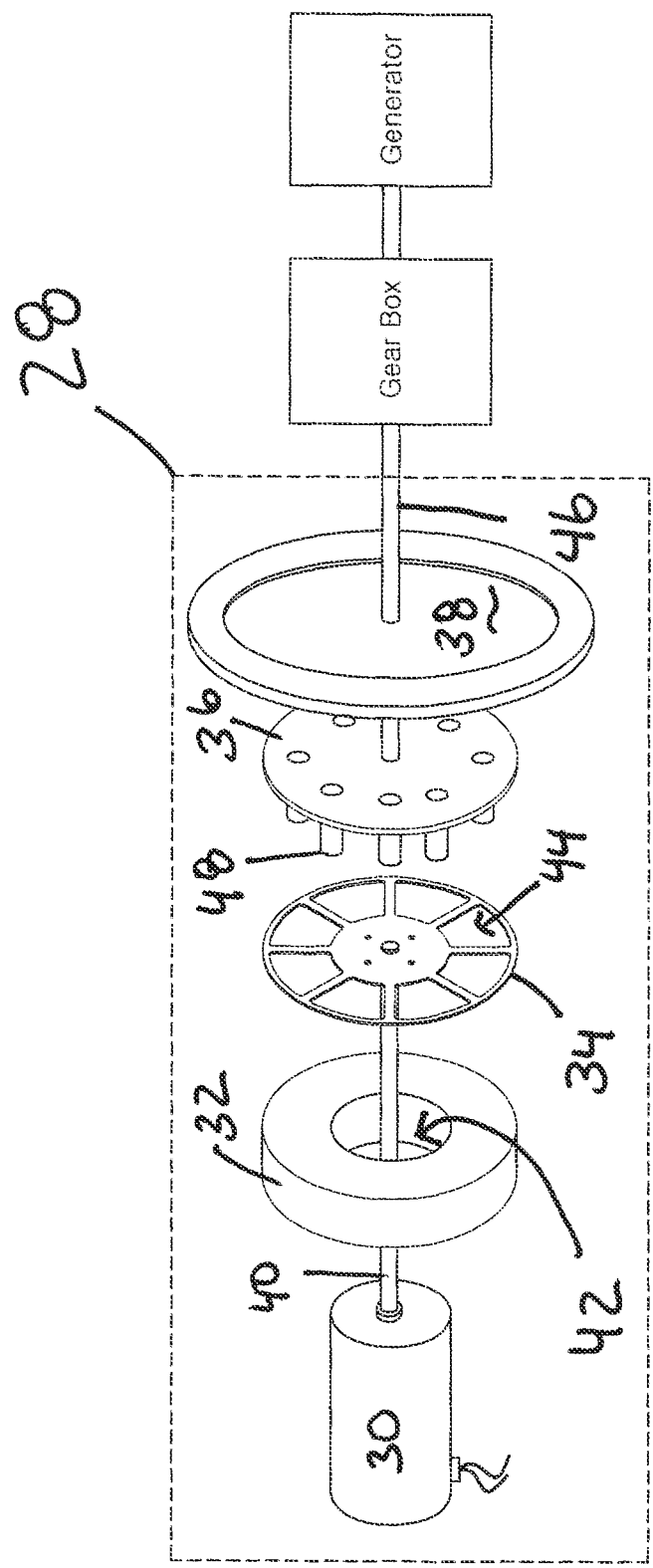
FIG. 10 is a schematic view of a repulsive force conversion drive attached to a gear box and generator according to the present invention.
Figure 11:
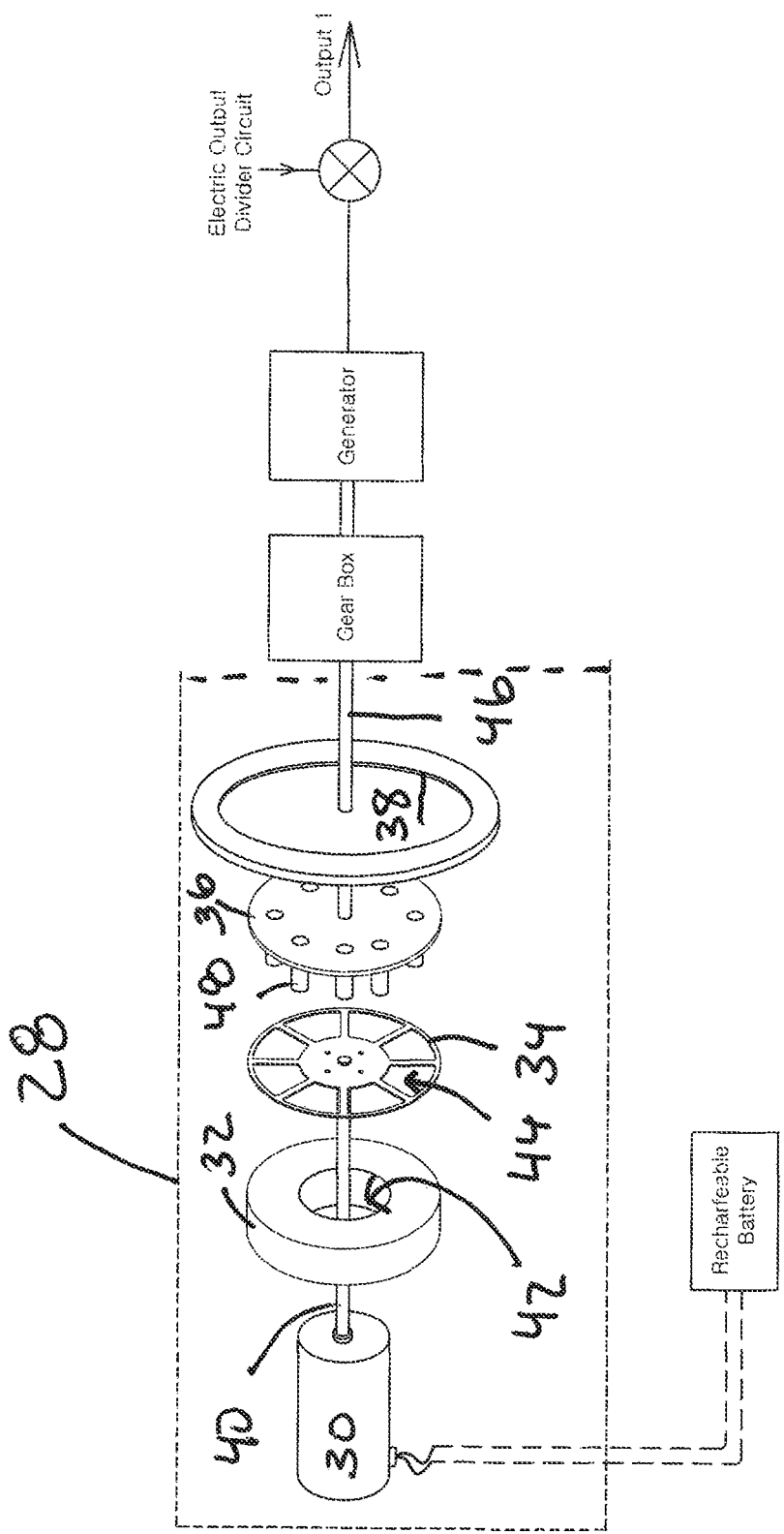
FIG. 11 is a schematic view of a repulsive force conversion drive attached to a gear box and generator along with a charging circuit and rechargeable battery according to the present invention.
Figure 12:
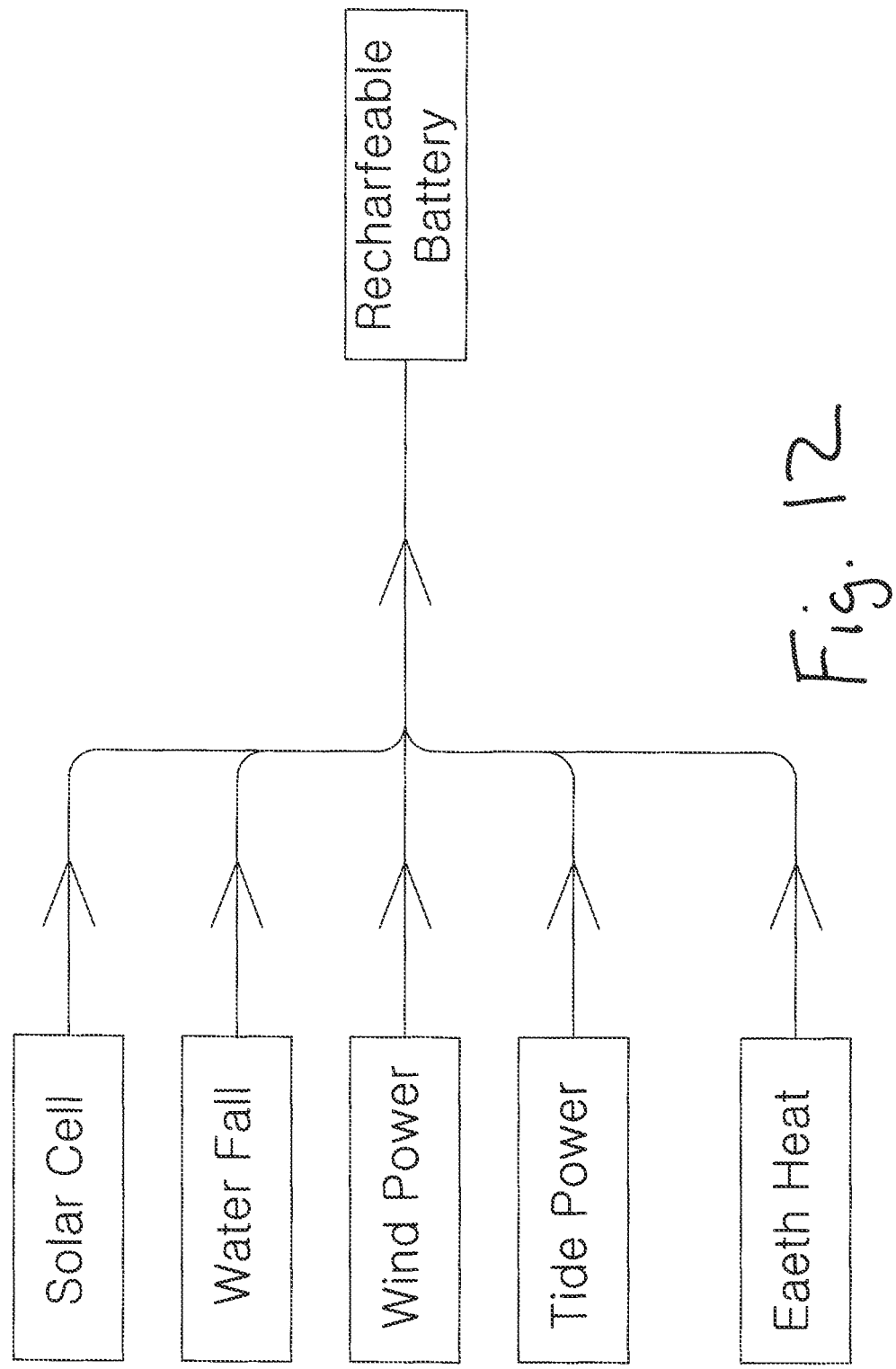
FIG. 12 is a schematic view of renewable free sources of energy that can charge the rechargeable battery according to the present invention.
Figure 13:
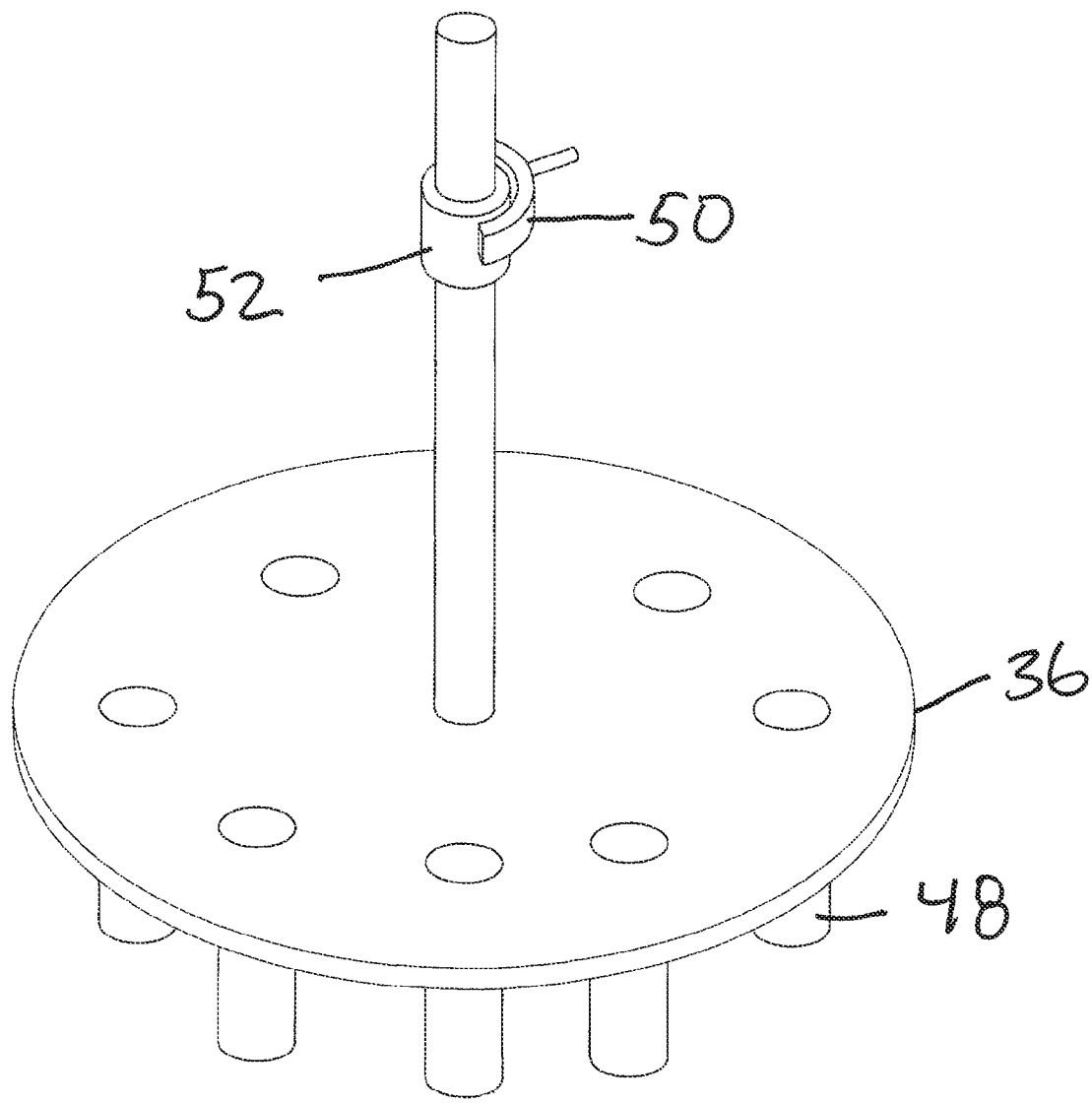
FIG. 13 is a perspective view of a brake system for the repulsive force conversion drive according to the present invention.
Figure 14:
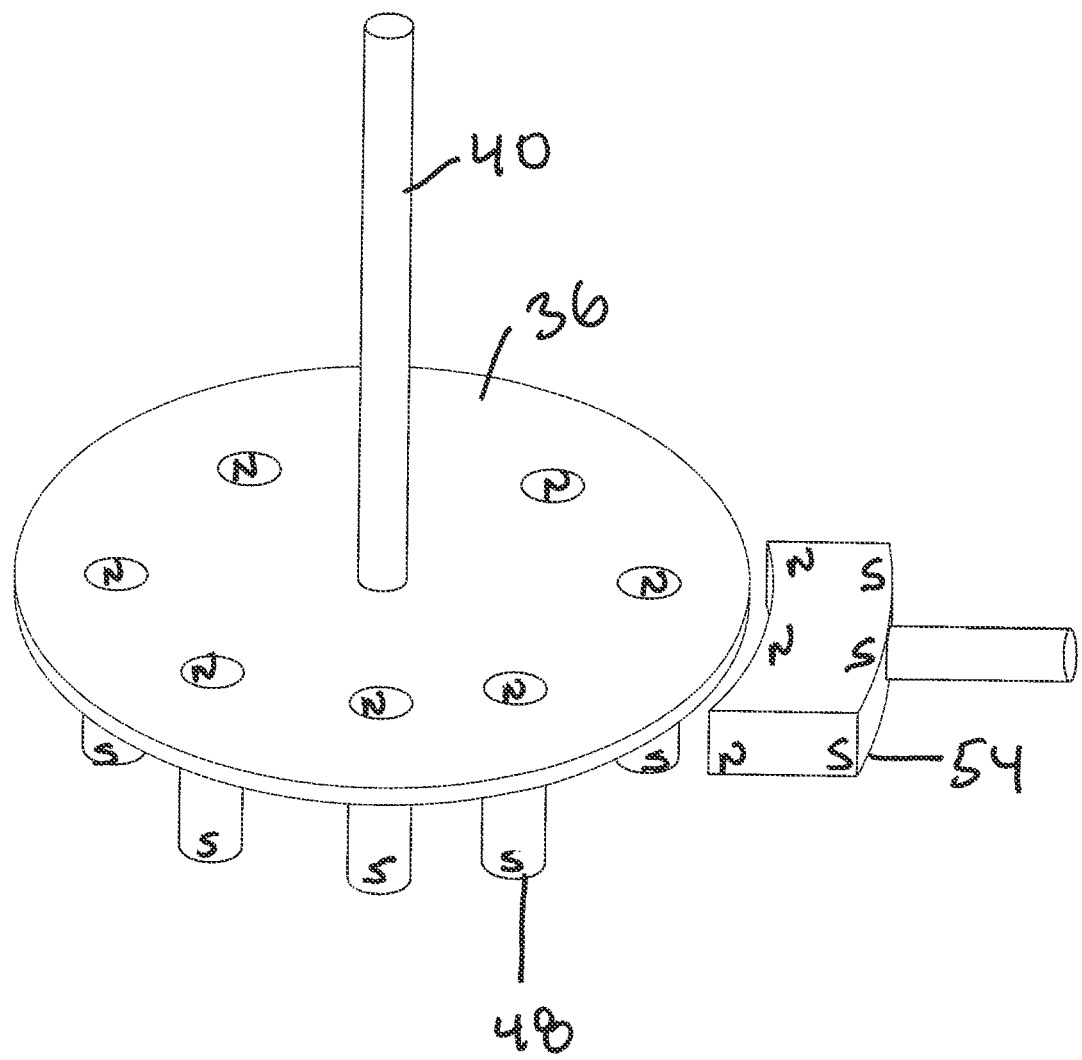
FIG. 14 is a perspective view of a brake system for the repulsive force conversion drive according to the present invention.

The repulsive force conversion drive 28 of FIG. 7 would be supported at the doughnut magnet 32, motor/motor shaft 30, 40 and output shaft 46. FIG. 9 shows the output shaft 46 of the repulsive force conversion drive 28 connected to a gear box which powers a mechanical load. Examples of a mechanical load are a transmission of an automobile or a compress in a refrigeration unit, such as a refrigerator or air conditioner. FIG. 10 shows the output shaft 46 of the repulsive force conversion drive 28 connected to a gear box which turns an electric generator. The gear box is used to control the angular speed and torque of the repulsive force conversion drive for various loads. FIG. 11 shows the small input motor 30 powered by a rechargeable battery FIG. 12 shows renewable free sources of energy that can charge the rechargeable battery, such as solar cells, water fall, wind power, water current power and earth heat. FIGS. 13 and 14 show brake systems for the repulsive force conversion drive 28. FIGS. 13-14 show different brakes that can be used with a rotary motion repulsive force conversion drive 28. FIG. 13 shows a brake pad 50 against a brake collar 52 located on the output shaft 46. FIG. 14 shows a magnetic shoe 54 placed near the top of the disc magnets 48. The magnetic shoe 54 would be the opposite polarity of the top of the disc magnets 48. When the magnetic shoe 54 is near the top of the disc magnets 48, there is a pulling force which stops the magnet array disc 36. The magnetic shoe 54 could also be placed near the bottom of the disc magnets 48, but would have to be a different polarity than the bottom of the disc magnets 48.

Figure 15:
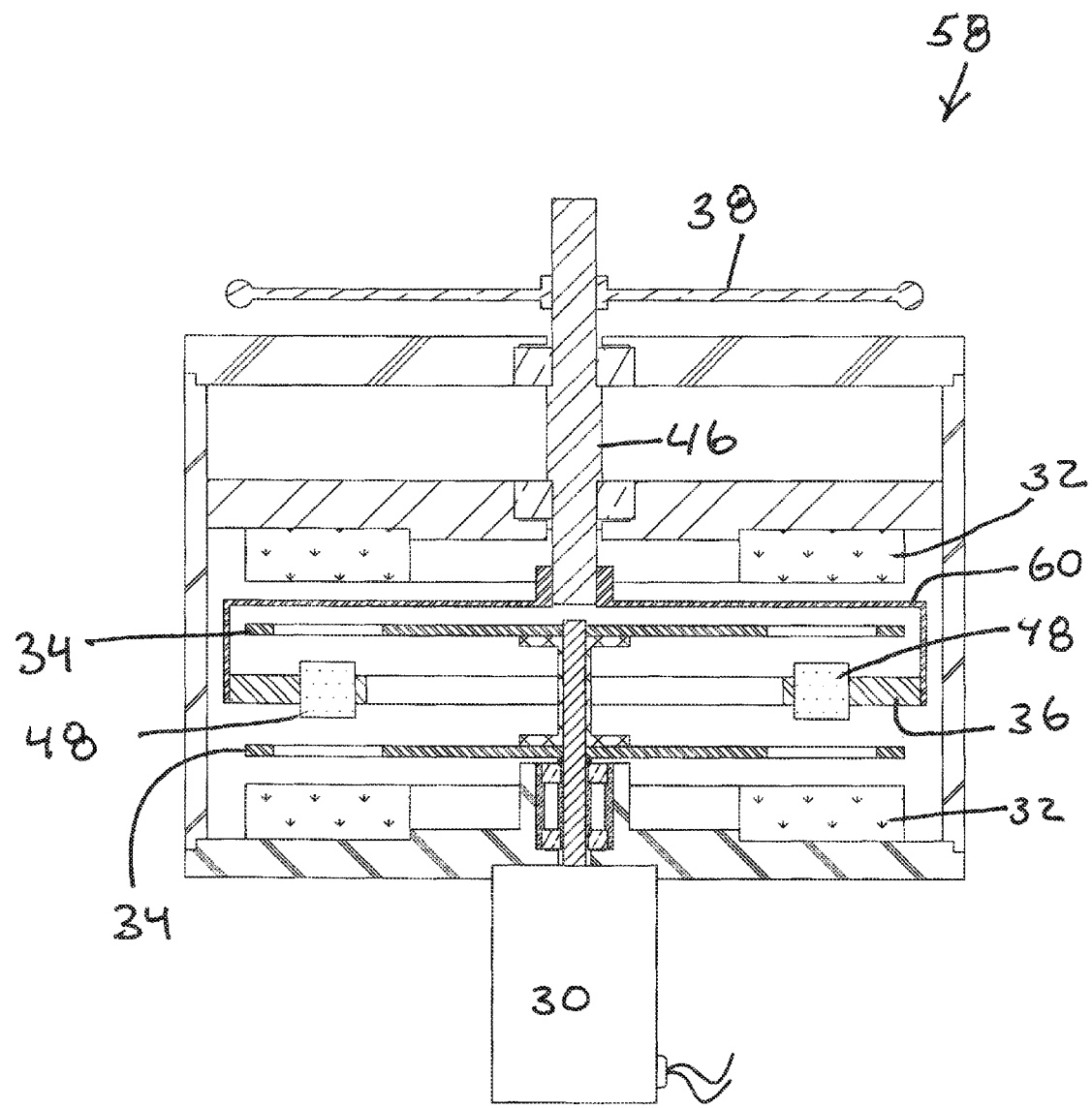
FIG. 15 is a perspective view of a repulsive force conversion drive according to the present invention.
Figure 16:
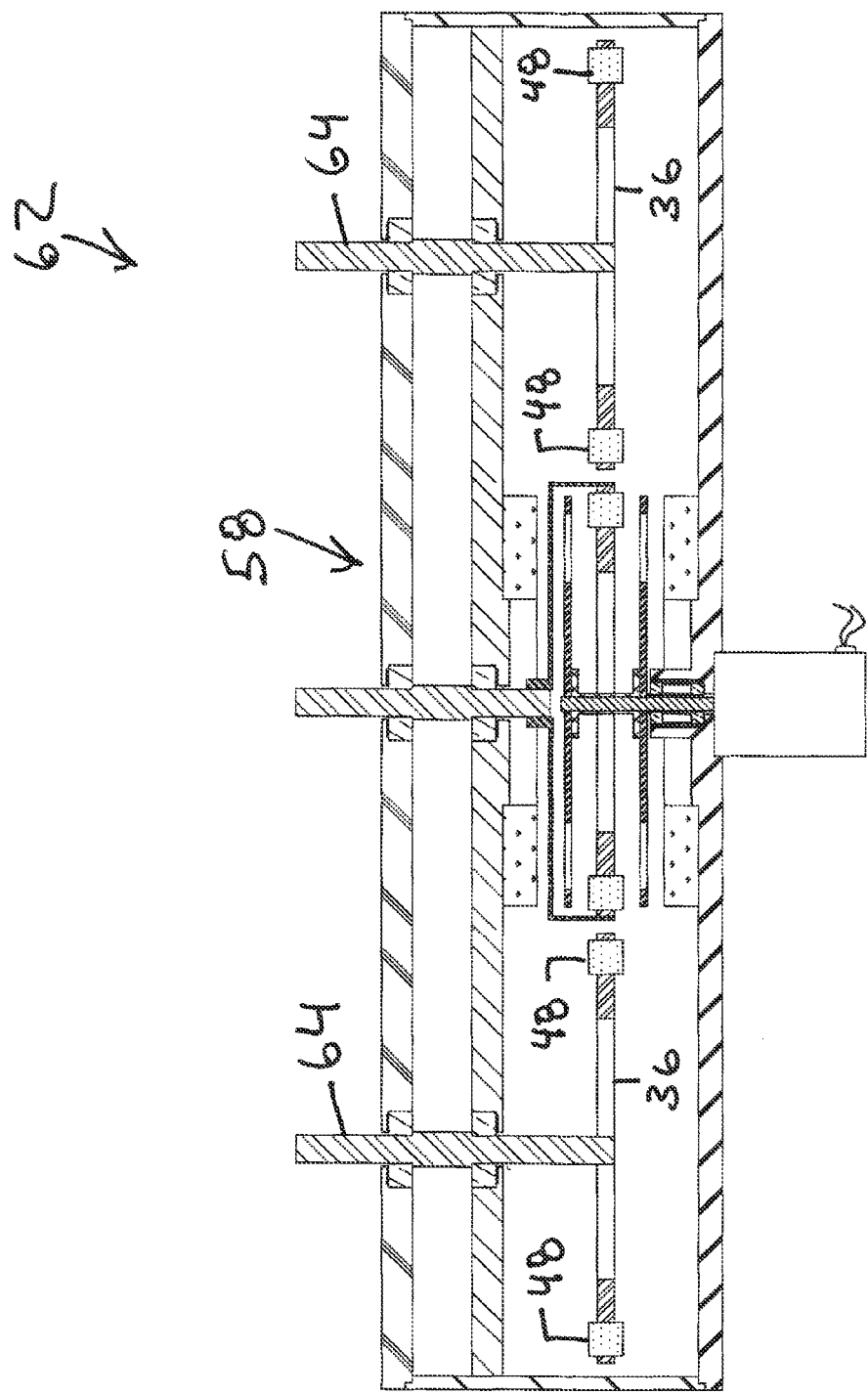
FIG. 16 is a perspective view of a repulsive force conversion drive according to the present invention.

FIGS. 15-18 show different embodiments of the rotary version of the repulsive force conversion drive using magnets. The embodiments of FIGS. 15-18 are enhanced with additional components to enhance efficiency and power of the repulsive force conversion drive using magnets. Each of the embodiments is shown having a support housing 56. The support housing includes shaft supports that include bearings around the shafts to provide rotational support for the motor 30 and output shaft 46. Some of the shaft supports also support the fixed magnets. FIG. 15 shows repulsive force conversion drive 58 with a shaft support frame 60 attached to the magnet array disc 36. The shaft support frame 60 of the magnet array disc 36 is connected to the output shaft 46 instead of the magnet array disc 36 being connected to the output shaft 46. This allows for an additional motion inducing plate 34 connected above the magnet array disc 36 and the disc magnets 48. The additional motion inducing plate 34 is attached to an elongated motor shaft 40 that passes freely through the magnet array disc 36. There is an additional doughnut magnet 32 mounted above the magnet array disc 36, such that the additional motion inducing plate 34 is between the additional doughnut magnet 32 and the disc magnets 48. The polarity of the faces of the additional doughnut magnet 32 and the disc magnets 48 are to be the same to produce a repulsive force. The shaft support frame 60 of the magnet array disc 36 allows rotation of the output shaft 46 without interference from the additional doughnut magnet 32 and additional motion inducing plate 34. FIG. 16 shows an induction repulsive force conversion drive 62 with an internal repulsive force conversion drive 58 of FIG. 15 and with two additional output shafts 64. The two additional output shafts 64 are each attached to a magnet array disc 36 with disc magnets 48, which together form two induction drives. The disc magnets 48 of the additional output shafts 64 are of a polarity such that, as the magnet array disc 36 of the repulsive force conversion drive 58 rotates, the disc magnets 48 of the magnet array disc 36 of the repulsive force conversion drive 58 pull along the disc magnets 48 of the additional magnet array discs 36 and cause the additional magnet array discs 36 and the additional output shafts 64 to rotate.

Figure 17:
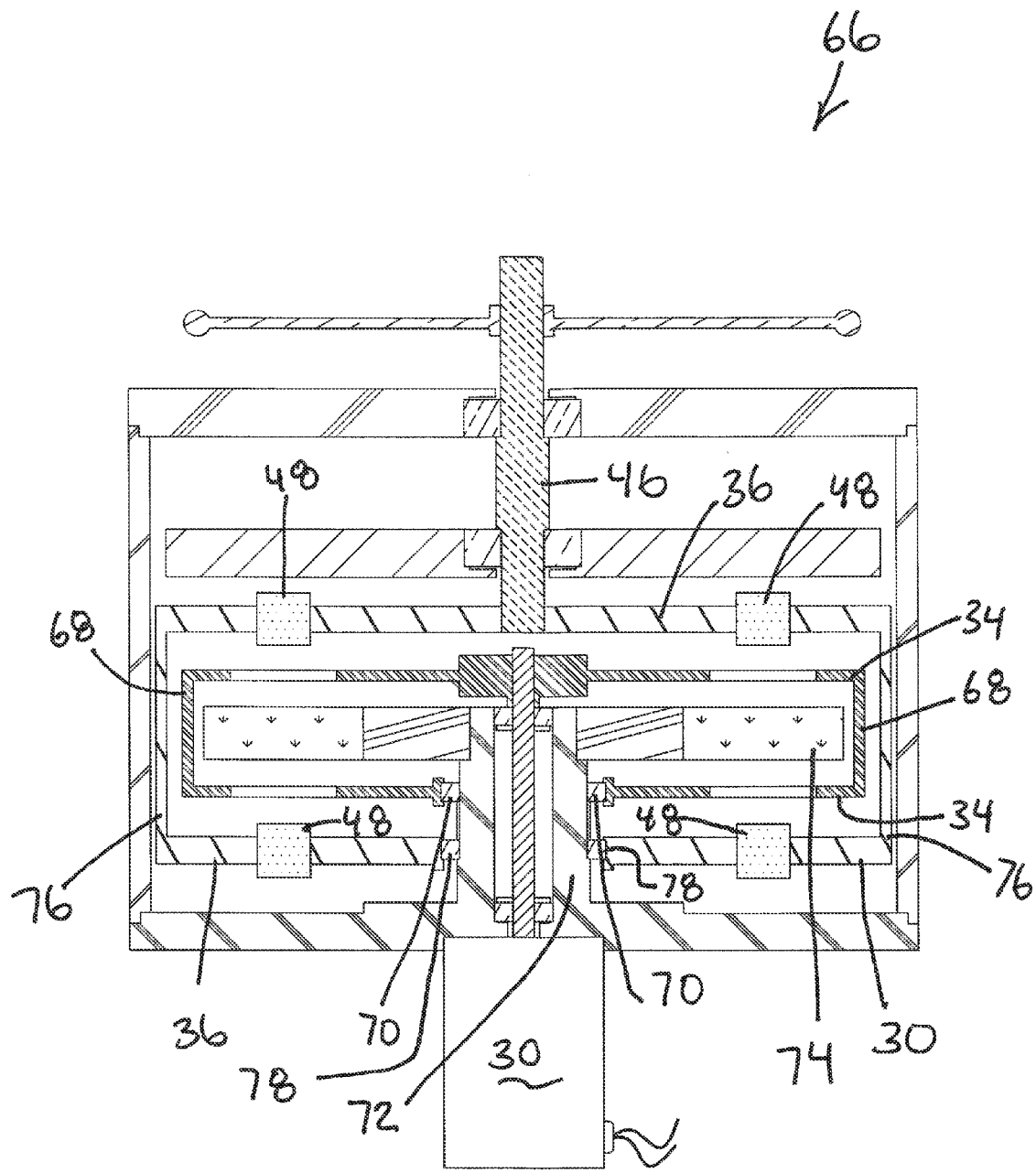
FIG. 17 is a perspective view of a repulsive force conversion drive according to the present invention.

FIG. 17 shows a repulsive force conversion drive 66 that is a form of an inverse version of the repulsive force conversion drive 58 of FIG. 15. The repulsive force conversion drive 66 has a first motion inducing plate 34 connected to the motor shaft 40 and a second motion inducing plate 34 mounted below the first motion inducing plate 34 using support sides 68. The second motion inducing plate 34 rides along bearings 70 that are between the second motion inducing plate 34 and a support shaft 72. Mounted between the first motion inducing plate 34 and second motion inducing plate 34 is a fixed magnet 74. The fixed magnet 74 is shown supported by the support shaft 72. Mounted to the output shaft 46 is a first magnet array disc 36 with disc magnets 48. The first magnet array disc 36 is mounted such that the first motion inducing plate 34 is between the first magnet array disc 36 and the fixed magnet 74. There is a second magnet array disc 36 with disc magnets 48 that is attached to the first magnet array disc 36 by sides 76. The second magnet array disc 36 is mounted such that the second motion inducing plate 34 is between the second magnet array disc 36 and the fixed magnet 74. The second magnet array disc 36 rides along bearings 78 that are between the second magnet array disc 36 and the support shaft 72.

Figure 18:
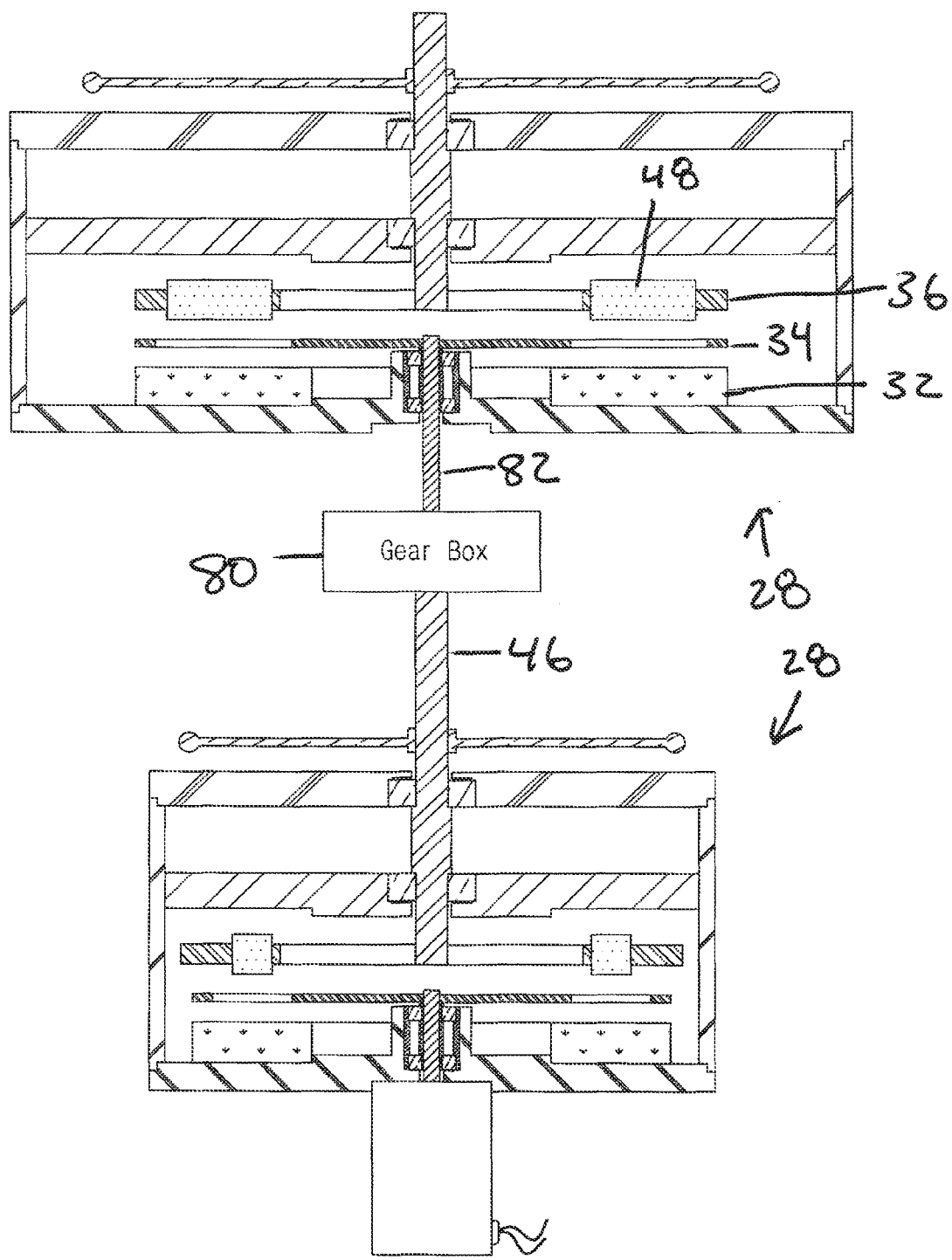
FIG. 18 is a perspective view of a repulsive force conversion drive according to the present invention.

FIG. 18 show a cascading series of repulsive force conversion drives 28 linked together. The repulsive force conversion drives 28 are patterned after the repulsive force conversion drive 28 shown in FIG. 7. The first repulsive force conversion drive 28 includes the small input motor 30. The output shaft 46 is connected to the next repulsive force conversion drive 28 by a gear box 80. There is a gear shaft 82 connected between the motion inducing plate 34 of a second repulsive force conversion drive 28 and the gear box 80. The gear box 80 and gear shaft 82 replace the small input motor 30 in the second repulsive force conversion drive 28. The second repulsive force conversion drive 28 is shown as a larger overall unit having a larger doughnut magnet 32, a larger motion inducing plate 34, a larger magnet array disc 36 and larger disc magnets 48. By connecting repulsive force conversion drives 28 in series, the output of the first repulsive force conversion drive 28 becomes the input of the next repulsive force conversion drive 28 and so on, as additional repulsive force conversion drives 28 are added. In this way, the series of repulsive force conversion drives 28 can produce more power to turn a load.

Figure 19:
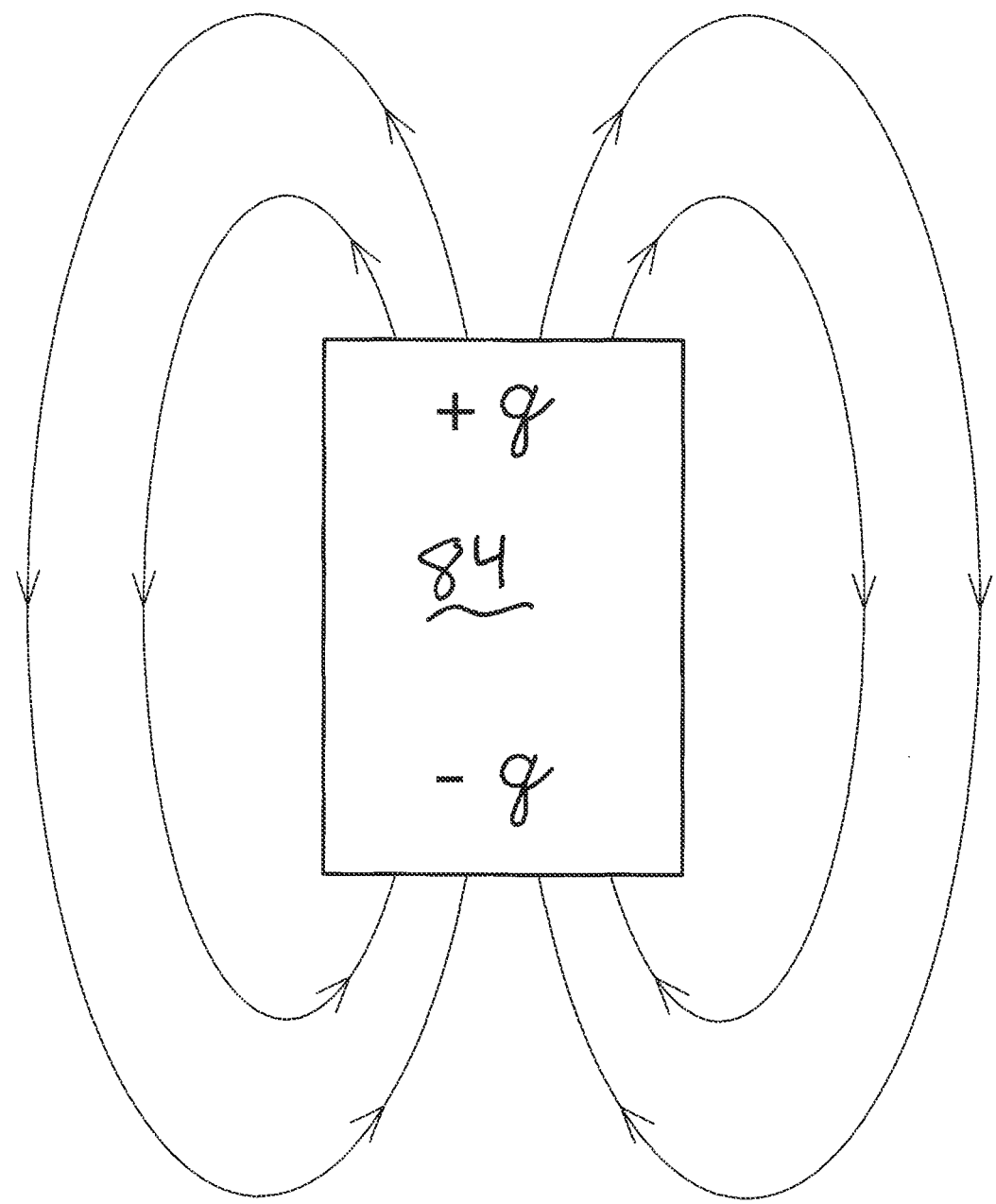
FIG. 19 is a schematic view of an electret.
Figure 20:
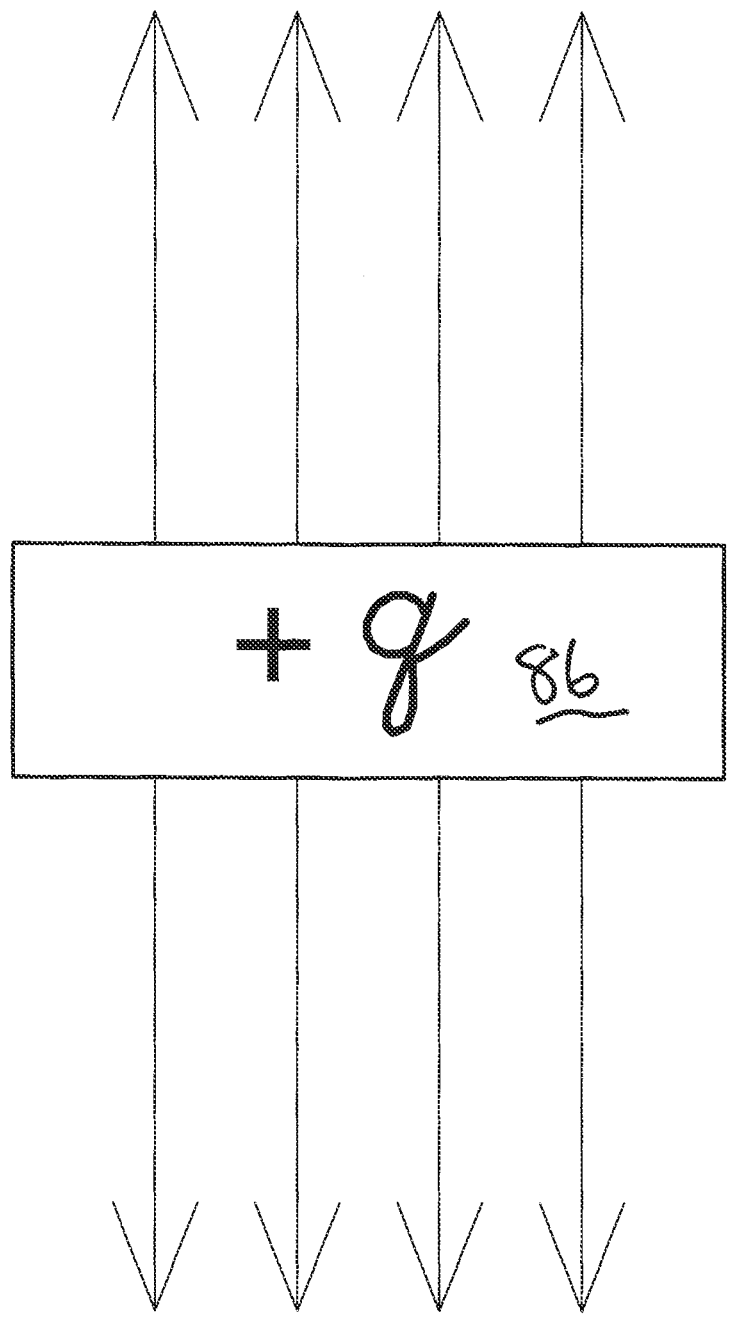
FIG. 20 is a schematic view of an electret.
Figure 21:
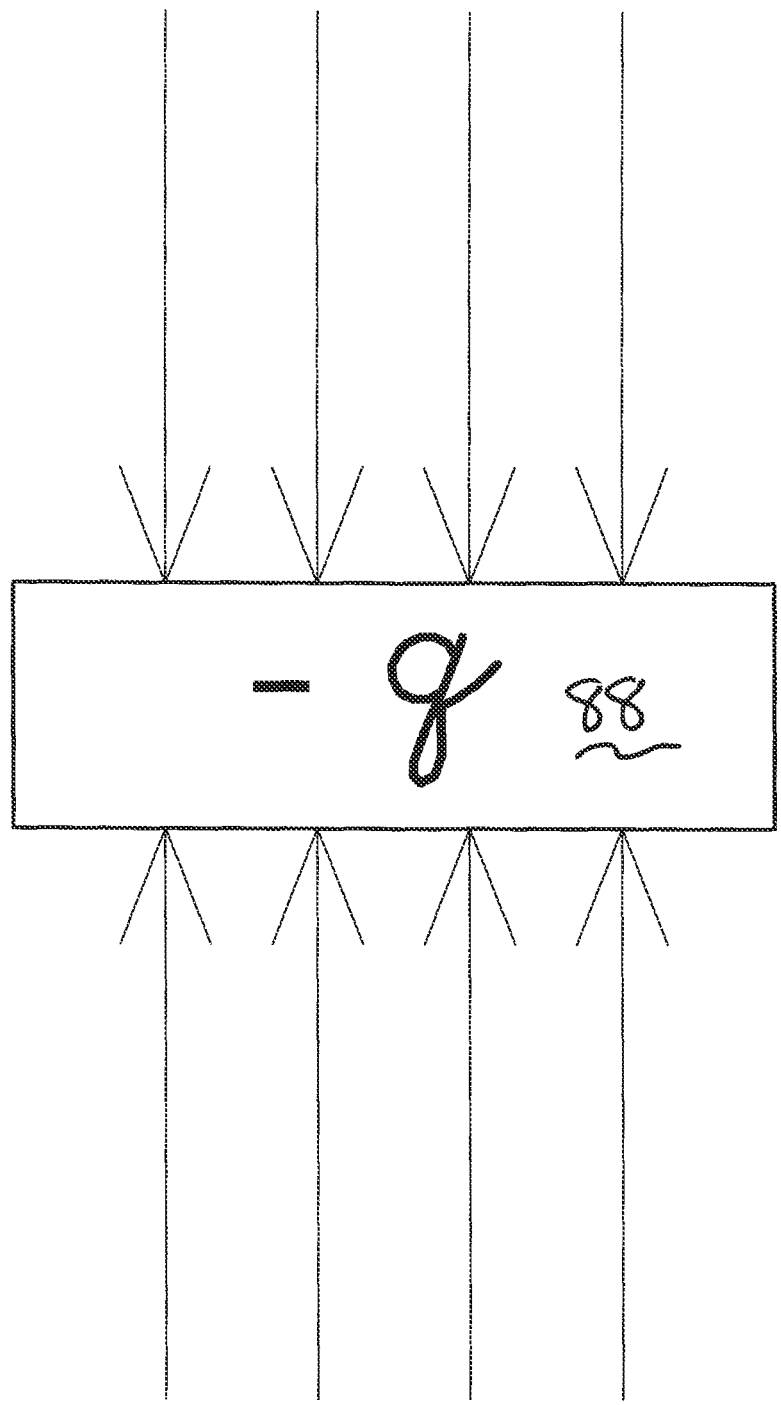
FIG. 21 is a schematic view of an electret.

FIGS. 19-21 show three examples of an electret, which are electrostatic equivalents of a permanent magnet. FIG. 19 shows the first electret is a dipole 84, which has a positive charge (+q) and a negative charge (−q). FIG. 20 shows the second electret 86 only has a positive charge (+q). FIG. 21 shows the third electret 88 only has a negative charge (−q). An electret is a dielectric material that has a quasi-permanent electric charge or dipole polarization. Electret materials are quite common in nature. Quartz and other forms of silicon dioxide, for example, are naturally occurring electrets. Today, most electrets are made from synthetic polymers, e.g. fluoropolymers, polypropylene, polyethyleneterephthalate, etc. Real-charge electrets contain either positive or negative excess charges or both, while oriented-dipole electrets contain oriented dipoles. The quasi-permanent internal or external electric fields created by electrets can be exploited in the present invention.

Figure 22:
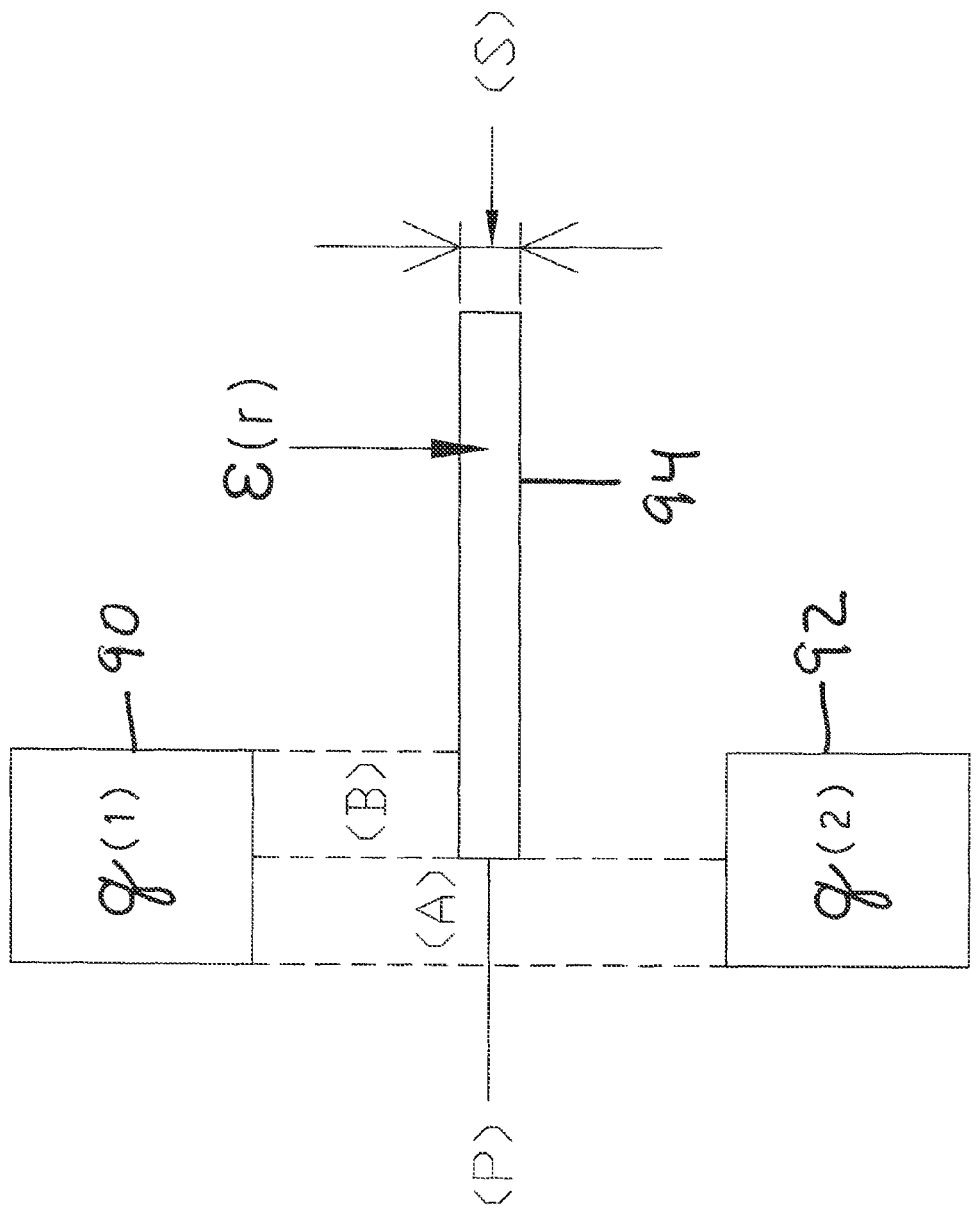
FIG. 22 is a schematic view of two electrets and a motion inducing plate according to the present invention.

FIG. 22 shows two electrets 90, 92 and a motion inducing plate 94 similar to FIG. 5. The two electrets 90, 92 face each other with the same electric charge (+q). Two electrets facing each other with the same electric charge will repel each other in a similar way that magnets repel each other when facing each other with the same polarity. It is not necessary to use a dipole electret in the repulsive force conversion drive, as the single charge electrets can be just as effective. The electret must be designed to maintain the charges on the electret, such that the charges are not lost to the surroundings in which the electret is placed. The main differences between electrets and magnets are the materials, how they are charged, the mathematical equations which govern the repulsive forces and the material type of motion inducing plate which can be used in the repulsive force conversion drive. Electrets can be made from a numerous different materials as compared to magnets. Electrets can be charged or polarized electrically as compared to magnets.

The equations of the forces involved as show in FIG. 22 are as follows. The equation for repulsive force is between the two electrets 90, 92 is:

$$F(1,2) = (1/(4\pi\epsilon_0))(q_{(1)} q_{(2)} / r^2_{(1,2)}), \quad (5),$$

where $q_{(1)}$ and $q_{(2)}$ are the electric charges for each electret; $r_{(1,2)}$ is the distance between the electrets; and $\epsilon_0$ is the dielectric permittivity of a vacuum. Instead of magnetic field strength for each magnet, electrets have an electrical field and electrical field strength associated with each charge of each electret. The electrical field is defined by the symbol $\mathrm{E}$. The electrical field strength at a distance $r_{(1)}$ and $r_{(2)}$ from the electric charge $q_{(1)}$ and $q_{(2)}$ in vacuum, are $\mathrm{E}_1 = (1/(4\pi\epsilon_0))(q_{(1)}/r^2_{(1)})$ and $\mathrm{E}_2 = (1/(4\pi\epsilon_0))(q_{(2)}/r^2_{(2)})$, respectively. The electrical field is smallest between two electrets where $\mathrm{E}_1 = \mathrm{E}_2$, according to $\mathrm{E}_{(p)} = \mathrm{E}_1 - \mathrm{E}_2$. The material type for the motion inducing plate can be an electrical conductor, such as copper or aluminum. The dielectric permittivity of electrical conductors is $\epsilon_r$ and is very high ($\epsilon_r > \epsilon_0$). A motion inducing plate having a very high dielectric permittivity will prevent the charges on the electrets from repelling each other as they reduce the repulsive force between the electrets 90, 92.

Magnets and electrets are two examples which can be utilized as repulsive units in the repulsive force conversion drive to provide the repulsive force which is converted into kinetic energy. It is envisioned that the magnets or electrets can be replaced by other sources which produce a repulsive force that can be converted by using a motion inducing plate to manipulate the repulsive force and convert the repulsive force into kinetic energy. It is also envisioned that any of the components of any of the embodiments disclosed can be used in the other embodiments disclosed. And, while different embodiments of the invention have been described in detail herein, it will be appreciated by those skilled in art that various modifications and alternatives to the embodiments could be developed in light of the overall teachings of the disclosure. Accordingly, the particular arrangements are illustrative only and are not limiting as to the scoop of the invention that is to be given the full breadth of any and all equivalents thereof.

Figure 23:
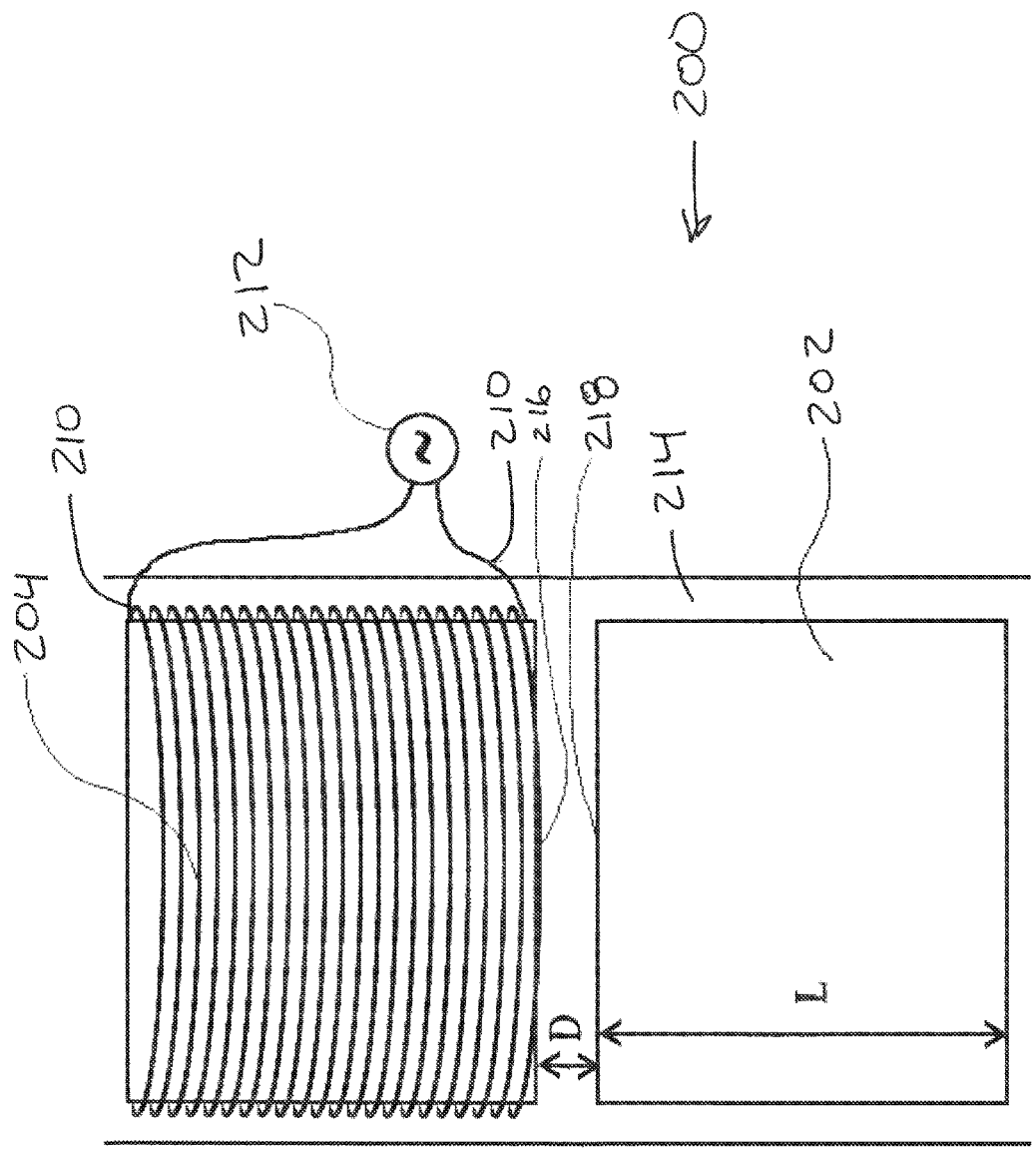
FIG. 23 is a schematic view of a linear repulsive force conversion drive according to the present invention.
Figure 24:
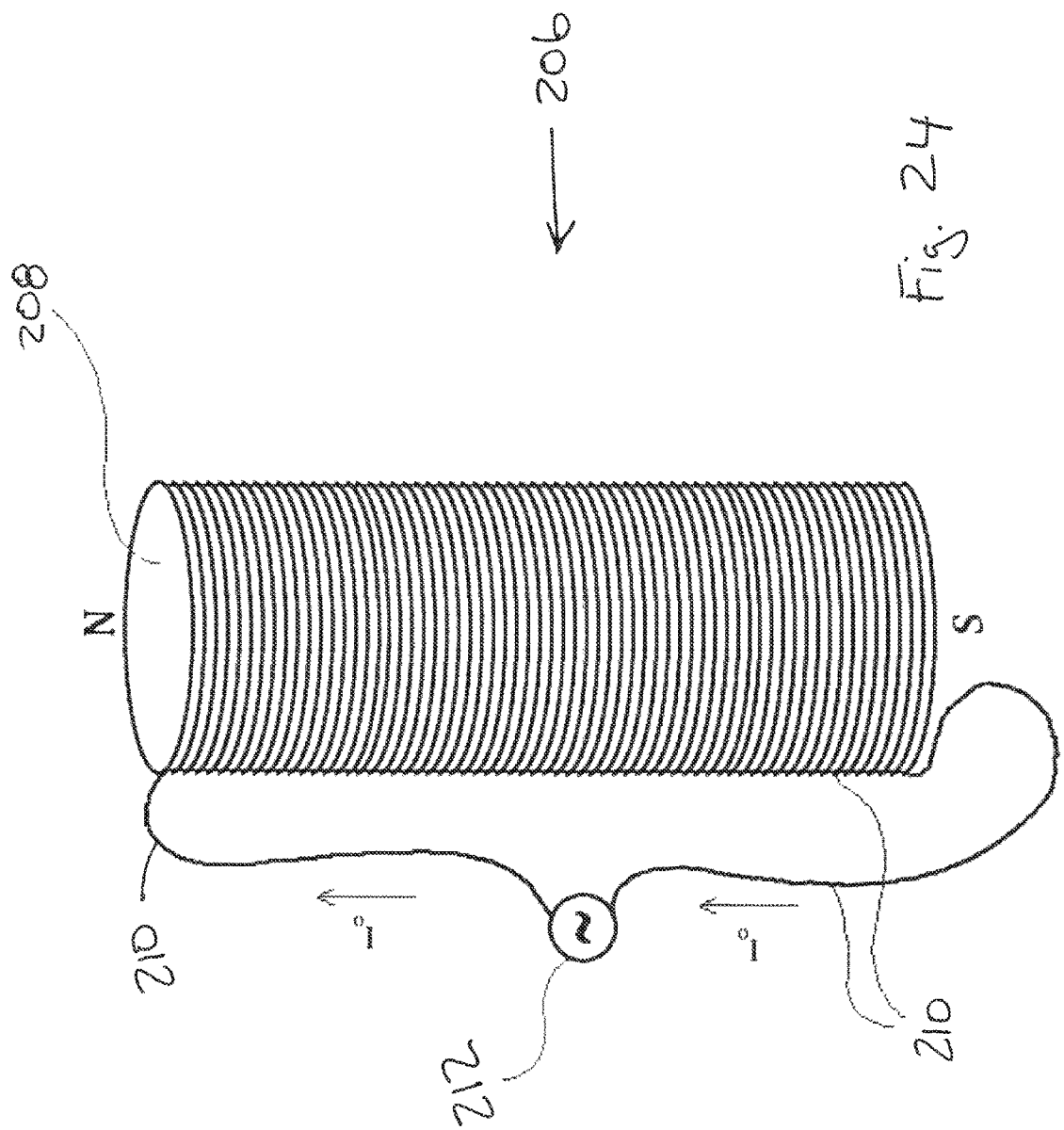
FIG. 24 is a schematic view of a electro magnet according to the present invention.

The above described repulsive force conversion drive of FIGS. 1-22 is rotational in nature and will hereafter be referred to as a rotary repulsive force conversion drive. The basic rotary repulsive force conversion drive includes the fixed magnet as a fixed repulsive unit; a magnet or set of magnets that rotate about an axis as a motion repulsive unit suspended such that the motion repulsive unit and the fixed repulsive unit repulse each other due to a repulsive force that exists between the fixed repulsive unit and the motion repulsive unit; and a magnetic field shielding plate as a motion inducing plate between the fixed magnet and the rotatable magnets and having at least one opening, as described above. The present invention now introduces a linear repulsive force conversion drive 200 using the repulsive force between two magnets, as shown in FIG. 23. FIG. 23 shows a stationary magnet 202 acting as a stationary repulsive unit below a movable magnet 204 acting as a movable repulsive unit, where the movable magnet 204 is allowed to move in a linear direction away and toward the stationary magnet 202. The stationary magnet 202 is typically a permanent magnet and the movable magnet 204 is typically an electro magnet. A typical electro magnet 206 is shown in FIG. 24 having a ferro-magnetic cylindrical core 208 wrapped in wire 210 that is connected to an electrical power supply 212. FIG. 23 shows a magnet chamber 214 used as a housing to contain the stationary magnet 202 and the movable magnet 204. An electro magnet is used so that the magnetic properties of the electro magnet can be turn on and off, as well as having the ability to control and manage the magnetic properties of the electro magnet based on electrical current input from the electrical power supply. An end 216 of the movable magnet 204 faces an end 218 of the stationary magnet 202. End 216 and end 218 are of a same polarity to each other, so when electrical current is applied to the electro magnet, the movable magnet 204 moves upward away from the stationary magnet 202 due to the repulsive force created between the stationary magnet 202 and the movable magnet 204. For return of the movable magnet 204 towards the stationary magnet 202, the electrical current is adjusted to remove the repulsive force between the stationary magnet 202 and the movable magnet 204, which allows the movable magnet 204 to return toward the stationary magnet 202 due to gravity. The electrical current can also be changed to the movable magnet 204, such that the stationary magnet 202 and the movable magnet 204 are attracted to each, causing the movable magnet 204 to move faster towards the stationary magnet 202, as compared to the return when only using gravitational forces. Also, it is possible to use an electro magnet for the stationary magnet 202 so that the properties of the stationary magnet 202 can be controlled in a similar manner to that described for the movable magnet 204. In any case, it is desirable that the movable magnet 204 must be controllable, whether it is an electro magnet, some other type of controllable magnet or some other type of paired repulsive devices, in order to turn on and off the repulsive force between the stationary magnet 202 and the movable magnet 204.

The governing force between the stationary magnet 202 and the movable magnet 204 is the magnetic repulsive force $F_R$, which is defined by the following equation.

$$F_R = (m_1)(m_2)/4(\pi)(\mu_o)(D)^2 \text{ [Newton]}, \qquad (6)$$

Where $A_1$ and $A_2$ are the surface areas in [Meters] of the movable magnet and the stationary magnet, respectively. Where $B_1$ and $B_2$ are the magnetic field strength in [Tesla] of the movable magnet and the stationary magnet, respectively. Where $\mu_o = 4(\pi) \times 10^{-7}$ is the magnetic permeability of vacuum and $1/[4(\pi)(\mu_o)] = 6.33 \times 10^4$. D is the distance in [meters] between two magnets, whereby the further the distance the magnets are apart, the weaker the magnetic repulsive force. Where $m_1$ is the magnetic dipole moment of the movable magnet 204 and $m_2$ is the magnetic dipole moment of the stationary magnet 202 and where $m_1$ and $m_2$ are defined as: $m_1 = (B_1)(A_1)$ [Weber] and $m_2 = (B_2)(A_2)$ [Weber] The magnitude of $m_1$ when the movable magnet 204 is an electro magnet can be adjusted by changing either electrical current I and/or changing the surface area $A_1$ of cylindrical core. The magnitude of $m_2$ of the stationary magnet 202 can be adjusted by changing either the surface area $A_2$, and/or the length L of the stationary magnet 202. In general, the two surface areas of $A_1$ and $A_2$ should be the same to optimize the interaction efficiency of the movable magnet 204 and the stationary magnet 202. A desired repulsive force $F_R$ can be generated between the stationary magnet 202 and the movable magnet 204 by manipulating the electric current to the electro magnet acting as the movable magnet 204. The stationary magnet 202 can also be an electro magnet so that it can be controlled in the same manner as the movable magnet 204. Also, the use of the electro magnet can be substituted with any controllable magnet that can be turned off and on, as well changing its polarity and magnetic strength.

The movable magnet 204 of the linear repulsive force conversion drive 200 moves on command away from and towards the stationary magnet 202. A device can be attached to the movable magnet 204, such that movement of the movable magnet 204 will cause movement of the device, when there is enough repulsive force between the stationary magnet 202 and the movable magnet 204 to move both the movable magnet 204 and the device. The device can a load type device to cause further movement or produce useable energy. Therefore, FIG. 23 shows a linear repulsive force conversion drive 200 that can drive a device upon movement of the movable magnet 204 based on creating and removing a repulsive force between the stationary magnet 202 and the movable magnet 204.

The present invention introduces a novel concept of utilizing the centrifugal force $F_C$ arising from the total rotating mass of magnets in the rotary repulsive force conversion drive. Both the rotary repulsive force conversion drive and the linear repulsive force conversion drive individually provide energy amplification over the input energy, but together they can take advantage of the centrifugal force $F_C$ created by the rotating magnets of the rotary repulsive force conversion drive and provide energy amplification that outweighs either one individually. Together the rotary repulsive force conversion drive and the linear repulsive force conversion drive are used to convert the rotating kinetic energy from the centrifugal force $F_C$ of the rotary repulsive force conversion drive to various other forms of energy using the linear repulsive force conversion drive.

Figure 25:
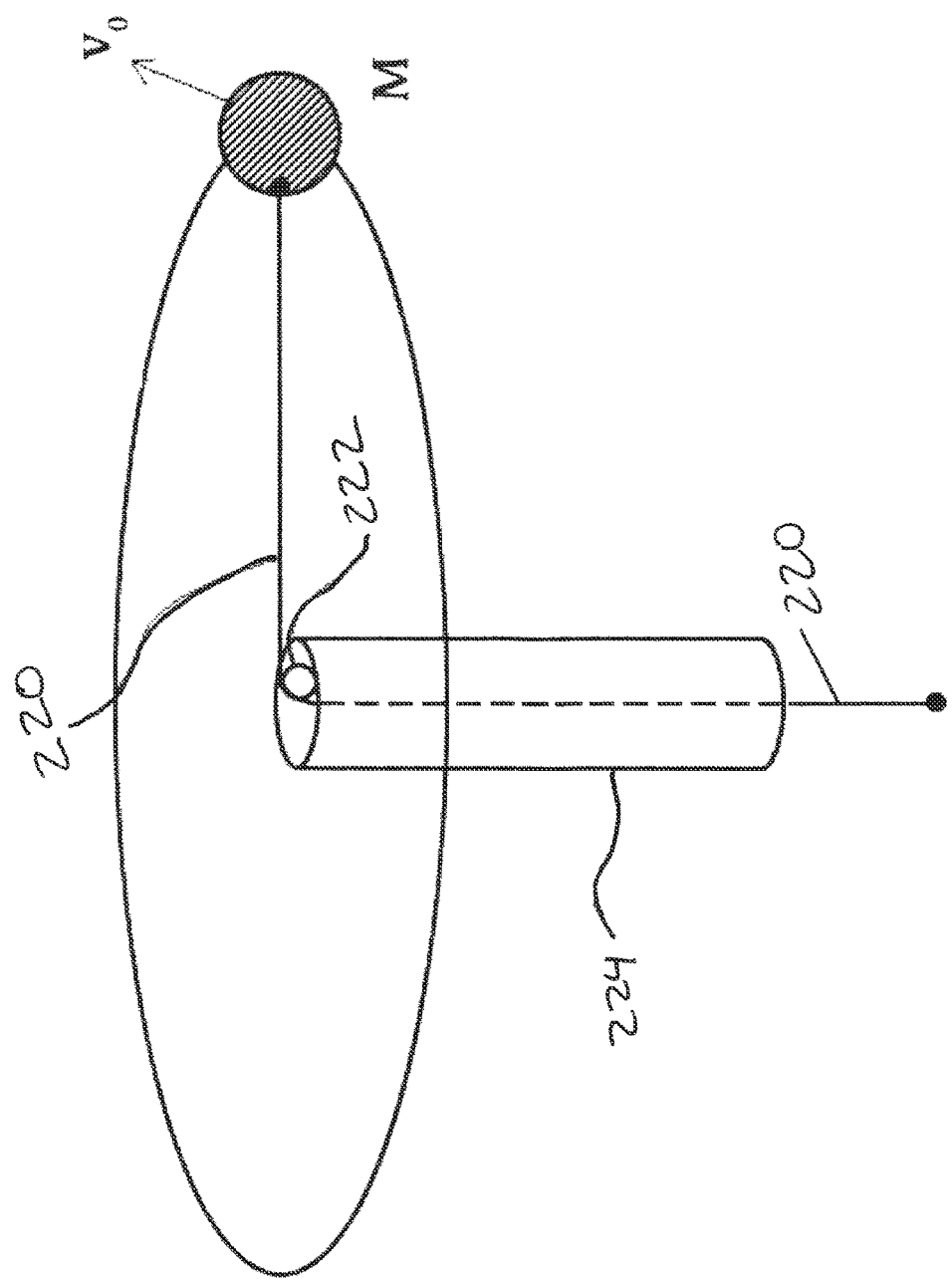
FIG. 25 is a schematic view of a centrifugal force conversion concept according to the present invention.

It is well established that centrifugal force $F_c$ exists in all rotating mass. FIG. 25 shows a rotating mass M with a velocity $v_o$ and an angular frequency of $w_o = v_o/r_o$ that is attached to a cable of radius $r_o$. The magnitude of centrifugal forces $F_C$ for a mass rotating on the motion repulsive unit of the rotary repulsive force conversion drive can be about 600 to 800 times larger than the magnitudes of the perpendicular force acting on the same rotating mass. The arrangement shown in FIG. 25 is one of the key concepts added to the rotary repulsive force conversion drive, in order to use the centrifugal forces created during rotation of the rotating magnets of the rotary repulsive force conversion drive. In FIG. 25, a cable 220 is attached to a magnet that acts as a mass M and the cable 220 is re-directed through a bearing 222 to a load point P. The mass M connected to the cable 220 does not have to be the magnets of the rotary repulsive force conversion drive, but it is convenient and efficient to use the magnets as the mass M to transfer and convert the centrifugal force to a useable force. A tube 224 is shown that is used to protect the cable 220 and rotate with the mass M, along with the bearing 222 to allow the cable 220 to change direction downward from the rotating mass M. The centrifugal force $F_C$ is defined by the following equation.

$$F_C = (M)(r_o)(\omega_o)^2 \text{ [Newton]}, \quad (7)$$

Where M, $r_o$, and $\omega_o$, are the mass [Kg], the rotating radius [Meter], and the angular frequency, respectively. If the cable 220 is pulled at load point P so that the mass M moves from $r_o$ to $r_1$ by a distance $d_r$, then work and power are required to move the mass the distance $d_r$ under the influence of the centrifugal force $F_c$ and would be defined by the following: Work=$W_C$=($F_C$)($d_r$) [Joules] and Power=$P_C$=($F_C$)($v_D$) [Watts]. Where $v_D$ is time derivate dD/dt of the displacement D that equals the movement of the mass M along distance $d_r$, and also distance that the movable magnet 204 moves away from the stationary magnet 202 of the linear repulsive force conversion drive 200. In reverse, work and power are generated by the centrifugal force $F_C$ when the cable 220 is released and the mass M moves back to $r_o$ due to the centrifugal force $F_C$ and would also be defined by the same equations for Work and Power. The centrifugal force $F_C$ of the mass M acting on the cable 220 is in the radial direction, so that the torque is zero as the cable 220 is pulled and released when moving the mass M along the displacement distance $d_r$.

Figure 26:
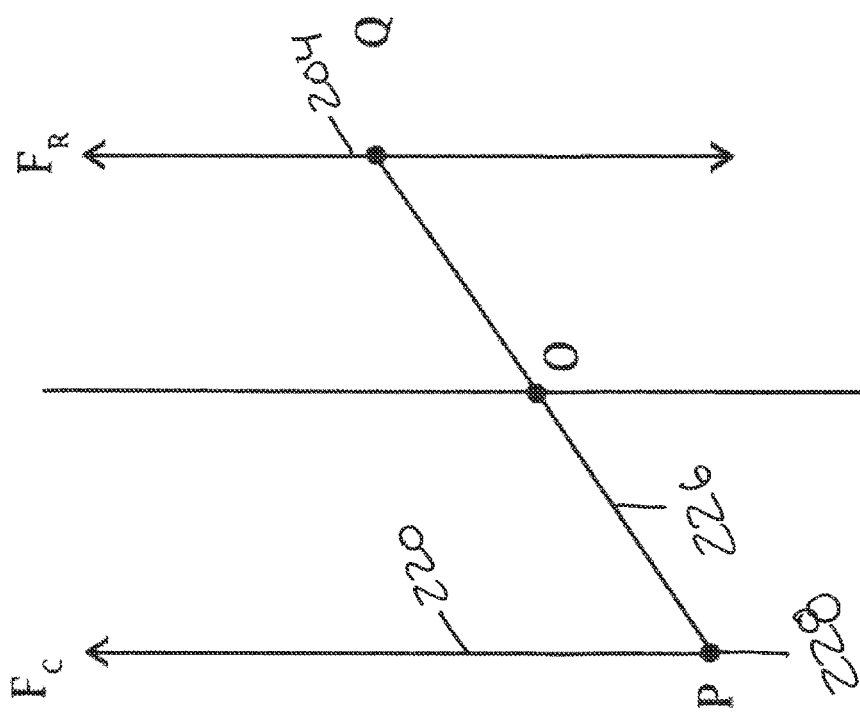
FIG. 26 is a schematic view of a motion coupling mechanism according to the present invention.
Figure 27:
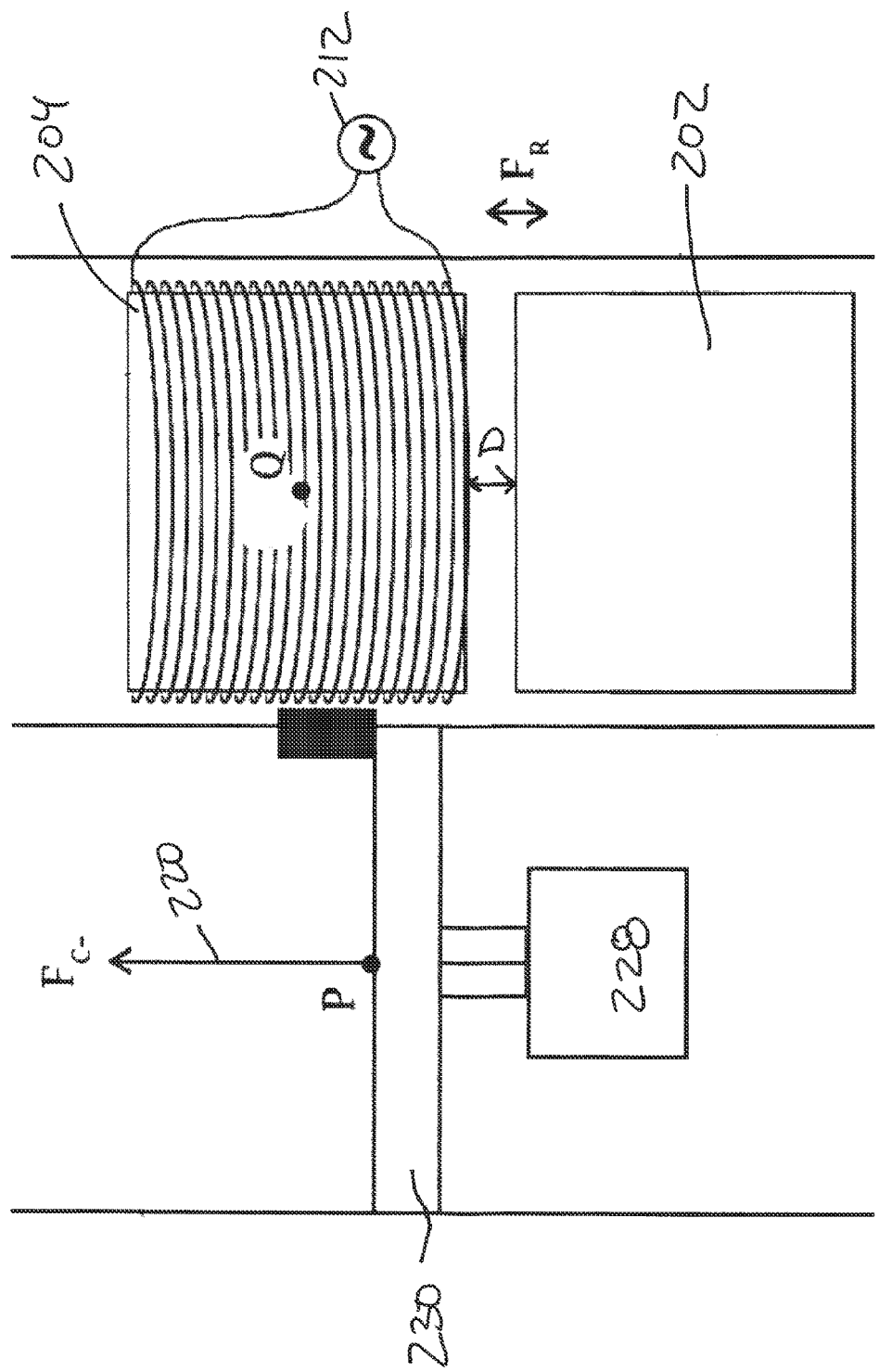
FIG. 27 is a schematic view of coupling a linear repulsive force conversion drive to a load according to the present invention.

FIG. 26 shows a schematic of a motion coupling mechanism 226 coupling a operational load 228 to the movable magnet 204 of the linear repulsive force conversion drive 200 and to the cables 220 attached to each magnet of the rotary repulsive force conversion drive. The load 228 is a operational load that can be further connected to an external load, where examples of an external load is a generator or a transmission that drives a device. In order to operate the various types of external loads, such as a generator or transmission, the centrifugal force $F_C$ along the cable 220 of FIG. 26 needs to be converted to an oscillation motion back and forth along the cable path. This conversion can be achieved by using the linear repulsive force conversion drive 200 in combination with the rotary repulsive force conversion drive. FIG. 27 shows a more detailed version of FIG. 26 with the linear repulsive force conversion drive 200 of FIG. 23.

The load point P is the focal point of the pulling of the cables 220 and hence pulling on the centrifugal forces $F_C$ created by the individual masse $M_i$ attached to the cables 220 of rotary repulsive force conversion drive. In FIGS. 26-27, the point Q is a fictitious point located on the movable magnet 204. Point 0 is transverse rotation point located between two points P and Q, whereby point P moves linearly in the opposite direction to the linear movement of point Q that is associated with the movable magnet 204. By introducing the movement of the movable magnet 204 due to the magnetic repulsive force of $F_R$, point P can be moved up and down due to the movement of the movable magnet 204. The magnitude and direction of the repulsive force $F_R$ can be chosen by design of the movable magnet 204 and stationary magnet 202 as discussed for the linear repulsive force conversion drive 200.

Figure 28:
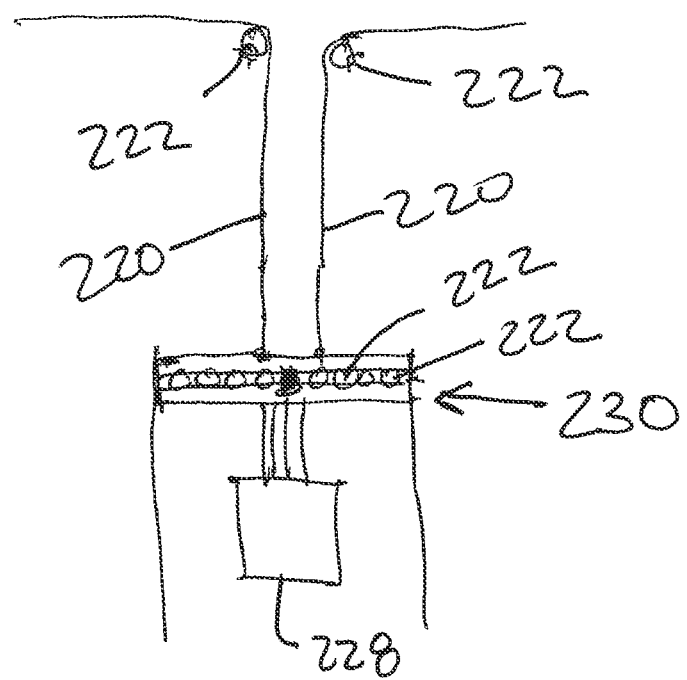
FIG. 28 is a schematic view of a load coupling device according to the present invention.
Figure 29:
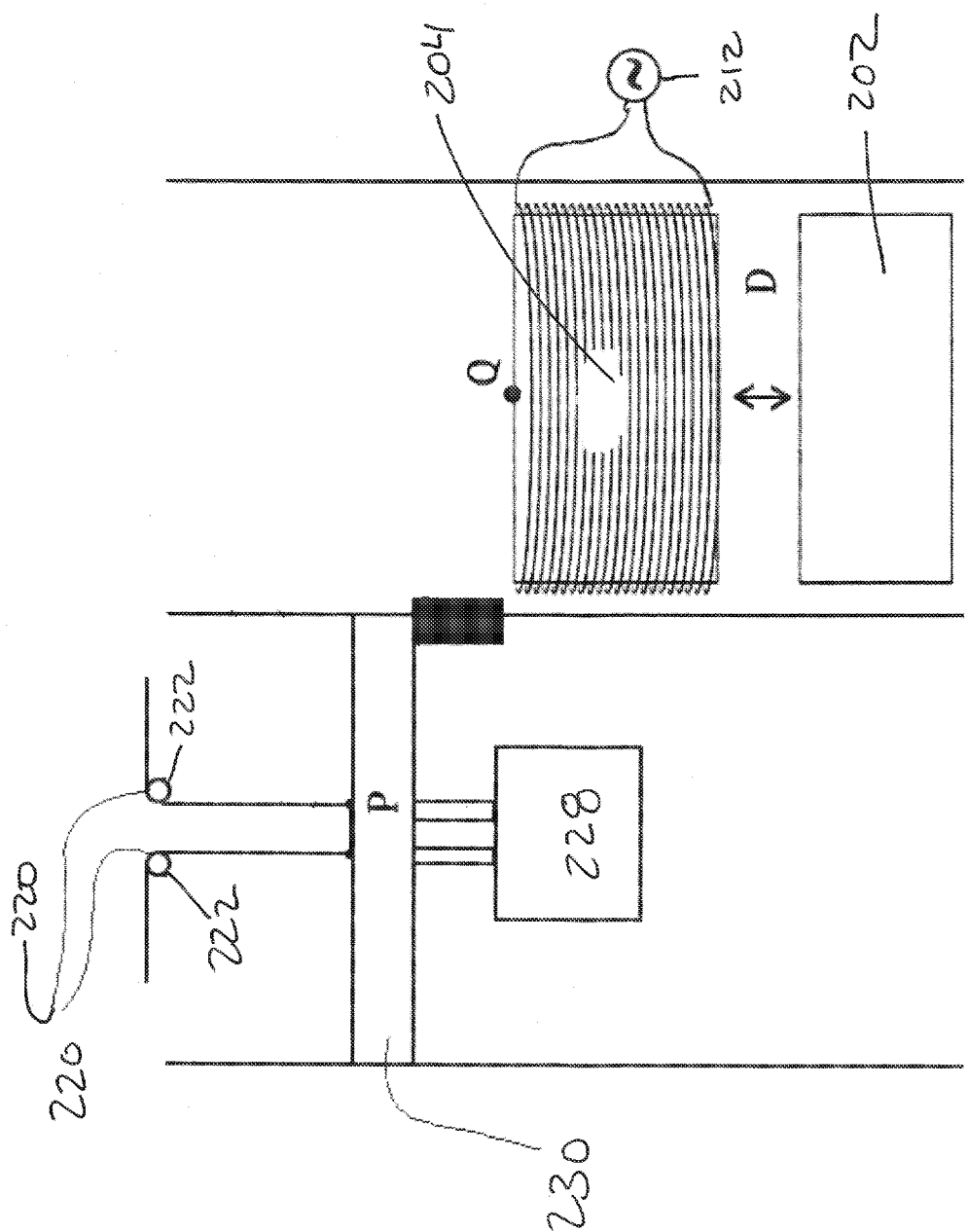
FIG. 29 is a schematic view of coupling a linear repulsive force conversion drive and a rotor repulsive force conversion drive to a load according to the present invention.

FIG. 27 shows a load coupling device 230 connected between the load 228 and the cables 220 at point P. The centrifugal force $F_C$ acts on the load coupling device 230 due to the connection to the cables 220 at point P. The load coupling device 230 should include a feature that allows the cables to rotate while the point P moves up and down due to the movement of the movable magnet 204. The feature can be as simple as bearings 222 between the connection of the load coupling device 230 and point P and the connection of the load coupling device 230 to the load 228, as shown in FIG. 28. FIG. 29 is a schematic diagram showing more detail with multiple cables 220 over bearings 222 that are connected to the load coupling device 230 at point P.

Figure 30:
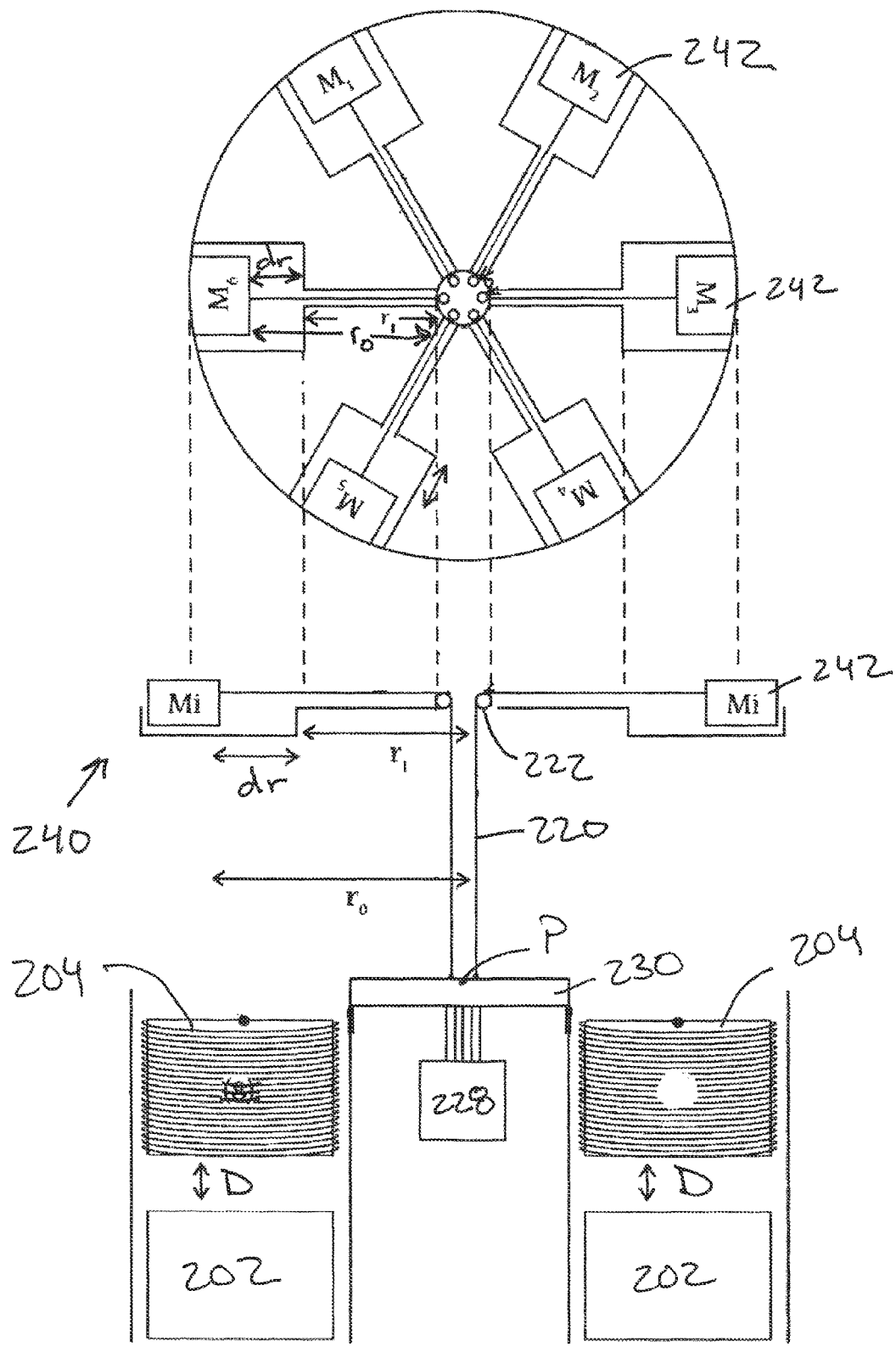
FIG. 30 is a schematic view of coupling a linear repulsive force conversion drives and a rotor repulsive force conversion drive to a load according to the present invention.

FIG. 30 shows a schematic diagram of top and cross sectional view of the combination of two linear repulsive force conversion drives 200 and a rotary repulsive force conversion drive 240 coupled to a load 228 in the same manner as FIGS. 26-29. Note, the fixed magnet and magnetic field shielding plate for the rotary repulsive force conversion drive 240 is not shown for clarity, but would be positioned above the rotating magnets and have a power source to rotate magnetic field shielding plate and are explained in detail in other sections of the application. The two linear repulsive force conversion drives 200 have the movable magnets 204 coupled to the load coupling device 230 which is connected between the cables 220 and the load 228. The rotary repulsive force conversion drive 240 is shown with six magnets 242 that rotate about an axis. The cables 220 move downward along the axis from each magnet 242. Each magnet 242 can freely slide along the path of each cable 220 attached to the magnet 242 to allow for movement along the displacement distance $d_r$. The total rotating mass $M_T$ of the rotary repulsive force conversion drive 240 is $M_T = M_1 + M_2 + M_3 + M_4 + M_5 + M_6$, where $M_{1-6}$ are the mass of each of the rotation magnets 242 of rotary repulsive force conversion drive 240. The total mass $M_T$ of the rotary repulsive force conversion drive 240 can also include additional non-magnetic mass attached to the cables 220 that may be necessary to obtain the desired magnitude of the centrifugal force $F_C$ from the rotary repulsive force conversion drive 240. The cables 220 attached to each mass can be protected and guided by a grooved jacket made of non-magnetic and light but strong materials such as the graphite composites.

The rotating masses $M_{1-6}$ of FIG. 30 will rotate with an angular frequency of $w_o$; will oscillate along the radial direction of the cables for the displacement distance $d_r = r_o - r_1$; and will have an oscillation angular frequency of $w_i$ during movement of the rotating masses $M_{1-6}$ along the displacement distance $d_r$. It is desirable to design the rotating angular frequency $w_o$ of rotary repulsive force conversion drive to be larger than that the oscillation angular frequency $\omega_1 = 2(\pi)(f_1)$, where $f_1$ is the oscillation frequency of the each mass along the displacement distance $d_r$. The oscillation frequency $f_1$ can be chosen by adjusting total mass, $M_T$ and cable radius, $r_o$. The centrifugal force $F_C$ is the function of the total rotating mass $M_T$ and the rotation angular frequency $\omega_o$ and the rotating radius $r_0$, as expressed in the Equation (7).

The total output power $P_o$ generated by the oscillating the mass attached to the cables along the displacement distance $d_r$, which has an oscillating frequency $f_1 = \omega_1/2(\pi)$) along the displacement distance $d_r$ can be written as follows.

$$P_O = [(F_C) + (F_R - F_C)](v_d)(f_1) \text{ in [Watts]} \quad (8)$$

Where $V_D$ is the displacement velocity or driving velocity of the load 230. The driving velocity of the load 240 is the desired or required velocity to move the load 240. The load driving velocity $v_D = (dD/dt)$ [Meter/Second] is determined by both $F_C$ and $F_R$ in [Newton] and the required main load torque $N_L$ [Newton*Meter] to drive the load. Note, the main load torque $N_L$ and output power level $P_O$ are usually pre-determined quantities depending on the nature of the load 240 and desired output power level from the load 240. The magnitude of the magnetic repulsive force $F_R$ can be found as the same magnitude of $F_c$ at the distance $D=d_r$, between two magnets from the Equation (6). The values of $(m_1)$, $(m_2)$, $(A_1)$, $(A_2)$, and length L of stationary magnet can be calculated with consideration of other practical requirements such as total system size and weight.

Once the desired power level $P_O$ [Watts] and the magnitude of load torque, $N_L$ [Newton*Meter] are determined for an application, then the necessary centrifugal force, $F_C$[Newton]; oscillation displacement distance $d_r$[meters]; and oscillation angular frequency $\omega_1=2(\pi)(f_1)$, can be calculated from the values of the desired power $P_O$ and load torque $N_L$. By using the Equation (7) for $F_C$, the total mass $M_T$ and rotational radius $r_o$ and angular frequency $\omega_o$ can be calculated. Also the magnetic repulsive force $F_R$ can be found from $F_c$. From the Equation (6) and with $F_C$ and displacement distance $d_r$ values, $m_1$ and $m_2$ can be also calculated. The movable magnet 204 and stationary magnet 202 can be designed according to the calculated $m_1$ [Weber] and $m_2$ [Weber] magnetic dipole moment values. Also, the quantity of linear repulsive force conversion drives 200 that would be coupled to the load 240 can be determined, as the more linear repulsive force conversion drives used, the less amount of current will the used with each linear repulsive force conversion drive. This kind of approach would help to design a whole system that needs to take in account constrains such as space and weight of the system for the desired power output level. By distributing required contributions of the linear repulsive force conversion drives for a required $F_R$, a more flexible design can be achieved.

The following example simulates the design of a system using the above discussions. An output power is $P_O=3.4$ [KWatts] which is equivalent to a 4.5 HP or 50 cc engine, which is equivalent to a motorcycle engine is desired. It is known that the Load Torque from the load will be $N_L=10$ [Newton*Meter], according to design parameters of the load, which can be based on power output required and size constraints. For example the Load Torque could be the requirement to turn the rear wheel of a motorcycle. It is desired to have a maximum rotating radius of $r_o=1\times10^{-1}$ [Meter] for the rotating magnets of the rotary repulsive force conversion drive and an oscillation displacement distance $d_r=1\times10^{-2}$ [Meter] for movement of the rotating magnets of the rotary repulsive force conversion drive along the cable path, due to sizing constraints. The average velocity of the load due to movement of the rotating magnets of the rotary repulsive force conversion drive under the influence of centrifugal force is denoted by $V_1$. The average velocity of the load due to movement of the movable magnet is denoted by $V_2$. $V_1$ can be shown to be $V_1=[(F_C)(d_r)/(2M_L)]^{1/2}$ and $V_2$ can be shown to be $V_2=V_1/[2]^{1/2}$, where $M_L$ is the mass of the load. $F_C$ can be shown to be $F_C=[(4M_L)(P_O)[(V_1+V_2)/(V_1+2V_2)]]^{1/2}$. Knowing these relationships, it can be determined that that $[(V_1+V_2)/(V_1+2V_2)]=1/[2]^{1/2}=0.707$. It can also be shown that $M_L$ is approximately equal to 100 [Kg], knowing that the desired torque from the load is $N_L=10$ [Newton*Meter]. So, for case 1, $F_C$ can determined to be $F_C=[(4M_L)(P_O)[(V_1+V_2)/(V_1+2V_2)]]^{1/2}=[(4)(100)(3400)[0.707]]^{1/2}25$ 980[Newton]. Knowing $F_C=980$[Newton], $V_1=[(980)(0.001)/(2(100))]^{1/2}=0.2214$ and $V_2=0.1565$. It can be shown that the oscillation frequency $f_1$ of the rotating magnets along the displacement distance $d_r$ is $f_1=[(V)(V_2)]/d_r[(V_1+V_2)]=9.12$ [Hz] and oscillation angular frequency $\omega_1=2(\pi)f_1=57.3$ and revolutions per minute=$60 f_1=547.2$ RPM. The angular frequency $\omega_o$ of rotating magnets of the rotary repulsive force conversion drive can be set at 114.6 giving rotating total mass $M_T$ of 0.74 [Kg], per the relationship $F_C=(M)(\omega_o)^2(r)$, by inputting $980=(M)(114.3)^2(1\times10^{-2})$. This means that for one oscillation for the load moving both directions, there are two revolutions of mass $M_T$ of the rotary repulsive force conversion drive. This ratio $f_o/f_1$ can be chosen within reasonable range by adjusting of total rotating mass $M_T$, where $f_o$ is the oscillation frequency of the rotating mass $M_T$ in the rotating direction. Knowing that $F_R=(m_1)(m_2)/4(\pi)(\mu_o)(D)^2$ and that $F_R=F_C$ when $D=d_r=1\times10^{-2}$ [Meter] and knowing that $1/[4(\pi)(\mu_o)]=6.33\times10^4$, then $F_C=6.33\times10^4 (m_1)(m_2)/(1\times10^{-2})^2$ and $(m_1)(m_2)=1.548\times10^{-6}$ [wb]$^2$ when $F_C=980$ [N]. Knowing that $(m_1)(m_2)=1.548\times10^{-6}$ [Wb$^2$] allows for the design of the movable magnet and the stationary magnet of the linear repulsive force conversion drive based on size parameters faced by the designer. For example, one might chose to have more than one linear repulsive force conversion drive based on the what $(m_1)(m_2)$ equals, because the use of more than one linear repulsive force conversion drive is additive and allows for the reduction of the $(m_1)(m_2)$ for each linear repulsive force conversion drive used in order to reach the required $(m_1)(m_2)$ for the system.

Figure 31:
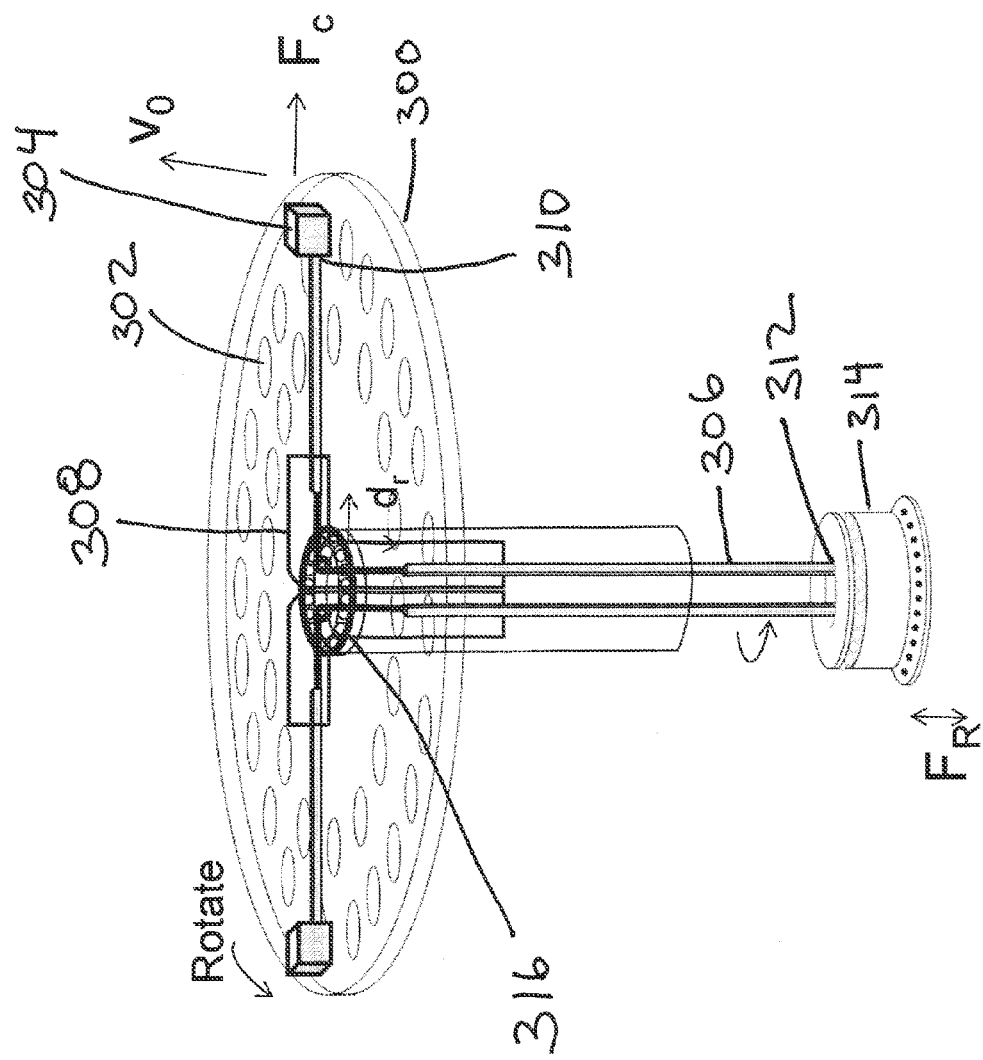
FIG. 31 is a perspective view of a rotor repulsive force conversion drive according to the present invention.

FIG. 31-47 shows a conceptual representation of the present invention invoking the principles of FIGS. 23-30 using practical mechanical components. FIG. 31 shows components that will be further explained in FIGS. 32-47. FIG. 31 shows a support dish 300 which includes disc magnets 302 embedded in the support dish 300. There are rotating magnets 304 that represent the Mi of FIG. 30. Interaction of the disc type magnets 302 with the rotating magnets 304 provides a magnetic suspension to suspend the rotating magnets 304 above the support disc 300 with a cushion of air between them. This configuration allows for rotation of the rotating magnets 304. Each rotating magnet 304 is attached to a three section link 306. The three section link 306 is the practical component for the cable 220 shown used for the connection between the mass Mi and load coupling device 230 of FIG. 30. Each three section link 306 travels through a bending prevention structure 308. One end 310 of the three section link 306 is connected to the rotating magnet 304. The other end 312 of the three section link 306 opposite the rotating magnet 304 is attached to a vertical bearing 314. Where, the vertical bearing 314 is the practical component for the load coupling device 230 of FIG. 30. The support dish 300 includes a rotation bearing 316 of ball bearings to support and allow rotation of the bending prevention structures 308 about the support dish 300.

Figure 32:
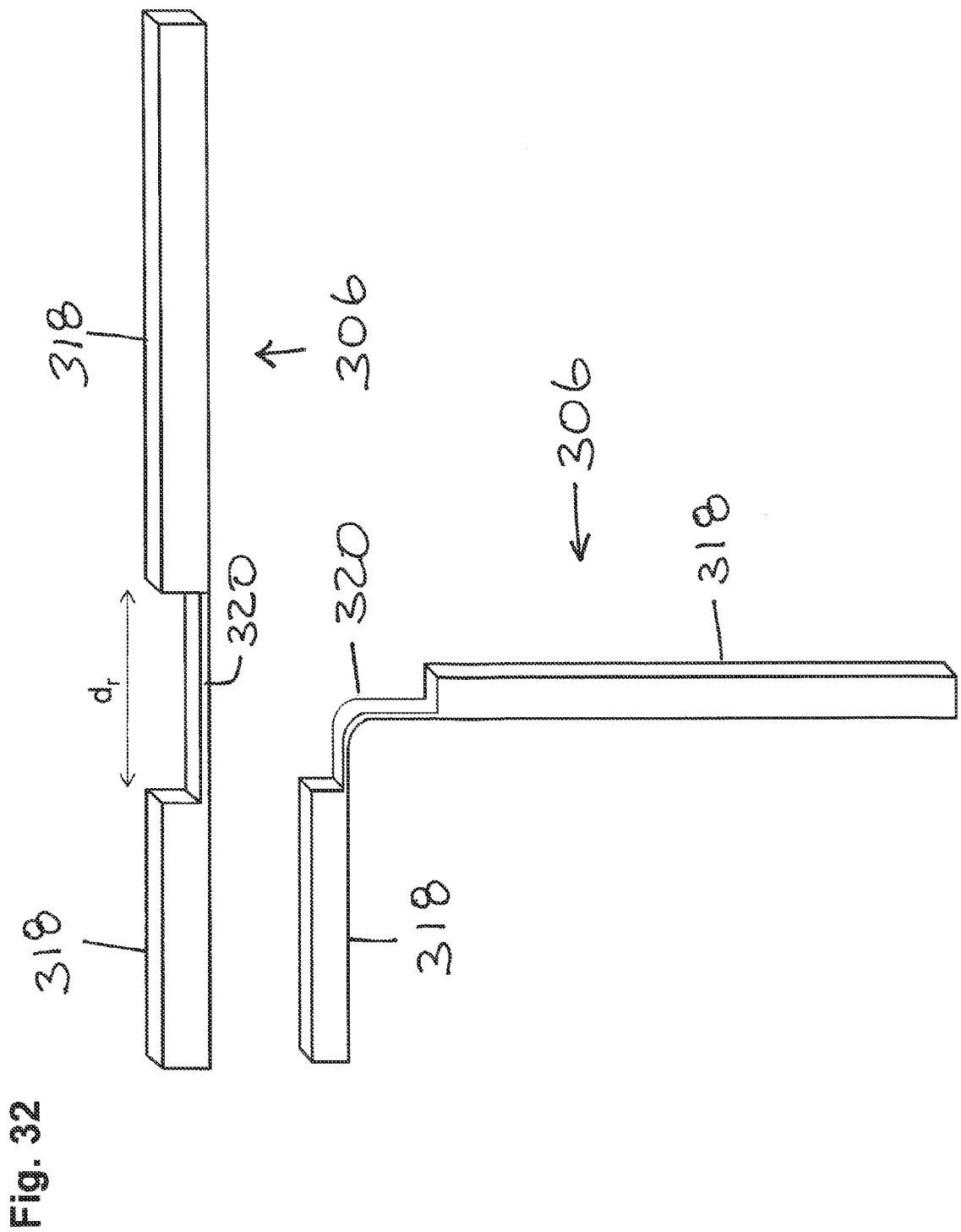
FIG. 32 is a perspective view of a three section link according to the present invention.

FIG. 32 shows a close up of the three section link 306. The three section link 306 allows for coupling the rotational movement of Mi of the rotating magnets 304 due to the centrifugal force, Fc and the up and down movement of vertical bearing 314 due to the magnetic repulsive force, $F_R$. Where the up and down movement of vertical bearing 314 due to the magnetic repulsive force, $F_R$ is the displacement of $d_r$. The three section link 306 has three sections. Two of the sections 318 are of a rigid rod connected by a thin ribbon section 320. The thickness and width of thin ribbon section 320 could be less than 0.2 mm and 2 Cm, respectively. The thin ribbon section 320 can bend easily along thickness direction and is flexible enough to move up and down at 90 degree bend. Due to the characteristics of the thin ribbon section 320, bending about the width of the thin ribbon section 320 is more difficult. The thin ribbon section 320 can be made of very rigid and strong lightweight materials such as the stainless steel or the graphite fiber based composites or engineering plastics.

Figure 33:
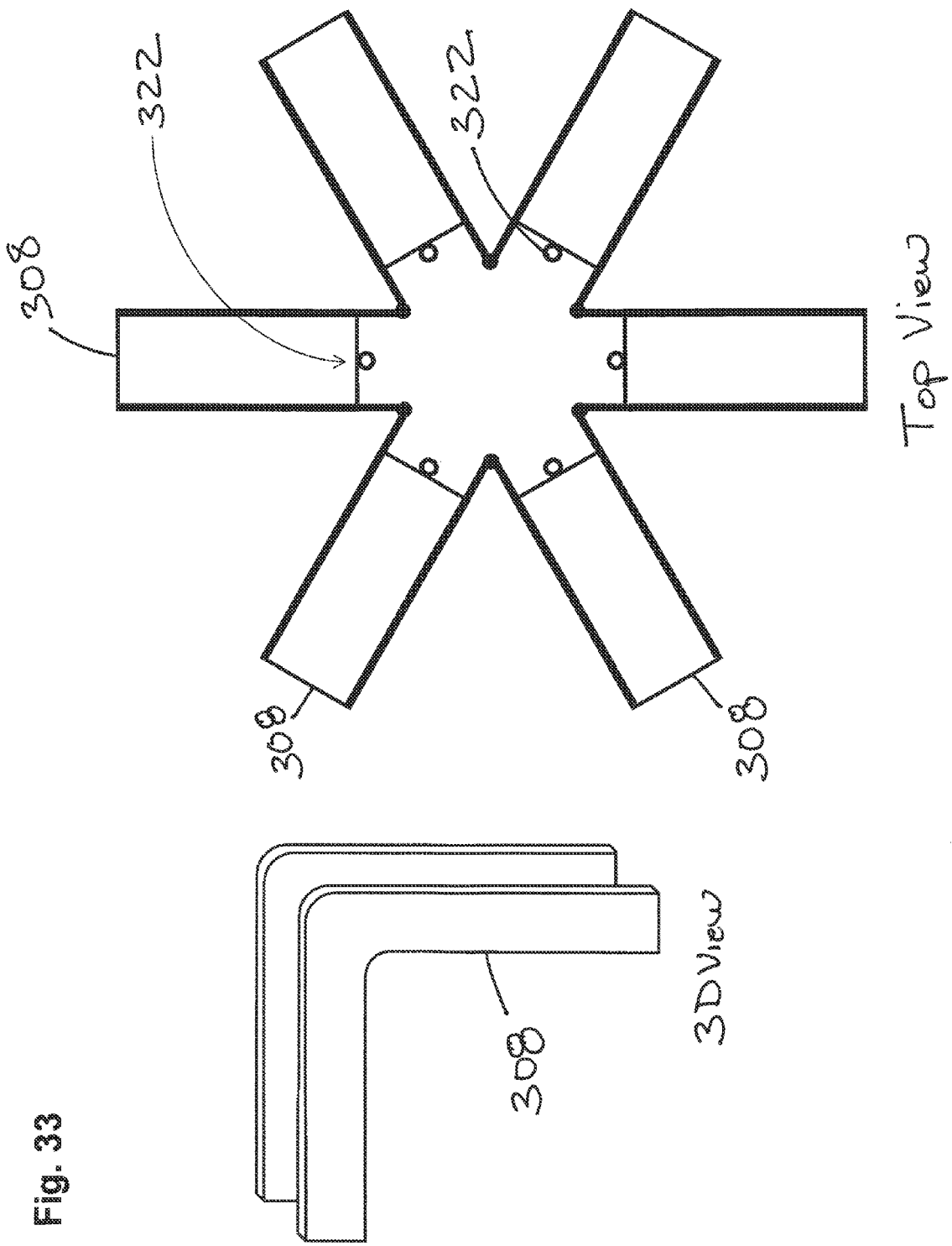
FIG. 33 is a perspective view and top view of bending prevention structures according to the present invention.

FIG. 33 shows the bending prevention structure 308 as a U shaped channel that bends ninety degrees. The bending prevention structure 308 prevents bending or twisting along the rotational direction of three section link 306. The bending prevention structure 308 supports the coupling of the rotational movement of Mi. The bending prevention structure 308 is used to minimize friction loss due to the up and down movement of three section link 306 by installing a ball bearing device 322 at 90 degree bend in the bending prevention structure 308. The ball bearing device 322 for the up and down movement of the three section link 306 can be as simple as a cylindrical bar or spherical ball shape to minimize the friction between three section link 306 and the bending prevention structure 308. The top view of FIG. 33 shows six bending prevention structures 308 combined together as one unit. The unit of bending prevention structure 308 rotates along with the rotating magnets 304 and three section links 306. The bending prevention structure 308 can be made of very rigid and strong lightweight materials such as the graphite fiber based composites or engineering plastics. With the support of the bending prevention structure 308, it becomes almost impossible for the thin ribbon section 320 to bend along its width.

Figure 34:
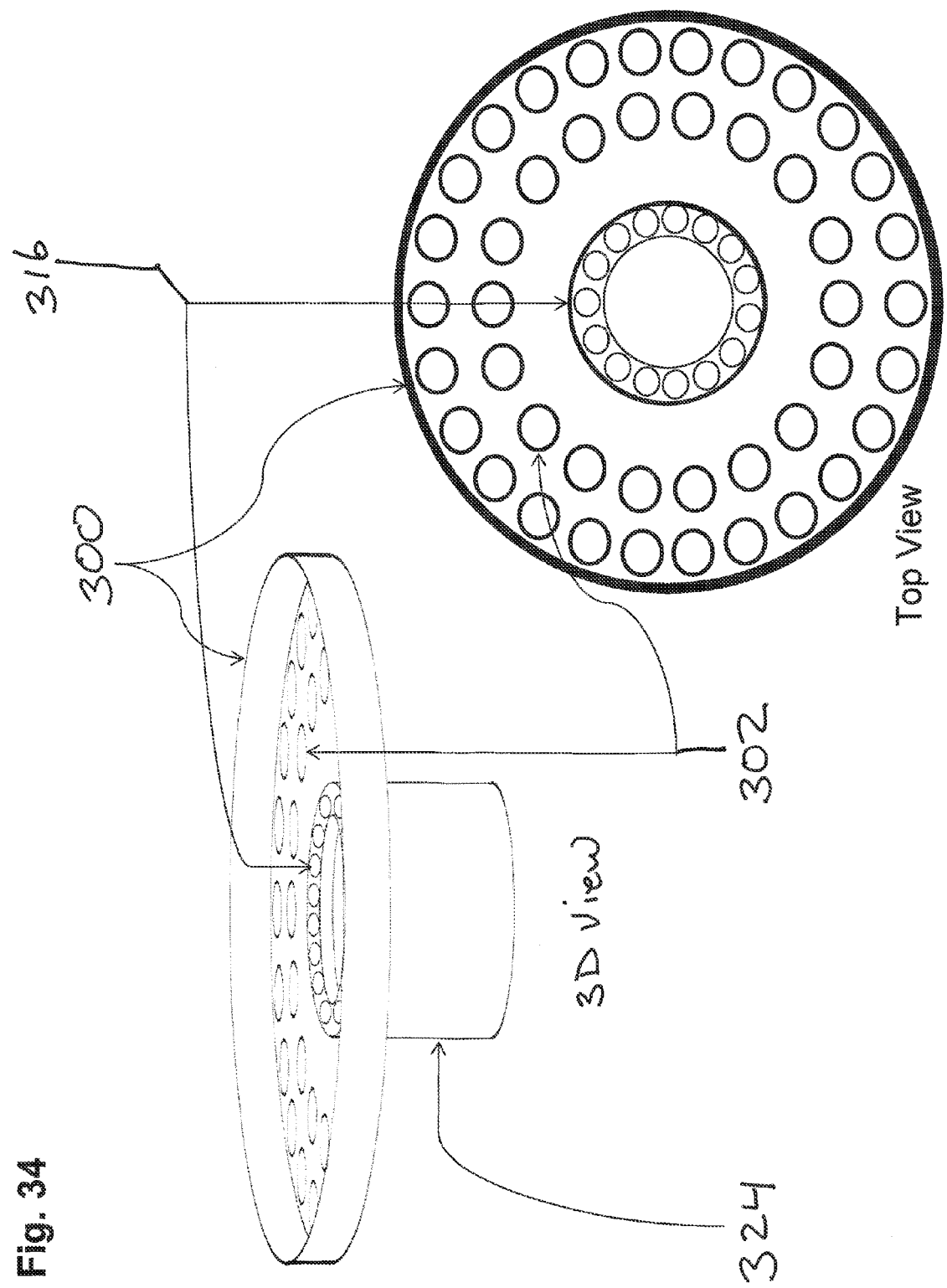
FIG. 34 is a perspective view and top view of a support dish according to the present invention.
Figure 35:
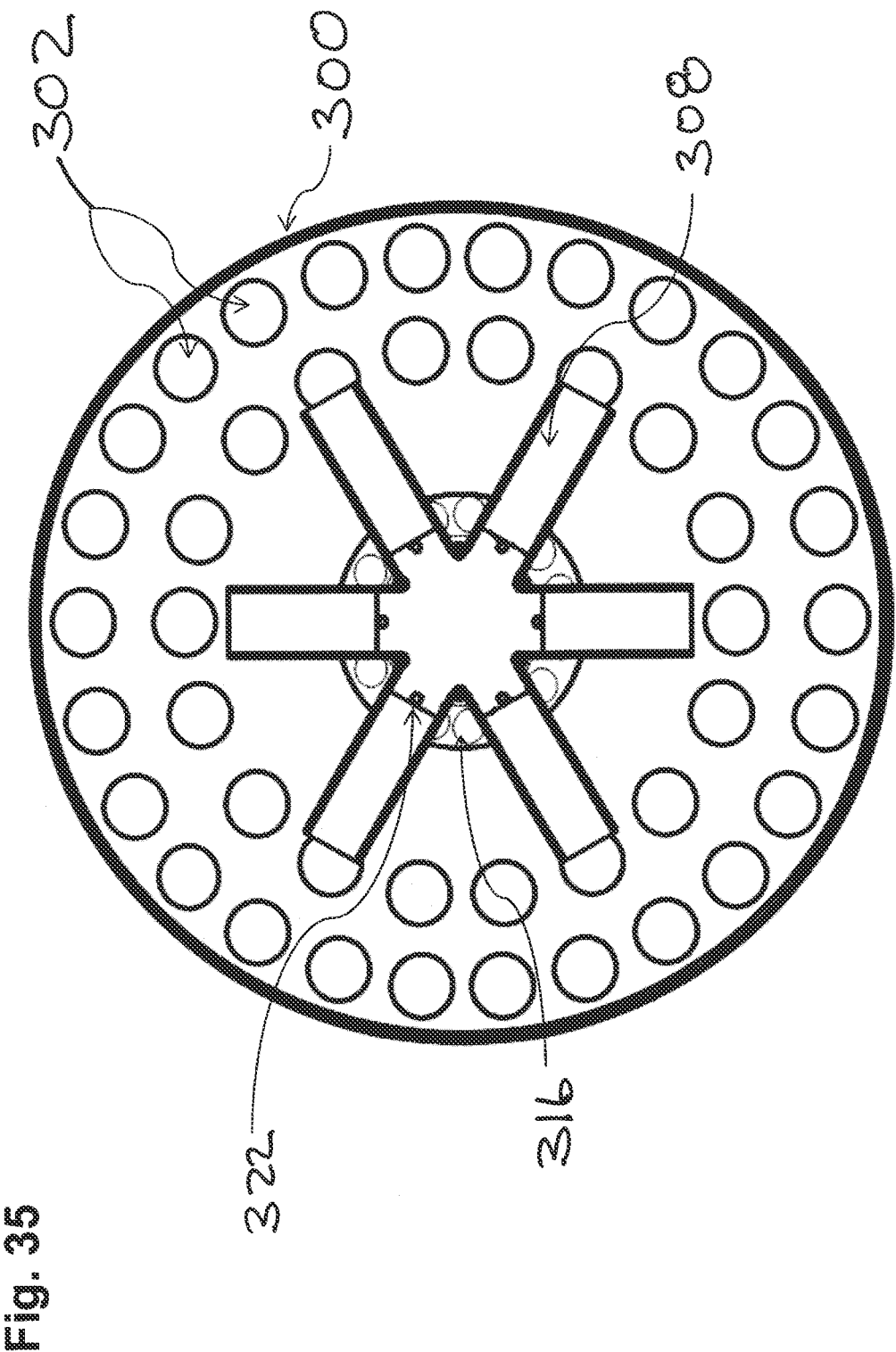
FIG. 35 is a top view of a support dish with bending prevention structures according to the present invention.

FIG. 34 shows the support dish 300 that includes a down tube 324 that acts as the protecting structure 224 of FIG. 25. The support dish 300 is a stationary structure that does not move during movement of the other components. The rotation bearing 316 is shown installed at the top of the down tube 324 and is used to minimize the friction loss due to other rotating components. The rotation bearing 324 provides a bearing between the support dish 300 and the combined bending prevention structures 308 so that the combined bending prevention structures 308 may rotate about the support dish 300, as shown in FIG. 35.

Figure 36:
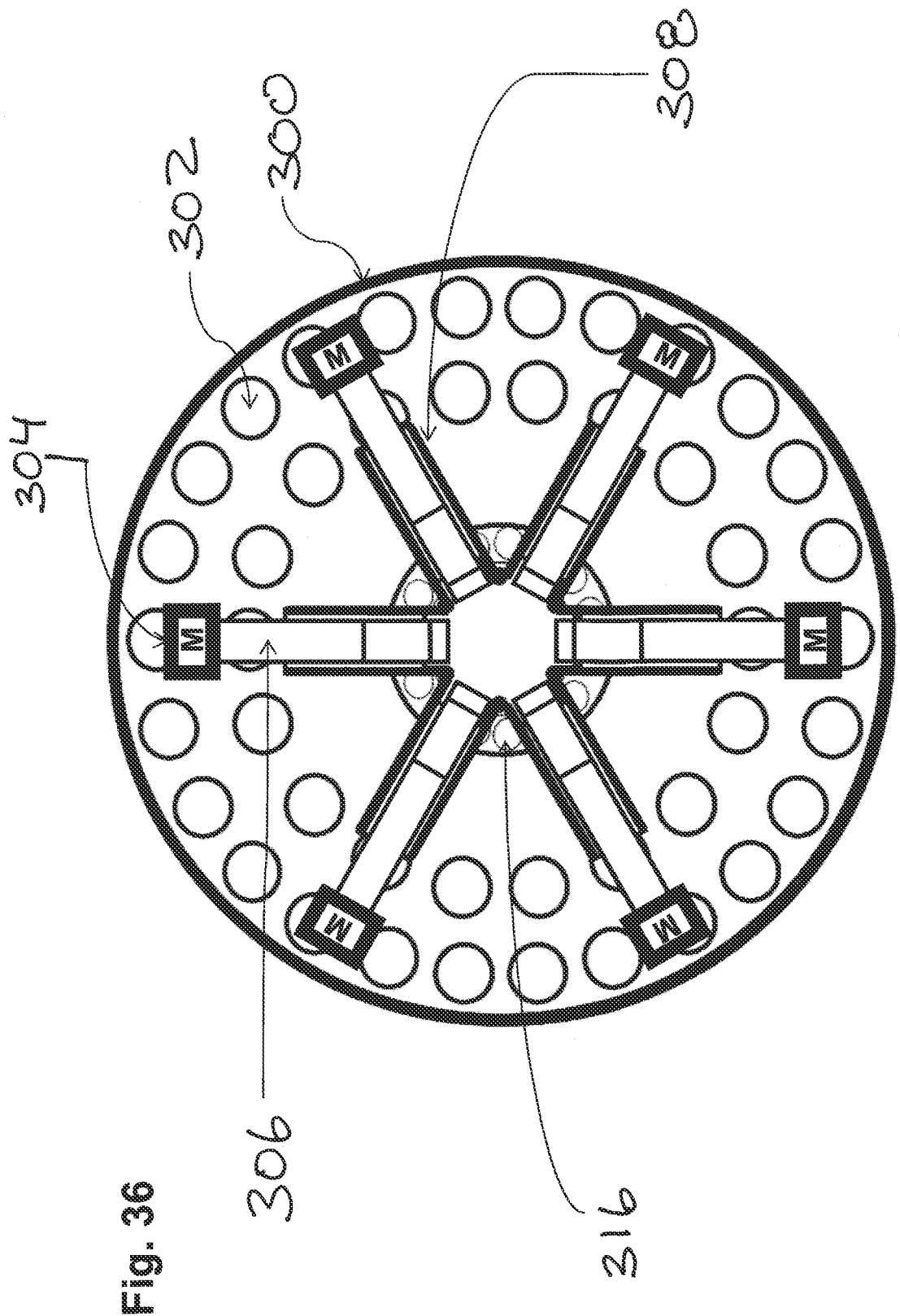
FIG. 36 is a top view of a rotor repulsive force conversion drive according to the present invention.
Figure 37:
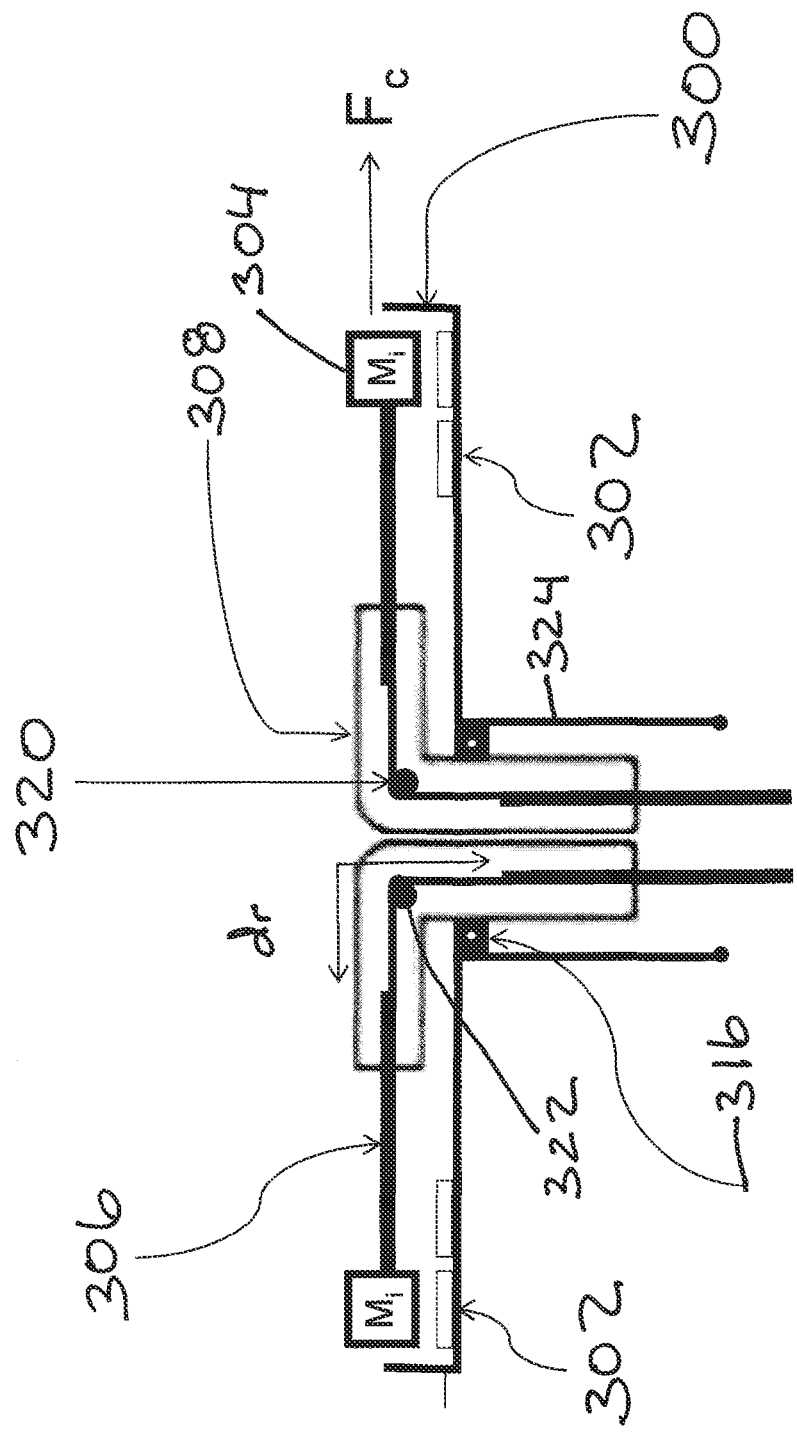
FIG. 37 is a side view of a rotor repulsive force conversion drive according to the present invention.

FIGS. 31 and 34-37 show the disk magnets 302, which are permanent magnets installed along the rotation circumference path of rotating magnets 304 above the support dish 300 to make zero friction loss between the rotating magnets 304 and the surface of the support dish 300. There are two circular rows of permanent magnets 302 installed to cover the displacement $d_r$ of Mi shown in FIG. 30. FIG. 36 shows the support dish 300 having the bending prevention structures 308 and three section links 306 with rotating magnets 304 installed. FIG. 37 shows a side cut through view of FIG. 36 to illustrate the 90 degree bending regions of the bending prevention structures 308 and three section links 306 in detail and to depict the relative locations of these components to each other.

Figure 38:
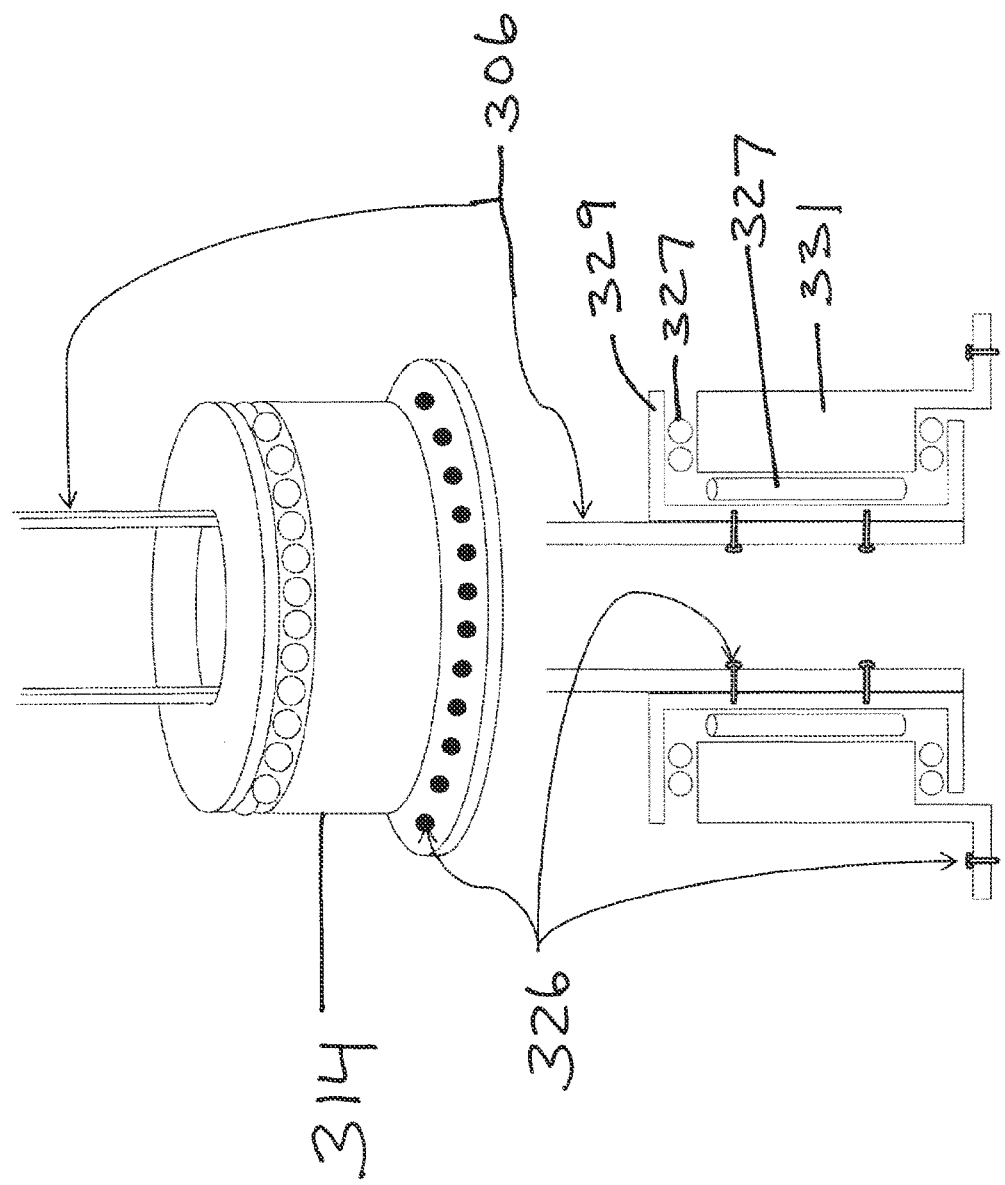
FIG. 38 is a perspective view and side view of vertical bearing according to the present invention.
Figure 39:
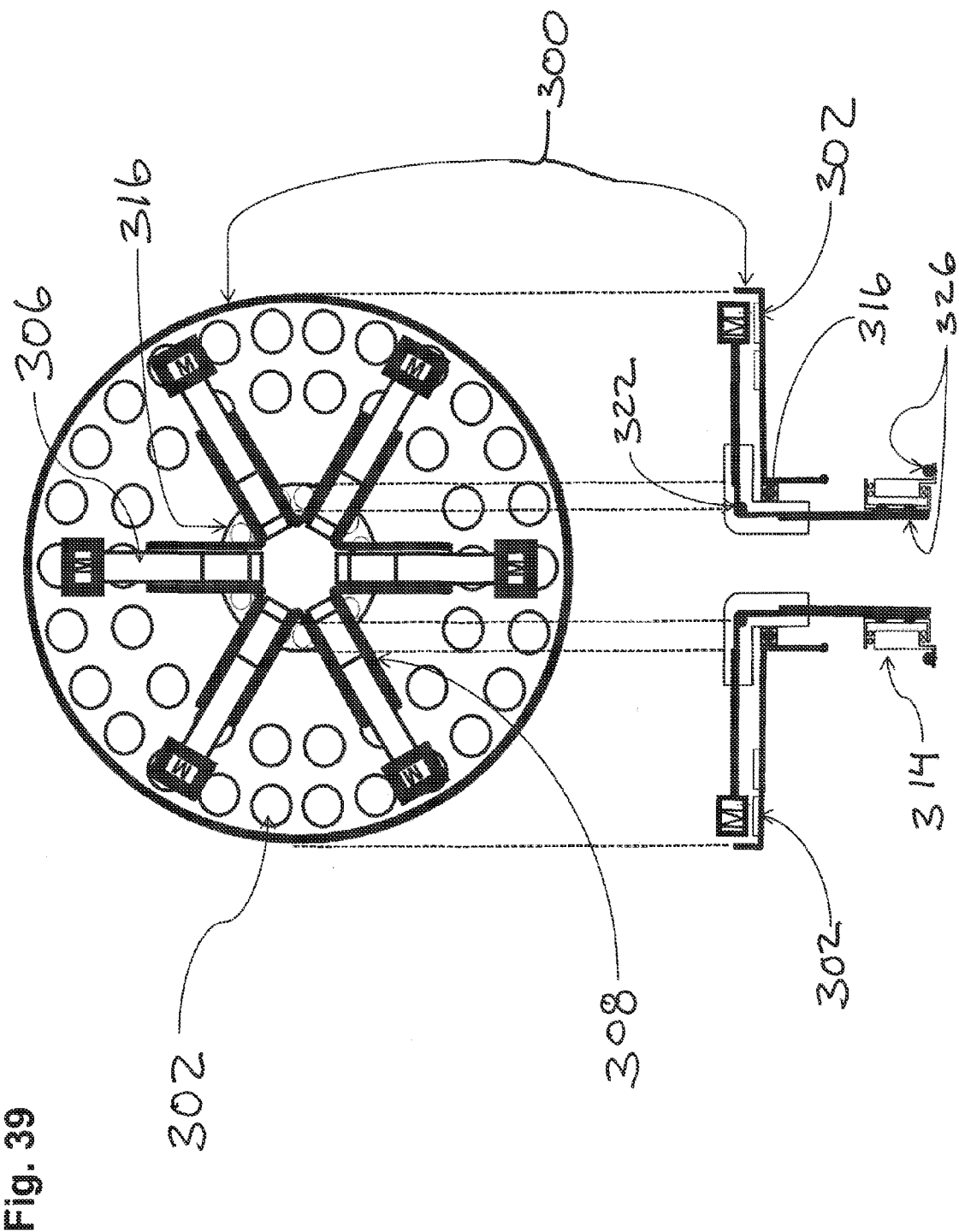
FIG. 39 is a perspective view and side view of a rotor repulsive force conversion drive according to the present invention.
Figure 40:
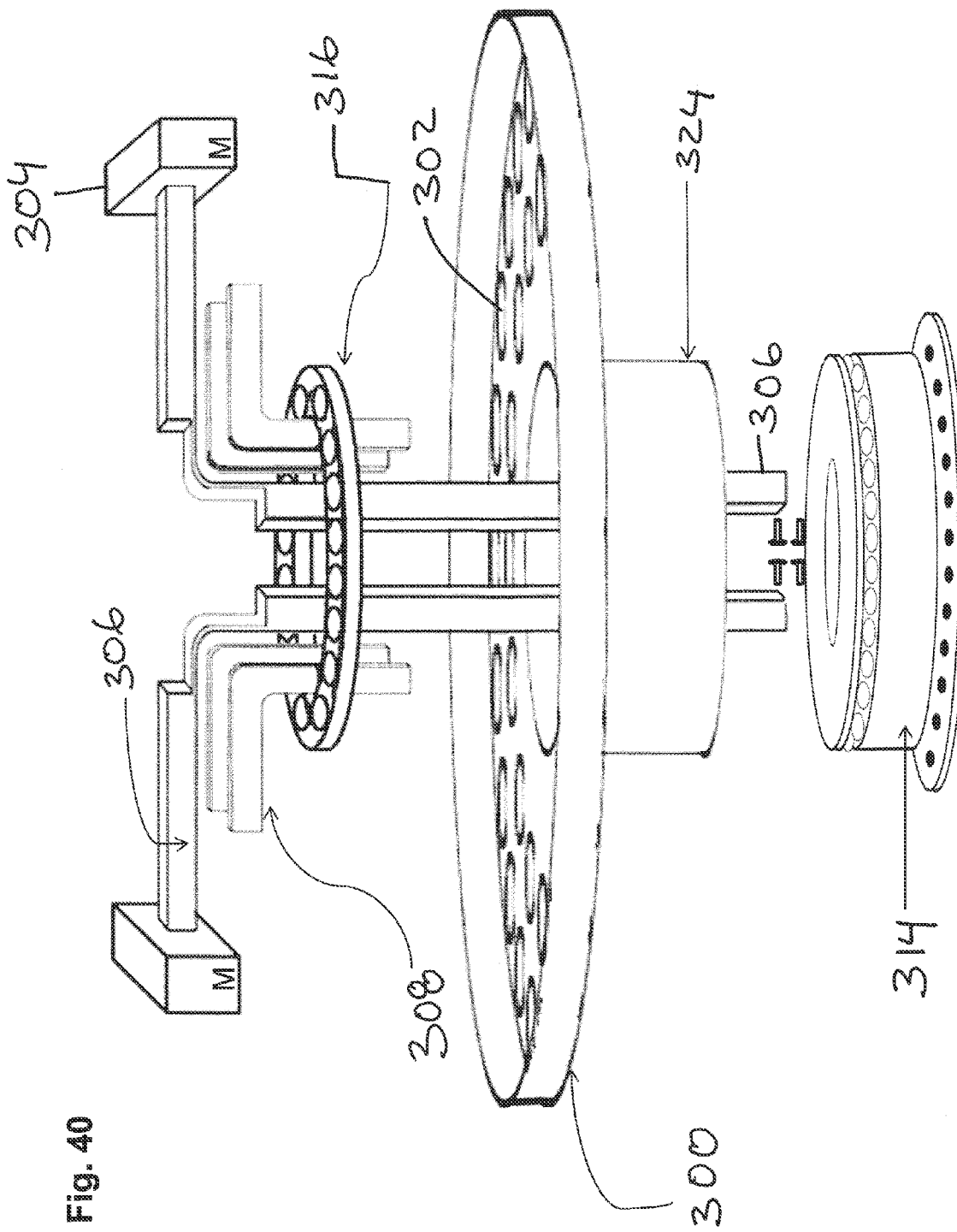
FIG. 40 is a perspective view of a rotor repulsive force conversion drive according to the present invention.

FIG. 38 shows the vertical bearing 314 which at the same time allows rotation movement and up and down movement of what is attached above the vertical bearing 314. The vertical bearing 314 is a key component to operate the present invention properly, since it is the final coupling part between the centrifugal force, $F_C$, coming from the rotation of rotating magnets 304 and the magnetic repulsive force, $F_R$, converted to the up and down movement. FIG. 38 shows bearing surfaces 327 that allow rotation section 329 to rotate about a stationary section 331, which are all components of the vertical bearing 314. FIG. 39 shows the location of the vertical bearing 314 in relationship to the support dish 300 and components attached to the support dish 300. FIG. 39 shows the three section link 306 is attached tightly to the vertical bearing 314 using screws 326. The vertical bearing 314 allows for the coupling of rotational movement and the up and down motion that will occur during use of the present invention. FIG. 40 shows a three dimensional view of all parts shown in FIG. 39. Note, FIG. 40 shows two bending prevention structures 308 for clarity, but the present invention can have more than two bending prevention structures 308.

Figure 41:
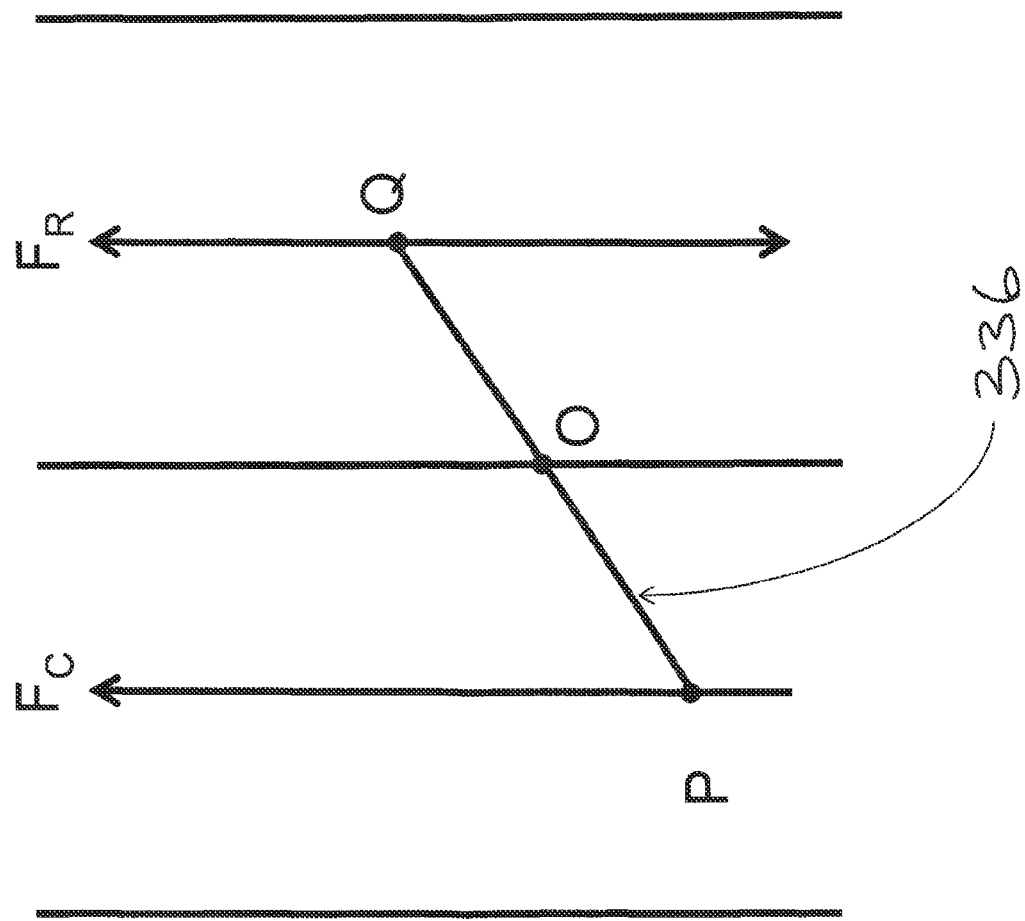
FIG. 41 is a schematic of a linear repulsive force conversion drive principles according to the present invention.
Figure 42:
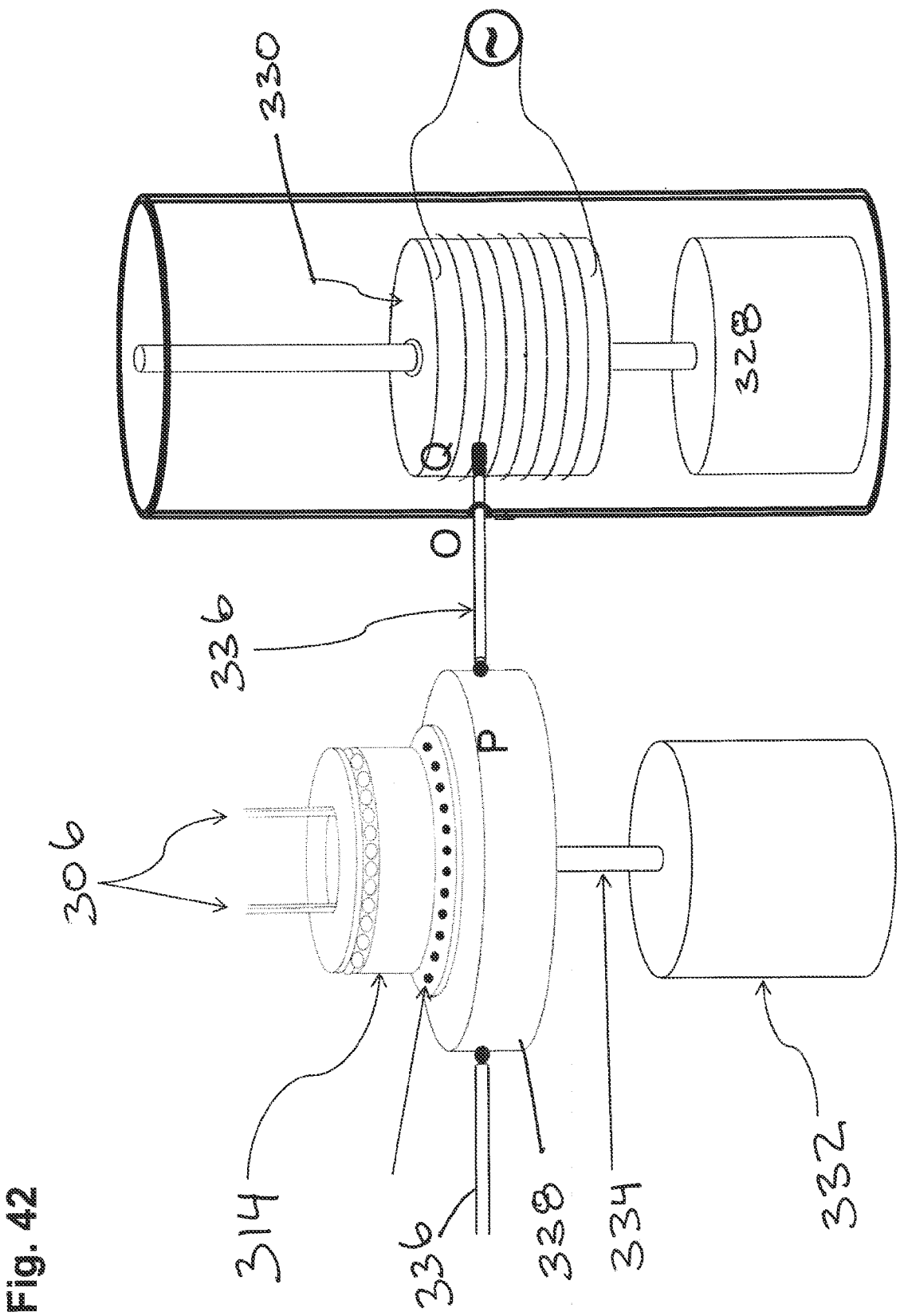
FIG. 42 is a perspective view of a rotor repulsive force conversion drive coupled to a linear repulsive force conversion drive according to the present invention.
Figure 43:
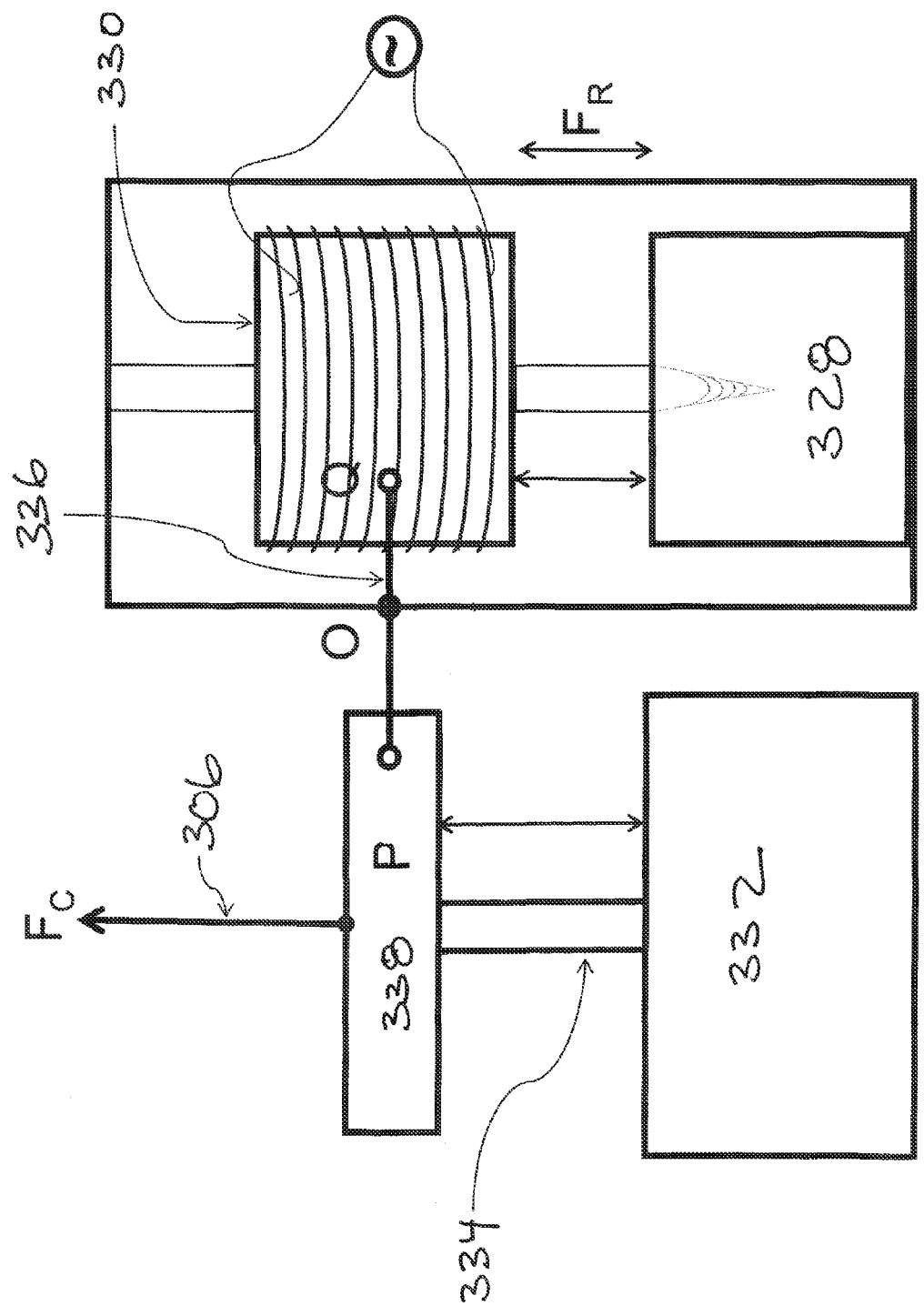
FIG. 43 is a side view of a linear repulsive force conversion drive according to the present invention.
Figure 44:
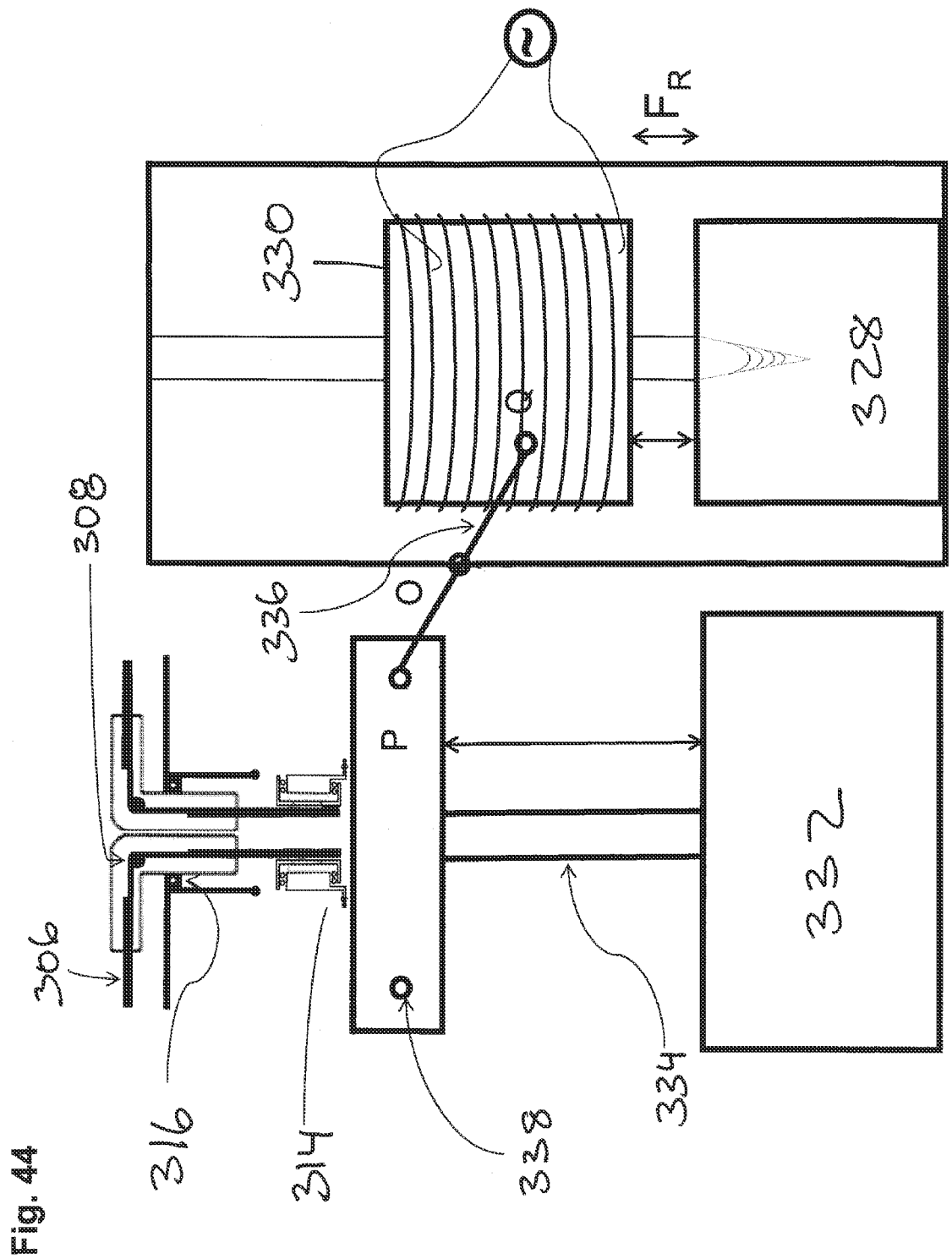
FIG. 44 is a side view of a rotor repulsive force conversion drive coupled to a linear repulsive force conversion drive according to the present invention.
Figure 45:
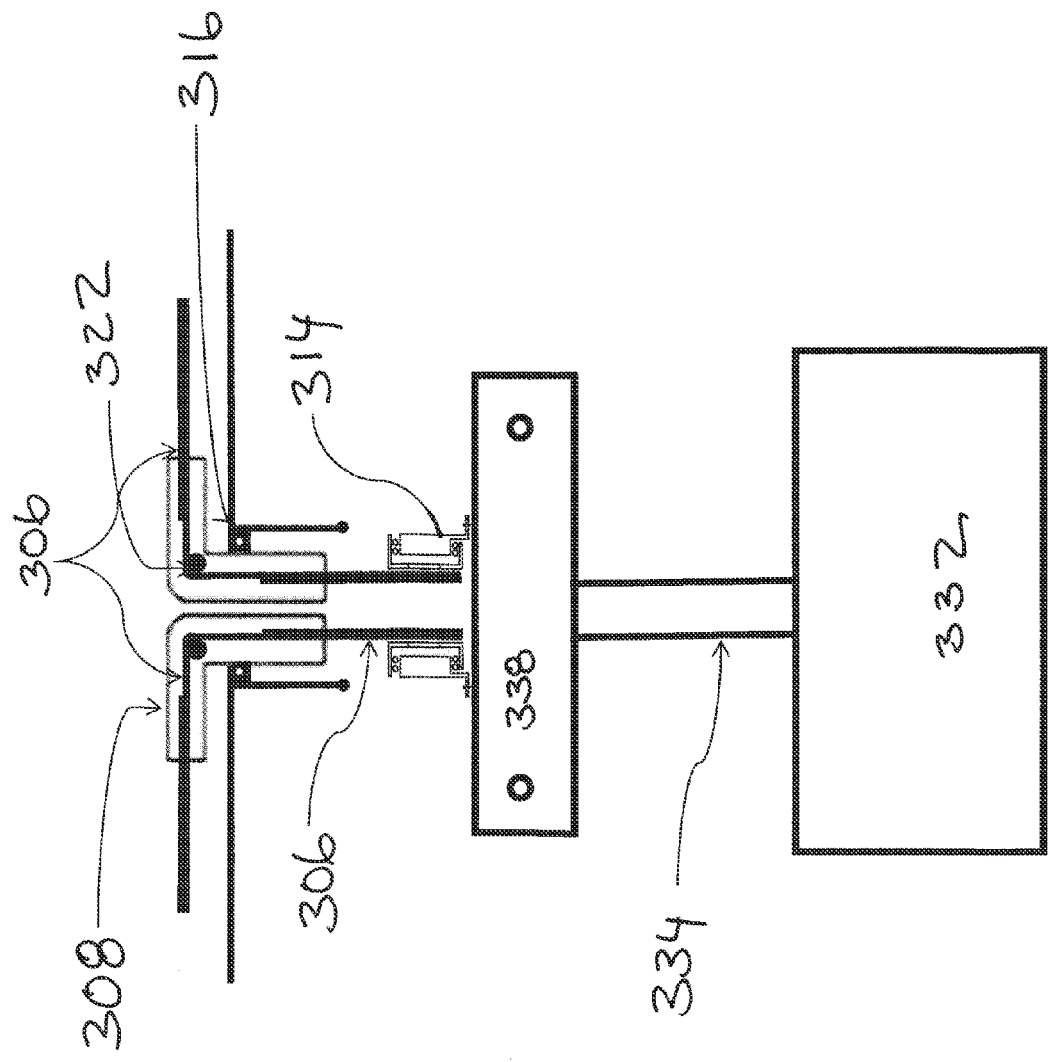
FIG. 45 is a side view of a rotor repulsive force conversion drive coupled to a linear repulsive force conversion drive according to the present invention.
Figure 46:
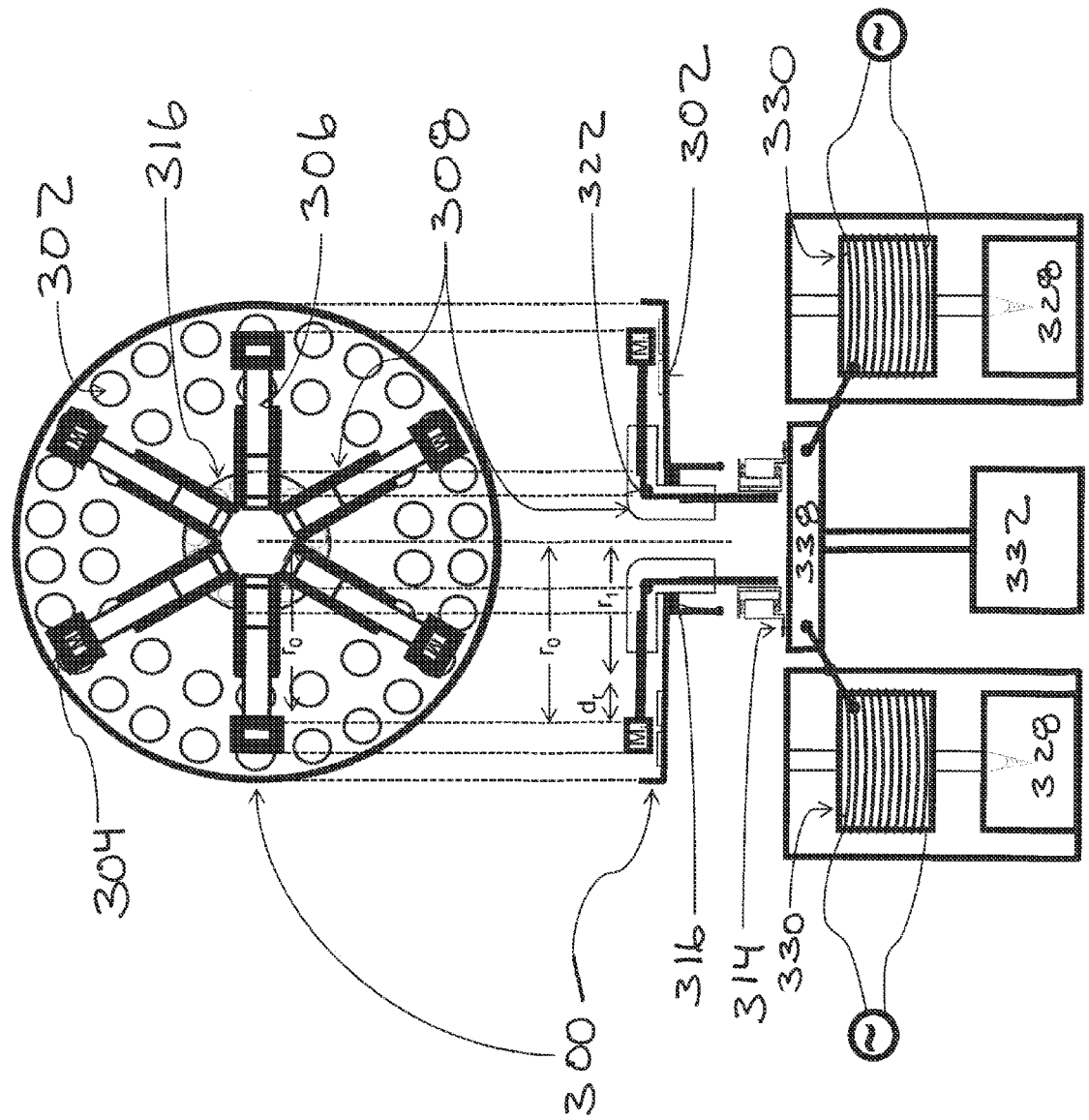
FIG. 46 is a top view and side view of a rotor repulsive force conversion drive coupled to a linear repulsive force conversion drive according to the present invention.

FIG. 41 is a conceptual drawing of the up and down seesaw motion to be described in FIGS. 42-44. FIG. 42 shows a practical example for the coupling the up and down seesaw motion by the magnetic repulsive force, $F_R$ of FIG. 41, between the permanent magnet 328 and the moving electric magnet 330. It also depicts the operation load 332 coupled to the vertical bearing 314 by a load rod 334. There are three universal joints at P, O, and Q. The universal joints should be of a type that minimizes friction energy loss at those points. The rigid rod 336 between points P and Q can be made of the non-magnetic materials, such as Aluminum or Titanium or Engineering plastics or graphite fiber based composites. There is a coupling interface block 338 connected between the load rod 334 and the vertical bearing 314. The coupling interface block 338 provides a stationary connection between the vertical bearing 314 and the load rod 334 and also a connection to the rigid rod 336. The moving electric magnet 330 is also supported by the rigid rod 336 between the coupling interface block 338 and electric magnet 330, so that the outer surface of the rigid rod 336 is not contacting the inner surface of the center hole of the moving electric magnet 330. FIG. 43 shows a schematic of the coupling of components shown in FIG. 42 with the force vectors and info shown in FIG. 41. FIG. 44 shows a schematic of the combination of components from FIGS. 39 and 43. FIG. 45 depicts the couplings of the operational load 332 with the rotation action of the vertical bearing 314. FIG. 46 is a schematic of a total system according to the present invention. FIG. 46 shows that there can be multiples pairings and connections of the electric magnets 330 and permanent magnets 328 that are shown in FIGS. 42-44.

Figure 47:
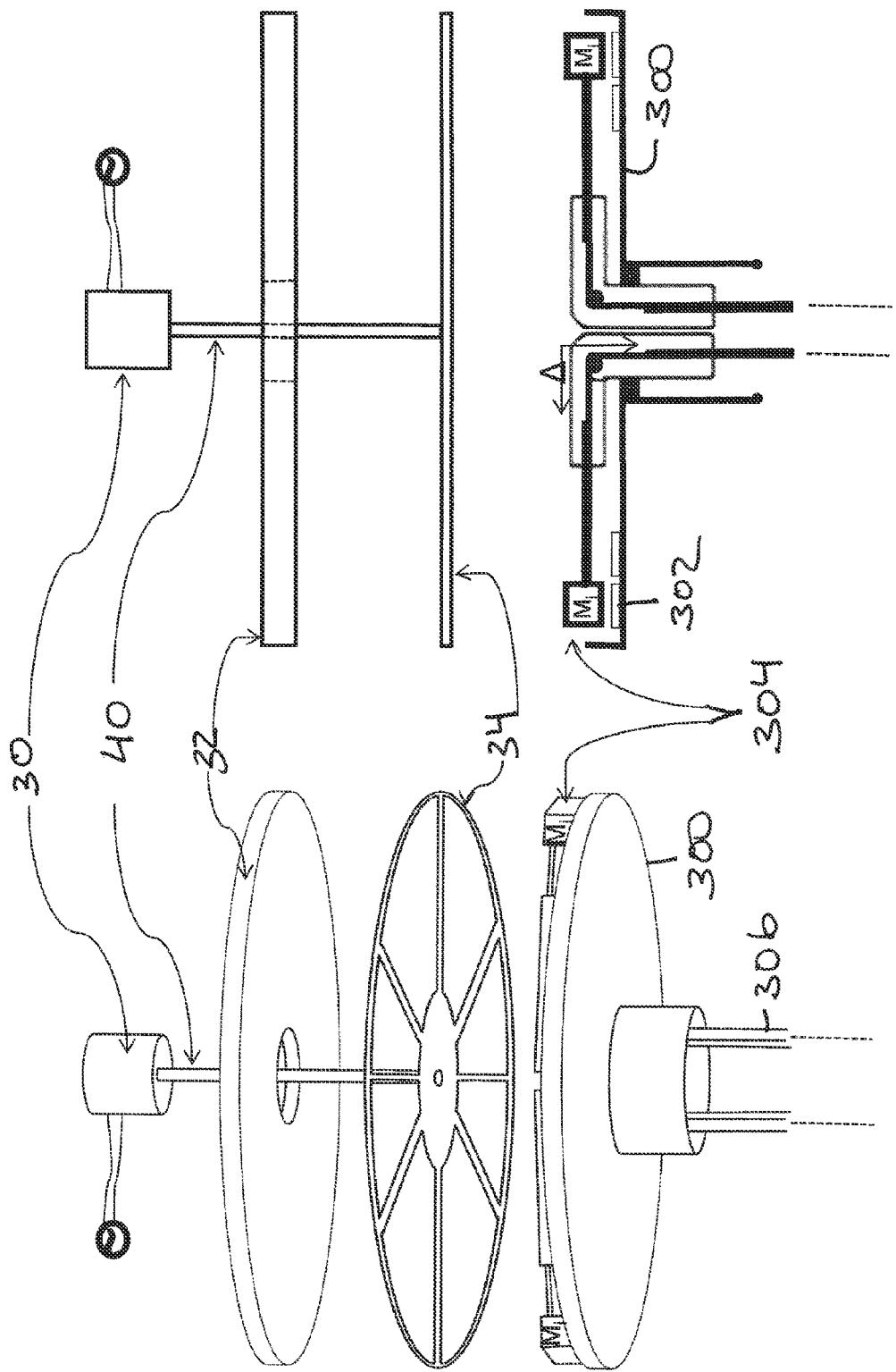
FIG. 47 is a perspective view of the combination of FIGS. 7 and 37 according to the present invention.

FIG. 47 shows the combination of the system depicted in FIGS. 7 and FIG. 37. Where there is a repulsive force conversion drive with a doughnut magnet 32, motor 30, motor shaft 40 and a motion inducing plate 34 that includes a predetermined pattern of empty openings 44. The motion of the inducing plate 34 causes the movement of the rotating magnets 304, which induces the energy magnification of the power of the motor 40. The magnification of the power of the motor 40 includes the combination of the seesaw motion produced by the magnetic repulsive force between the permanent magnets 328 and the moving electric magnets 330. The combination shown in FIG. 47 utilizes strong centrifugal force, Fc, to generate the manageable kinetic energy of Fc times distance $d_r$ (potential energy created by the strong magnetic fields), through the Load of FIG. 46 by coupling the magnetic repulsive force of "Fr" from two magnets 328, 330 in FIG. 46.

The motion inducing plate 34 of FIGS. 7 and 47 with the predetermined pattern of empty openings 44 can be made of a thin ferromagnetic iron metal disc frame. This motion inducing plate 34 of metal can be synchronized with the rotating magnets 304 to rotate the moving magnets 304 when the metal inducing plate 304 is rotated by a motor 40. Synchronization of the motion inducing plate 34 of metal and the rotating magnets 304 requires the motion inducing plate 34 of metal and the rotating magnets 304 to be a specific distance from each other. This specific distance depends on the properties of the stationary magnet 32, the motion inducing plate 34 of metal and the rotating magnets 304. This specific distance is where there is an imaginary neutral center plane between the stationary magnet 32 and the rotating magnets 304, such that the magnetic repulsive forces from the stationary and moving magnets becomes theoretically "ZERO" at center neutral plane.

Test (A) were performed using a device similar to the configuration shown in FIG. 7 using a metal motion inducing plate 34 and an aluminum magnet array disc 36 having a diameter of 12 Cm, ferrite based stationary permanent magnet 32 with B=1800 Gauss, and small cylindrical shape magnets along the circumference of magnet array disc 36. The centrifugal Force, Fc,=2341 Newtons, RPM=3000, Omega, $\omega$,=314, the required input power to a DC motor for number 40 in FIG. 7 and Power input, Pi=31 Watts. The observed output power from the RFCD through a fan used as the operational load, was Po=95.1466 Watts. So there was power gain of Po/Pi=95.1466 W/31 W=3.07. Four other tests provided the following data: (B)Fc=987 N, RPM=3094, $\omega$=324, Pi=7.02 W, and Po=25.9 W: So the gain, G=3.69. (C)Fc=1260 N, RPM=3495, $\omega$=366, Pi=7.95 W, and Po=33 W; So the gain, G=4.156. (D)Fc=1565 N, RPM=3898, $\omega$=408, Pi=9.317 W, and Po=41 W; So the gain,G=4.4. (E)Fc=1879 N, RPM=4280, $\omega$=447, Pi=10.92 W, and Po=49.14 W; So the gain, G=4.5 The average gain was shown to be 4.165. So with the gain of about 4, it is believe there will the gain will be increased with the system presented in FIGS. 31-46.

While different embodiment of the invention have been described in detail herein, it will be appreciated by those skilled in the art that various modification and alternatives to embodiments could be developed in light of the overall teachings of the disclosure. Accordingly, the particular arrangements are illustrated only and are not limiting as to the scope of the invention that is to be given the full breadth of any and all equivalents thereof.

I claim:

1. A repulsive force conversion drive system for centrifugal force conversion to drive a load comprising:
    a operational load to be driven by movement and provide external power due to movement of said operational load;
    a rotary repulsive force conversion drive connected to said operational load, such that said operational load moves in a first linear direction due to centrifugal force of rotating mass of said rotary repulsive force conversion drive; and
    a linear repulsive force conversion drive connected to said operational load, said linear repulsive force conversion drive connected to said operational load such that said operational load moves is a second linear direction that is opposite said first linear direction on command from said linear repulsive force conversion drive.

2. The repulsive force conversion drive system of claim 1, wherein said rotary repulsive force conversion drive comprises:
    a fixed repulsive unit in a fixed position;
    a motion repulsive unit suspended near said fixed repulsive unit, said one motion repulsive unit suspended such that said motion repulsive unit and said fixed repulsive unit repulse each other due to a repulsive force that exists between said fixed repulsive unit and said motion repulsive unit, said motion repulsive unit suspended such that said motion repulsive unit can move relative to said fixed repulsive unit in a rotating motion;
    a motion inducing plate positioned between said one motion repulsive unit and said fixed repulsive unit and movable between said motion repulsive unit and said fixed repulsive unit, said first motion inducing plate movable between said motion repulsive unit and said fixed repulsive unit to cause said motion repulsive unit to move relative to said fixed repulsive unit during movement of said first motion inducing plate;
    at least one movable mass movably connected on said motion repulsive unit for a distance $d_r$ between a first and a second point such that said at least one movable mass moves along said distance $d_r$ during rotation of said motion repulsive unit due to centrifugal force acting on each of said at least one movable mass, whereby as said at least one movable mass moves to said first point said at least one movable mass is under the influence of said rotary repulsive force conversion drive and as said at least one movable mass moves to said second point said at least one movable mass is under the influence of said linear repulsive force conversion drive; and
    a link connected between each of said at least one movable mass and said operational load, such that when said at least one movable mass moves to said first point due to centrifugal force said cable pulls and moves said operational load in said first direction due to rotation of motion repulsive unit and when said operational load moves in said second direction said at least one movable mass moves to said second point due to said operational load pulling on said link.

3. The repulsive force conversion drive system of claim 2, wherein each of said at least one movable mass is a magnet and said fixed repulsive unit is a magnet, wherein said at least one movable mass and said fixed repulsive unit are position to repulse each other when said material of said motion inducing plate is not between said at least one movable mass and said fixed repulsive unit.

4. The repulsive force conversion drive system of claim 2, wherein said linear repulsive force conversion drive comprises:
    a stationary repulsive unit;
    a movable repulsive unit above said stationary repulsive unit which moves away from said stationary repulsive unit due to a repulsive force, said movable repulsive unit controllable to add and remove said repulsive force in order to control movement of said movable repulsive unit in relation to said stationary repulsive unit; and
    said movable repulsive unit connected to said operational load such that when said movable repulsive unit moves away from said stationary repulsive unit said movable repulsive unit moves said operational load in said second direction.

5. The repulsive force conversion drive system of claim 4, wherein said stationary repulsive unit and said movable repulsive unit are magnets wherein said movable repulsive unit is the type of magnet allows the magnetic field to be turned off enough so that there is no repulsive force between said stationary repulsive unit and said movable repulsive unit.

6. The repulsive force conversion drive system of claim 5, wherein said movable repulsive unit is an electro magnet and said stationary repulsive unit is a permanent magnet.

7. The repulsive force conversion drive system of claim 5, wherein each of said at least one movable mass is a magnet and said fixed repulsive unit is a magnet, wherein said at least one movable mass and said fixed repulsive unit are position to repulse each other when said material of said motion inducing plate is not between said at least one movable mass and said fixed repulsive unit.

8. The repulsive force conversion drive system of claim 4, wherein said operational load and said movable repulsive unit move in opposite directions in relation to each other.

9. The repulsive force conversion drive system of claim 4, wherein each of said at least one movable mass is a magnet and said fixed repulsive unit is a magnet, wherein said at least one movable mass and said fixed repulsive unit are position to repulse each other when said material of said motion inducing plate is not between said at least one movable mass and said fixed repulsive unit.

10. The repulsive force conversion drive system of claim 1, wherein said linear repulsive force conversion drive comprises:
   a stationary repulsive unit;
   a movable repulsive unit above said stationary repulsive unit which moves away from said stationary repulsive unit due to a repulsive force, said movable repulsive unit controllable to add and remove said repulsive force in order to control movement of said movable repulsive unit in relation to said stationary repulsive unit; and
   said movable repulsive unit connected to said operational load such that when said movable repulsive unit moves away from said stationary repulsive unit said movable repulsive unit moves said operational load in said second direction.

11. The repulsive force conversion drive system of claim 10, wherein said stationary repulsive unit and said movable repulsive unit are magnets wherein said movable repulsive unit is the type of magnet allows the magnetic field to be turned off enough so that there is no repulsive force between said stationary repulsive unit and said movable repulsive unit.

12. The repulsive force conversion drive system of claim 11, wherein said movable repulsive unit is an electro magnet and said stationary repulsive unit is a permanent magnet.

13. The repulsive force conversion drive system of claim 10, wherein said operational load and said movable repulsive unit move in opposite directions in relation to each other.

14. A linear repulsive force conversion drive comprising:
   a stationary repulsive unit;
   a movable repulsive unit above said stationary repulsive unit which moves away from said stationary repulsive unit due to a repulsive force, said movable repulsive unit controllable to add and remove said repulsive force in order to control movement of said movable repulsive unit in relation to said stationary repulsive unit; and
   said movable repulsive unit connected to a operational load such that when said movable repulsive unit moves away from said stationary repulsive unit said movable repulsive unit moves said operational load.

15. The repulsive force conversion drive system of claim 14, wherein said stationary repulsive unit and said movable repulsive unit are magnets wherein said movable repulsive unit is the type of magnet allows the magnetic field to be turned off enough so that there is no repulsive force between said stationary repulsive unit and said movable repulsive unit.

16. The repulsive force conversion drive system of claim 15, wherein said movable repulsive unit is an electro magnet and said stationary repulsive unit is a permanent magnet.

17. The repulsive force conversion drive system of claim 14, wherein said operational load and said movable repulsive unit move in opposite directions in relation to each other.

18. A method of converting centrifugal force to useful energy, comprising the steps of:
   rotating at least one mass to create centrifugal force, where the at least one mass is connected to a operational load;
   allowing the at least one mass to move along the direction of the centrifugal force for distance $d_r$ between a first and a second point to move the operational load;
   moving the at least one movable mass to the first point due to influence of the created centrifugal force motion from rotating the at least one movable mass in order to move the operational load in a first direction;
   moving the at least one movable mass to the second point due to influence of linear repulsive force conversion drive connected to the operational load, such that movement of the linear repulsive force conversion drive moves the operational load in a second direction which causes the movement of the at least one movable mass to the second point due to the connection between the operational load and the linear repulsive force conversion drive.

19. The method of claim 18, wherein said linear repulsive force conversion drive comprises:
   a stationary repulsive unit;
   a movable repulsive unit above said stationary repulsive unit which moves away from said stationary repulsive unit due to a repulsive force, said movable repulsive unit controllable to add and remove said repulsive force in order to control movement of said movable repulsive unit in relation to said stationary repulsive unit; and
   said movable repulsive unit connected to said operational load such that when said movable repulsive unit moves away from said stationary repulsive unit said movable repulsive unit moves said operational load in said second direction.

20. The method of claim 19, wherein said movable repulsive unit is an electro magnet and said stationary repulsive unit is a permanent magnet.

* * * * *